United States Patent [19]

Endo

[11] Patent Number: 5,907,576

[45] Date of Patent: May 25, 1999

[54] CSK COMMUNICATION SYSTEM AND METHOD FOR SPREAD SPECTRUM COMMUNICATION

[75] Inventor: Kaoru Endo, Tokyo, Japan

[73] Assignee: NEC Corporation, Japan

[21] Appl. No.: 08/704,158

[22] Filed: Aug. 28, 1996

[30] Foreign Application Priority Data

Aug. 30, 1995 [JP] Japan ................................. 7-222378

[51] Int. Cl.[6] .................................................. H04B 15/00
[52] U.S. Cl. .................................................. 375/200
[58] Field of Search ........................... 370/242, 247–248, 370/479; 375/200, 206–210, 324, 333, 340, 343; 380/34, 46–47

[56] References Cited

U.S. PATENT DOCUMENTS

| 5,048,052 | 9/1991 | Hamatsu et al. | 375/200 |
|---|---|---|---|
| 5,105,436 | 4/1992 | Mori et al. | 375/200 |
| 5,228,055 | 7/1993 | Uchida et al. | 375/200 |
| 5,432,815 | 7/1995 | Kang et al. | 375/200 |

FOREIGN PATENT DOCUMENTS

| 2246539 | 10/1990 | Japan . |
|---|---|---|
| 2246540 | 10/1990 | Japan . |
| 2246541 | 10/1990 | Japan . |
| 2246542 | 10/1990 | Japan . |
| 2246543 | 10/1990 | Japan . |
| 2246544 | 10/1990 | Japan . |
| 2246545 | 10/1990 | Japan . |
| 2246546 | 10/1990 | Japan . |
| 2246547 | 10/1990 | Japan . |
| 2246548 | 10/1990 | Japan . |
| 6-311136 | 11/1994 | Japan . |
| 7-154365 | 6/1995 | Japan . |

*Primary Examiner*—Stephen Chin
*Assistant Examiner*—Joseph Roundtree, Jr.
*Attorney, Agent, or Firm*—Ostrolenk, Faber, Gerb & Soffen, LLP

[57] ABSTRACT

A CSK modulation is applied to transmit input data for transmission by using N PN code series. A modulator for N series synthesizes a predetermined number (n) of PN code series selected from N PN code series in response to m bits in the input data, and the synthesized code series is transmitted onto a transmission medium through a transmitting interface. The PN code series which is actually transmitted has a maximum value of the absolute magnitude of auto-correlation which is always greater than a maximum value of the absolute value of cross-correlations between the remaining synthesized PN code series.

22 Claims, 38 Drawing Sheets

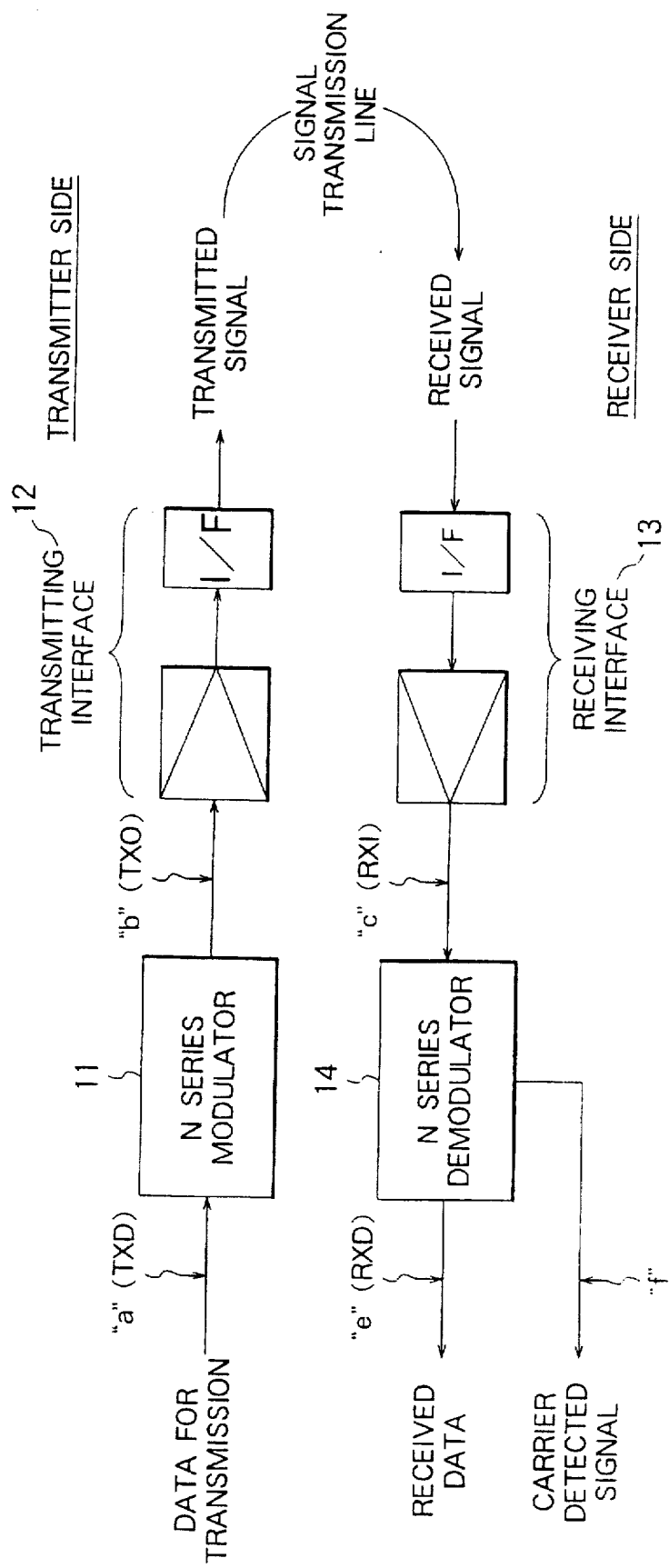

FIG. 8

| m0 | m1 | m2 | TXD |
|----|----|----|-----|
| 0  | 0  | 0  | 0   |
| 1  | 0  | 0  | N1  |
| 0  | 1  | 0  | N2  |
| 1  | 1  | 0  | N1 + N2 |
| 0  | 0  | 1  | N3  |
| 1  | 0  | 1  | NI + N3 |
| 0  | 1  | 1  | N2 + N3 |
| 1  | 1  | 1  | NI + N2 + N3 |

FIG. 22

| Di | M | DO | CKI | R̄ | a | b | CO |
|----|---|----|----|----|---|---|----|
| 0 | 0 | 0 | — | 0 | 0 | 0 | 0 |
| 0 | 0 | 0 | ↗ | 1 | 0 | 0 | NC |
| 0 | 0 | 1 | ↗ | 1 | 0 | 1 | +1 |
| 0 | 1 | 0 | ↗ | 1 | 1 | 0 | NC |
| 0 | 1 | 1 | ↗ | 1 | 1 | 1 | −1 |
| 1 | 0 | 0 | ↗ | 1 | 1 | 1 | −1 |
| 1 | 0 | 1 | ↗ | 1 | 1 | 0 | NC |
| 1 | 1 | 0 | ↗ | 1 | 0 | 1 | +1 |
| 1 | 1 | 1 | ↗ | 1 | 0 | 0 | NC |

+1···CO VALUE INCREASES BY 1
−1···CO VALUE DECREASES BY 1
NC···CO VALUE IS UNCHANGED

CSK COMMUNICATION SYSTEM AND METHOD FOR SPREAD SPECTRUM COMMUNICATION

BACKGROUND OF THE INVENTION (a) Field of the Invention

The invention relates to communication system and method for spread spectrum (SS) communication, and in particular, to communication system and method in which data to be transmitted is modulated according to CSK (code shift keying) technique utilizing a plurality (N) of PN (pseudo-noise) code series.

(b) Description of the Related Ar:

Recently, an SS communication system is widely employed in the fields of base station communication, mobile unit communication, power line communication or the like. A conventional SS communication system will be described with reference to FIGS. 1 and 2. FIG. 1 is a block diagram of a conventional SS communication system including a signal transmitter and a signal receiver, while FIG. 2 is a timing chart showing signal waveforms appearing at specified nodes in the conventional SS communication system shown in FIG. 1.

In FIG. 1, on the signal transmitter side of the system, an output "a" from a PN (pseudo-noise) code series generator 1 and data "b" for transmission are input to an exclusive OR circuit 2, an output "c" of which is amplified by an amplifier 3 to be delivered as a transmitted signal onto a signal transmission path.

On the signal receiver side of the system, the transmitted signal is input to an amplifier 4 as a received signal. An amplified signal which is delivered from the amplifier 4 is input to a synchronized PN code series generator 5 and also to a correlator 6 where the amplified signal is correlated with an output "d" from the synchronized PN code series generator 5. An output signal "e" from the correlator 6 represents a correlation value, which is compared in a comparator 7 against a given threshold value. An output of the comparator 7 is delivered as received data "f".

The signal transmission path may be either a radio path or a wiring, and can be formed by one of a variety of signal transmission media which is adequate to a particular application. The transmitted signal is directly delivered to the signal transmission medium where it is often converted into a signal form which enables an efficient transmission through the signal transmission medium.

In a power line communication, it is necessary to provide an interface which isolates a transmitted signal from commercial electric power. A portion of the system which operates on the signal transmission medium, and which either converts the transmitted signal which passes therethrough into a signal form adequate for the transmission or isolates it from the power line, is referred to as "receiving interface" or "transmitting interface" depending on its use. Such an interface provides a connection means with the signal transmission medium.

In a conventional SS communication system as described above, PN series which is produced by the synchronized PN code series generator 5 on the signal receiver side must be synchronized with the PN series which is delivered from the transmitter side. At this end, it is essential to seek for a point of synchronization therebetween.

If the signal transmission path is satisfactory in respect of the signal transmission characteristic, a correlation waveform will exhibit a peak at the synchronized point, as illustrated in FIG. 3A, presenting no problem whatsoever. However, when there is a dip point within the signal transmission band as when used in the power line communication or when the signal transmission characteristic of the transmission path is considerably low, the correlation waveform will be collapsed as illustrated in FIGS. 3B and 3C. In such an event, the sign of the correlation value will be inverted between "+" and "−", which means that the data level will be inverted between "1" and "0" and the synchronization can no longer be maintained under the same condition, which involves a serious drawback.

A CSK modulation technique is known to be applicable to SS communication. The CSK modulation techniques applied to SS communication system include ones disclosed, for example, in JP-A-2(1990)-246539 and JP-A-2(1990)-6540–6548.

SUMMARY OF THE INVENTION

It is an object of the invention to provide CSK communication system and method for spread spectrum communication which enable an exact code synchronization to be maintained by less susceptibility of the transmitted signal from noise level on the signal transmission path, thereby permitting an excellent SS communication.

It is another object of the invention to provide a spread spectrum communication method which incorporates a novel CSK system which overcomes the described problems involved in a conventional SS communication system, and an SS communication system which implements the method.

It is a further object of the invention to provide a CSK signal transmitting method and a CSK signal receiving method for use in an SS communication system, and to provide a CSK signal transmitter and a CSK signal receiver which are used in the SS communication.

It is yet another object of the invention to provide a signal demodulator in a CSK signal receiver which demodulates a received CSK signal in a stable manner and which is capable of providing an error suppression in the event of a degradation occurring in the signal transmission characteristic of the transmission path.

It is yet another object of the invention to provide a correlator in a CSK signal receiver which allows forming a correlation between a CSK signal and Manchester M series in a rapid manner and in a real time.

It is yet another object of the invention to provide a peak position detector in a CSK receiver which is capable of accurately detecting the peak position of a received CSK signal.

It is yet another object of the invention to provide a peak position detector in a CSK receiver which is capable of detecting a peak position without being influenced by a variation in the signal transmission characteristic.

It is yet another object of the invention to provide a carrier detector in a CSK receiver which is capable of accurately detecting a carrier contained in a received CSK signal if the signal transmission characteristic is degraded.

It is yet another object of the invention to provide a synchronization-established indicator in a CSK receiver which is capable of accurately determining a beginning point of a communication in a stable manner substantially without being influenced by noise.

It is yet another object of the invention to provide a synchronization-failed indicator which is capable of accurately determining a failure of achieving a synchronization at any time.

Initially, the principle of CSK communication system and method for use in the spread spectrum communication according to the invention will be described.

In accordance with a first aspect of the invention, a CSK communication system is provided in which a synthesized series formed by synthesizing input data for transmission with N Manchester M code series, which are produced at a given interval and having an equal code length, is transmitted as a transmitted signal. The selection of the synthesized series depends on the code of the data for transmission which comprises m bits, wherein m is an integer not lower than two and N is not lower than m. The Manchester M code series, which are actually transmitted, has a maximum value in the absolute value of auto-correlation, which is always greater than a maximum value in the absolute value of cross-correlation values between N Manchester code series irrespective of whether the auto-correlation or cross-correlation value itself changes due to noise signals or signal distortions.

For, the received signal, a correlation is formed between the received data and N different Manchester M series, thus producing N correlation outputs. The code of the received data comprising m bits is formed according to a comparison between the peak values of the N correlation outputs. On the transmitter side of the CSK communication system, the synthesized series which are spaced apart at a given interval is selected from the N Manchester M series according to m bit data and transmitted as a transmitted signal. The selection of the synthesized series depends on the code of the transmitted data which comprises m bits.

In one embodiment of the invention, a CSK signal transmitter for transmistting input m-bit binary data comprises a first to N-th Manchester M series generator which produces N Manchester M series of an equal code length wherein m is an integer not lower than two and N is not lower than m, and a synthesizer which transmits as a transmitted signal the synthesized series delivered from the first to N-th Manchester M series generator while selecting one of them dependent on the transmitted data comprising m bits. The synthesized Manchester M series which is actually transmitted has a maximum value in the absolute value of auto-correlation which is always greater than a maximum value in the absolute values of cross-correlations of N Manchester M series.

On, the receiver side, the received signal is compared against the same N Manchester M series as are used on the transmitter side, thereby producing N correlation outputs. The code of the received data comprising m bits is formed based on a comparison between the peak values of the correlation outputs. A corresponding CSK signal receiver comprises N pairs of correlators which compare a received signal against the same N Manchester M series as used on the transmitter side to thereby produce correlation outputs, and a demodulator circuit for forming the code of the received data, comprising m bits, based on a comparison between the peak values of the correlation outputs from the N pairs of correlators.

The term "M series", as used herein, is intended to refer to one of various code series generally produced by a shift register comprising a plurality of stages and a linear arithmetic circuit which has a maximum period. For an n-stage shift register, the length of the M series produced thereby will be $2^n-1$.

The term "Manchester code" refers to a code in which one period of a rectangular wave having a proper phase is provided for input binary code "1" while one period of a rectangular wave of the opposite phase is provided for input binary code "0".

The term "CSK (code shift keying)" refers to a signal modulation system in which a synthesized series having a maximum of $2^N$ and obtained by synthesizing N binary PN (pseudo-noise) code series inclusive of M code series and Manchester M code series and having an equal code length, corresponds to m-bit binary transmitted data, in which the synthesized series is actually transmitted in accordance with m-bit binary transmitted data, and in which the synthesized code series, which is actually transmitted, has a maximum value in the absolute value of auto-correlation which is always greater than a maximum value in the absolute values of cross-correlations between N PN code series.

The CSK communication system and method for spread spectrum communication according to the invention, which is based on the principle described above, is featured in a manner to be described below.

CSK COMMUNICATION SYSTEM FOR SPREAD SPECTRUM COMMUNICATION

A CSK communication system for spread spectrum communication according to a first aspect of the invention comprises means for producing a synthesized PN code series which is synthesized from a predetermined number (n) of PN code series which are selected from N PN code series in response to input data bits, defined by m bits, to be transmitted wherein m is an integer and N is not lower than m, and means for transmitting the synthesized PN code series thus produced onto a transmission medium, wherein the synthesized PN code series which is actually transmitted has a maximum value in the absolute value of auto-correlation which is always greater than a maximum value in the absolute value of cross-correlations between other synthesized PN code series. In this arrangement, the N PN code series may comprise N Manchester M series having a given period.

The CSK communication system as described above may additionally comprise receiving interface means on a receiver side for separating the synthesized PN code series which is transmitted through the transmission medium, and forming means for forming received data bits in response to the respective separated PN code series from the receiving interface means in a manner such that the received data bits have a code which corresponds to the code of m bits in the input data on which the code produced by the producing means for transmission through the transmission medium is based. The producing means may comprise a modulator for N series.

The forming means may comprise a demodulator circuit for N series, including N correlation means which separately form correlation between the separated PN code series and corresponding N Manchester M series to provide first to N-th correlation output signals, and a demodulator which demodulates the first to N-th correlation output signals to form corresponding received data bits. The demodulator circuit for N series may comprise a carrier detecting means which determines whether or not a carrier signal has been received.

The producing means may comprise N generating means for separately generating N Manchester M series, and synthesizing means for selectively switching a synthesized series in synchronism with the period of the N Manchester M series based on the code of m bits in the input data, the synthesized series being synthesized from the N Manchester M series generated as outputs from the generating means.

Alternatively, the forming means may comprise correlation means which form correlation between the separated respective transmitted code series and respective N Manchester M series separately so as to provide first to N-th correlation output signals, a demodulator for demodulating the first to N-th correlation output signals to form corresponding received data bits, and synchronization control means for synchronizing the first to N-th correlation means with data interval T which is equal to one period of the Manchester M series in response to the first to N-th correlation output signals.

The forming means may also comprise a carrier detecting means which detects a carrier in response to the first to N-th correlation output signals, thereby determining whether or not a carrier signal has been received.

The synchronization control means may comprise a peak position detecting means which detects peaks in the first to N-th correlation output signals, a peak position determining means for determining whether or not a detected peak lies in a given area within the data interval T, and a synchronization tracking means for operating in response to a negative determination by the determining means so as to establish a synchronization between the first to N-th correlation output signals and the data interval T.

The synchronization control means may also comprise synchronization failure determining means, including synchronization-failed indicator, for determining whether a carrier has not been detected over a given number of intervals, indicating to this effect in such an event as a failure of establishing a synchronization, and thus discriminating between a temporary failure of detection of a carrier which is attributable to a variation in the transmission characteristic of the transmission medium and a failure of detection of a carrier which is attributable to a termination of a communication.

The synchronization control means may also comprise synchronization tracking means which adjusts the length of the data interval, thereby bringing the peak positions which are detected in secession by the detecting means closer to the center of a given area within the data interval T.

A CSK communication system for spread spectrum communication according to a second aspect of the invention is directed to the structure of a CSK receiver in which a synthesized PN code is synthesized from N PN code series having an equal code length in a predetermined manner dependent on the code of m bits in transmitted data and in which a synthesized PN code series which is actually transmitted on a transmission medium has a maximum value in the absolute value of auto-correlation which is always greater than a maximum value in the absolute value of cross-correlations between N PN code series.

In accordance with the second aspect of the invention, the CSK receiver comprises receiving interface means for separating the code series which are transmitted through the transmission medium, and forming means for forming received data bits in response to the respective separated PN code series from the receiving interface means in a manner such that the received data bits have a code which corresponds to the code of m bits in the input data, on which the code produced by the producing means for transmission through the transmission medium is based. The N PN code series may comprise N Manchester M series having a given period.

The forming means may be implemented by a demodulator circuit for N series, including correlation means for forming a correlation between respective separated transmitted code series and N Manchester M series separately to provide first to N-th correlation output signals, and a demodulator for demodulating the first to N-th correlation output signals to form corresponding received data bits.

The demodulation circuit for N series may comprise a carrier detecting means which determines whether or not a carrier signal has been received.

Alternatively, the forming means may comprise a correlation means which forms a correlation between the respective separated transmitted code series and N Manchester M series separately to provide first to N-th correlation output signals, a demodulator for demodulating the first to N-th correlation output signals to form corresponding received data bits, and synchronization control means for synchronizing the first to N-th correlation means with a data interval T, which is equal to one period of the Manchester M series, in response to the first to N-th correlation output signals.

The forming means may comprise a carrier detecting means for detecting a carrier in response to the first to N-th correlation output signals, thereby determining whether or not a carrier signal has been received.

The synchronization control means may comprise peak position detecting means for detecting a peak in the first to N-th correlation output signals, peak position determining means for determining whether or not a detected peak lies in a given area within the data interval T, and synchronization tracking means for operating, responsive to a negative determination made by the determining means, to establish a synchronization between the first to N-th correlation output signals and the data interval T.

Additionally, the synchronization control means may comprise synchronization failure determining means for determining whether a carrier is not detected over a given number of data intervals, indicating to the effect that synchronization has failed to be established in such an event, and thus discriminating between a temporary failure of detection of a carrier which is attributable to a variation in the transmission characteristic of the transmission medium and a failure of detection of a carrier which is attributable to a termination of a communication.

The synchronization control means may also comprise synchronization tracking means for adjusting the length of the data interval, thereby bringing peak positions which are detected in succession by the detecting means closer to the center of a given area within the data interval.

CSK COMMUNICATION METHOD FOR SPREAD SPECTRUM COMMUNICATION

A CSK communication method for spread spectrum communication according to a third aspect of the invention comprises the steps of defining a predetermined number (n) of PN series which are selected from N PN code series in response to m bits to be transmitted in input data, and transmitting the defined n PN series onto a transmission medium. The N PN code series may comprise N Manchester M series having a given period.

The transmitting step may comprise a conversion of the defined code series, before transmitting the same onto the transmission medium, into a configuration which corresponds to the transmission medium.

The defining step may comprise the steps of separately producing N Manchester M code series, and selectively switching a synthesized series which is obtained by synthesizing N Manchester M series produced by the defining step in accordance with the code of m bits in the transmitted data, the switching step being in synchronism with the period of the N Manchester M code series.

The CSK communication method may also comprise the steps of receiving the transmitted code series as separated from the transmission medium, and forming received data bits having a code which corresponds to the code of m bits in the input data on which the transmitted code is based.

Also, the CSK communication method may additionally comprise the steps of forming a correlation between the respective separated transmitted code series and N Manchester M series to derive first to N-th correlation signals, demodulating the first to N-th correlation signals to form corresponding received data bits, and synchronizing the correlation forming step with a data interval T which is equal to one period of Manchester M series.

The forming step may comprise the step of detecting from the first to N-th correlation output signals whether or not a carrier signal has been received.

The synchronizing step may comprise the steps of detecting a peak in the first to N-th correlation output signals, determining whether or not a detected peak lies in a given area within the data interval T, and establishing a synchronization between the first to N-th correlation output signals and the data interval T in response to a negative determination rendered by the determining step.

The synchronizing step may also comprise the step of determining if a carrier is not detected over a given number (Y) of data intervals and indicating to the effect that a synchronization is not established in such an event to thereby discriminate between a temporary failure of detection of a carrier, which is attributable to a variation in the transmission characteristic of the transmission medium, and a failure of detection of a carrier, which is attributable to a termination of a communication.

The synchronizing step may also comprise the step of adjusting the length of the data interval to thereby bring the peak positions, which are detected in succession by the detecting step, closer to the center of the given areal within the data interval.

A CSK communication method for spread spectrum communication according to a fourth aspect of the invention is directed to a CSK communication method in which a synthesized PN code series is formed by synthesizing N PN code series having an equal code length in a predetermined manner dependent on the code of m bits in input data to be transmitted, and in which the synthesized PN code series is transmitted having a maximum value in the absolute value of auto-correlation which is always greater than a maximum value in the absolute value of cross-correlations between N PN code series.

In accordance with the fourth aspect of the invention, the method comprises the steps of receiving the transmitted code series by separating the same from a transmission medium, and forming received data bits having a code which corresponds to the code of m bits in the input data on which the transmitted code produced is based. The N PN code series may comprise N Manchester M series having a given period.

The CSK communication method of the fourth aspect may additionally comprise the steps of forming a correlation between the respective separated transmitted code series and N Manchester M series separately to derive first to N-th correlation output signals, demodulating the first to N-th correlation output signals to form corresponding received data bits, and synchronizing the correlation forming step with a data interval T which is equal to one period of the Manchester M series.

The step of forming received data bits may comprise the step of detecting, from the first to N-th correlation outputs, whether or not a carrier signal has been received.

The synchronizing step may comprise the steps of detecting peaks in the first to N-th correlation output signals, determining whether or not a detected peak lies in a given area within each data interval T, and establishing a synchronization between the first to N-th correlation output signals and the data interval T.

The synchronizing step may also comprise the steps of determining whether or not a carrier is not detected over a given number (Y) of data intervals, and indicating to the effect that synchronization is not established in such an event to thereby discriminate a temporary failure of detection of a carrier which is attributable to a variation in the transmission characteristic of the transmission medium and a failure of detection of a carrier which is attributable to a termination of a communication.

The synchronizing step may also comprise the step of adjusting the length of the data interval to thereby bring peak positions which are detected in succession by the detecting step closer to the center of the given area within the data interval.

With the CSK communication system and method for spread spectrum communication according to the invention, a strict coincidence between the Manchester M series on the receiver side and the Manchester M series on the transmitter side is not required because the received data ara determined by a statistical technique. Accordingly, a discrepancy in the Manchester M series cannot always give rise to an error in the data demodulation. In addition, an output from a correlator is delivered as an absolute value. Accordingly, if a degradation in a signal transmission characteristic of the signal transmission path occurs which results in a negative peak value in the transmission, substantially no error results.

The use of Manchester code M series results in a reduced amount of low frequency components in the received signal, thereby allowing a coupling loss in the signal transmission path to be reduced. This allows a power line having a high noise level in a low frequency band to be effectively used as a signal transmission path. Specifically, even if noise on the power line contain low frequency components over an extensive range, the communication system of the invention is scarcely influenced by the presence of such noise.

BRIEF DESCRIPTION OF THE DRAWINGS

FIG. 4 is a block diagram of a CSK communication system according to a first embodiment of the invention;

FIG. 8 is an illustration of a synthesizing operation of the synthesizer shown in FIG. 7;

FIG. 22 is a table illustrating the operation of an up/down counter shown in FIG. 21;

DESCRIPTION OF THE PREFERRED EMBODIMENTS

Referring to FIGS. 4 to 39, a few embodiments of the CSK communication system and method for spread spectrum communication according to the invention will be described below.

1. CSK modulation system

Figure 1:
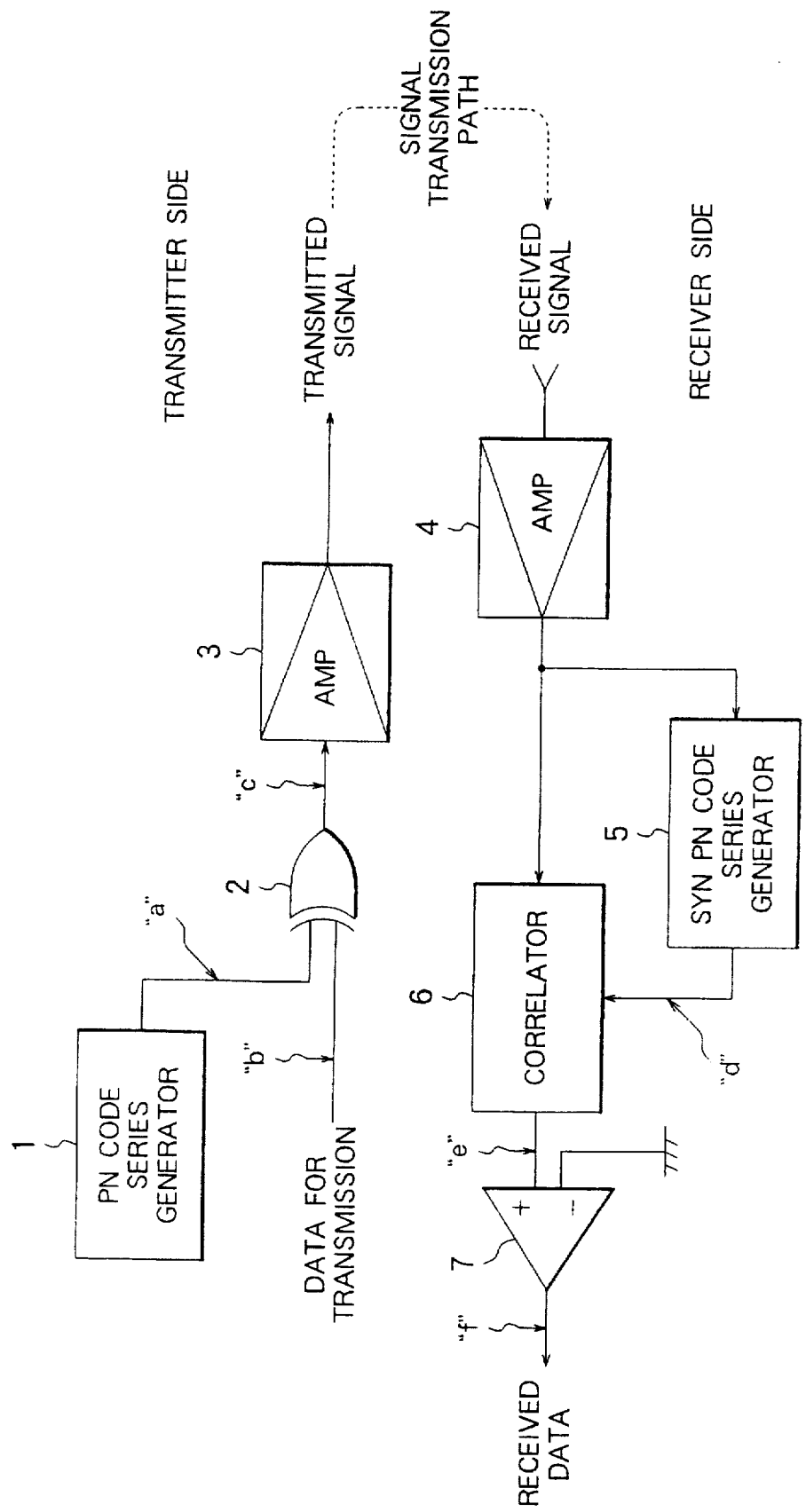
FIG. 1 is a block diagram of a conventional SS communication system.
Figure 2:
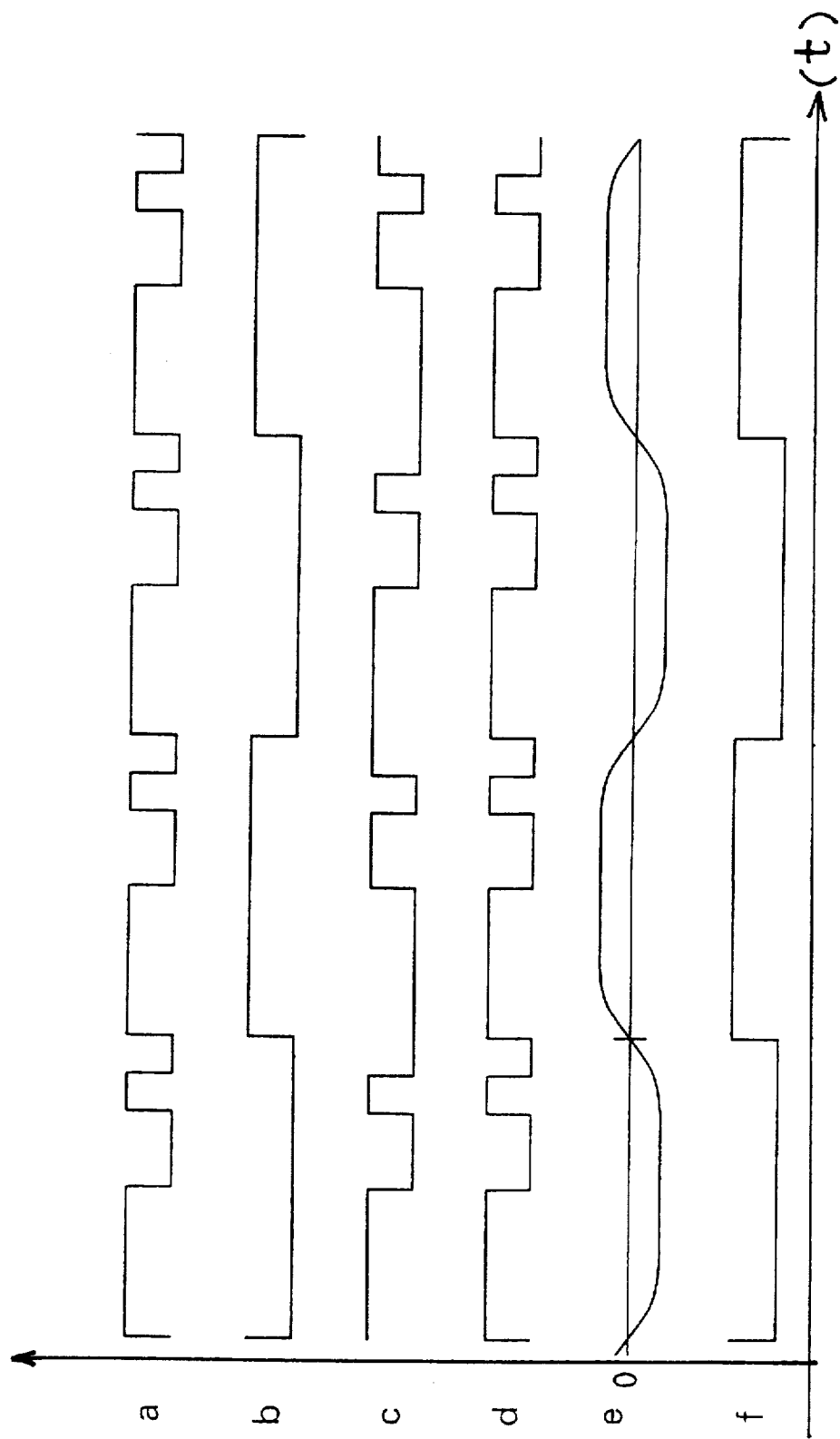
FIG. 2 is a timing chart of signal waveforms appearing at specified nodes within the conventional SS communication system shown in FIG. 1.
Figure 3A:
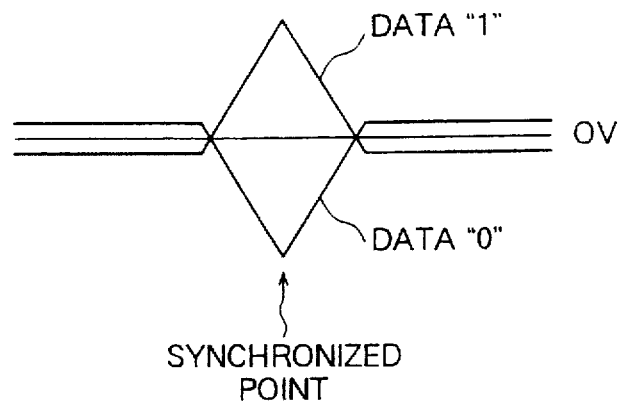
FIGS. 3A, 3B and 3C are signal waveform diagrams for illustrating a disadvantage involved in the conventional SS communication system.
Figure 3B:
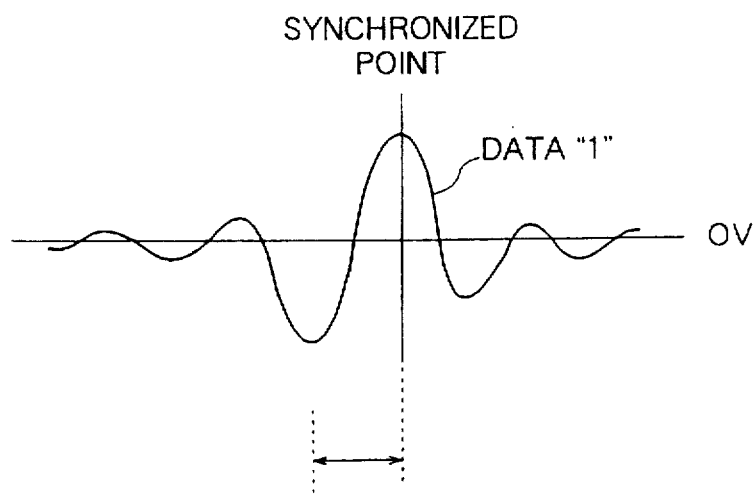
Figure 3C:
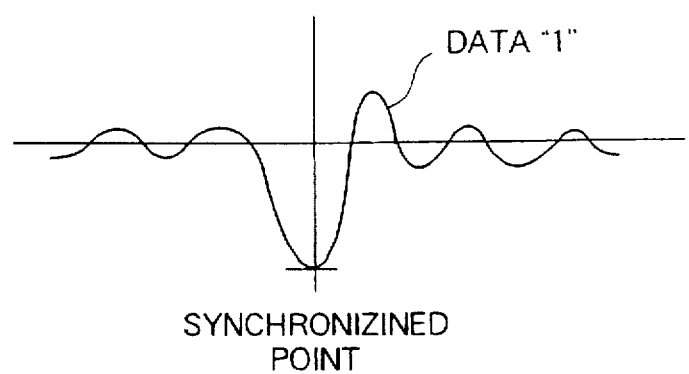
Figure 5:
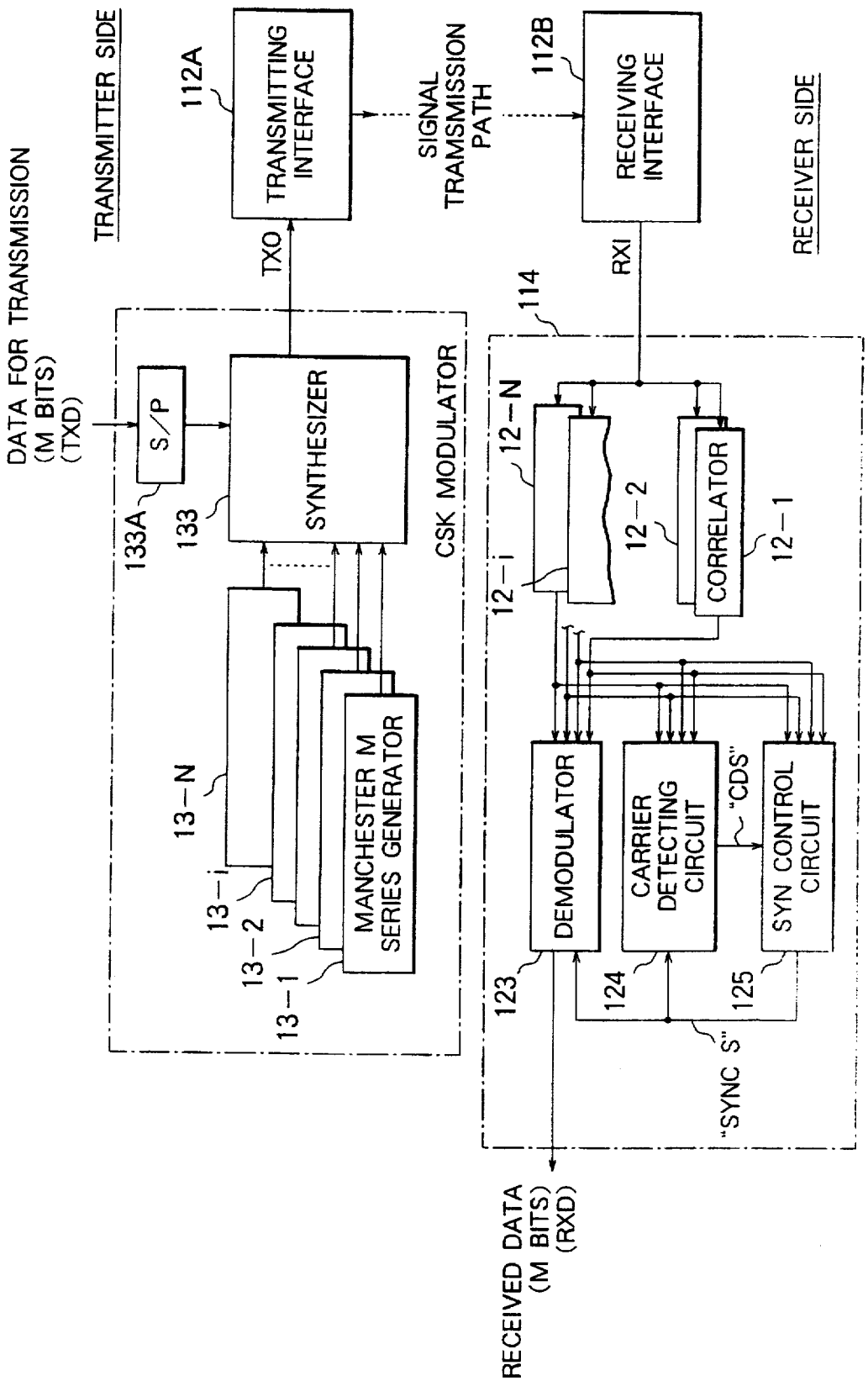
FIG. 5 is a block diagram of a CSK communication system according to a second embodiment of the invention.

FIGS. 4 and 5 illustrate two different system configurations for the SS communication system which implements a CSK modulation. These two systems are constructed on the basis of a fundamental concept of the invention which utilizes a plurality (N in number) of Manchester M series having an equal code length. A Manchester M series which is actually transmitted has a maximum value in the absolute value of auto-correlation which is always greater than a maximum value in the absolute values of cross-correlations between N Manchester M series.

First, a communication system shown in FIG. 4 will be described. FIG. 4 illustrates a general arrangement of a first embodiment of the communication system which incorporates a CSK system utilizing Manchester M series.

As shown in FIG. 4, the transmitter side of the system includes a modulator 11 for N series and a transmitting interface 12. Data "a" to be transmitted (TXD) is input to the modulator 11, which then delivers a synthesized series, obtained by synthesizing input data "a" with N PN (pseudo-noise) code series, as an output signal "b" (TXO). Data "a" to be transmitted comprises m binary bit signals (such as "1" and "0"). The modulator 11 delivers N synthesized series in accordance with the value of m digital data bits.

A construction of the modulator 11 in the CSK system is most simplified when N=2 and m=1. In this instance, the modulator 11 is formed as two series modulator and delivers a first series PN1 when the data "a" to be transmitted is "0", and delivers a second series PN2 when the data "a" to be transmitted is "1". The CSK system according to the invention is based on the number m of the data bits being not lower than two.

The output from the two series modulator 11 is delivered to a transmission path through the transmitting interface 12. As mentioned previously, the transmitting interface 12 performs a modulation of a carrier, thereby achieving a coupling with a power line when it is used as a power line communication. Generally, the transmitting interface 12 comprises a mechanism or means which is used for connection with a transmission medium.

On the other hand, a receiving interface 13 on the receiver side performs a demodulation of a carrier or an isolation of a signal from a power line in the case of a power line communication. The receiving interface 13 delivers a received signal "c" (RXI), which is supplied to N series demodulator (a two series demodulator if N=2 and m=1). The demodulator 14 delivers received data "e" (RXD) which corresponds to a binary code "0" or "1" of the transmitted data "a" (TXD). Simultaneously, it also delivers a carrier detection signal "f" whenever it has received a carrier signal.

Referring to FIG. 5, there is shown the general arrangement of a second communication system incorporating a CSK system which utilizes Manchester M series. On the transmitter side, there are a plurality (N in number) of Manchester M series generators 13-1 to 13-N, each of which generates mutually different Manchester M series having a given period. The N Manchester M series are equal in code length, and a Manchester M series which is actually transmitted has a maximum value in the absolute value of auto-correlation which is always greater than a maximum value in the absolute value of cross-correlations between M series in number N. Coded outputs from the generators 13-1 to 13-N are fed to a synthesizer 133.

Figure 6:
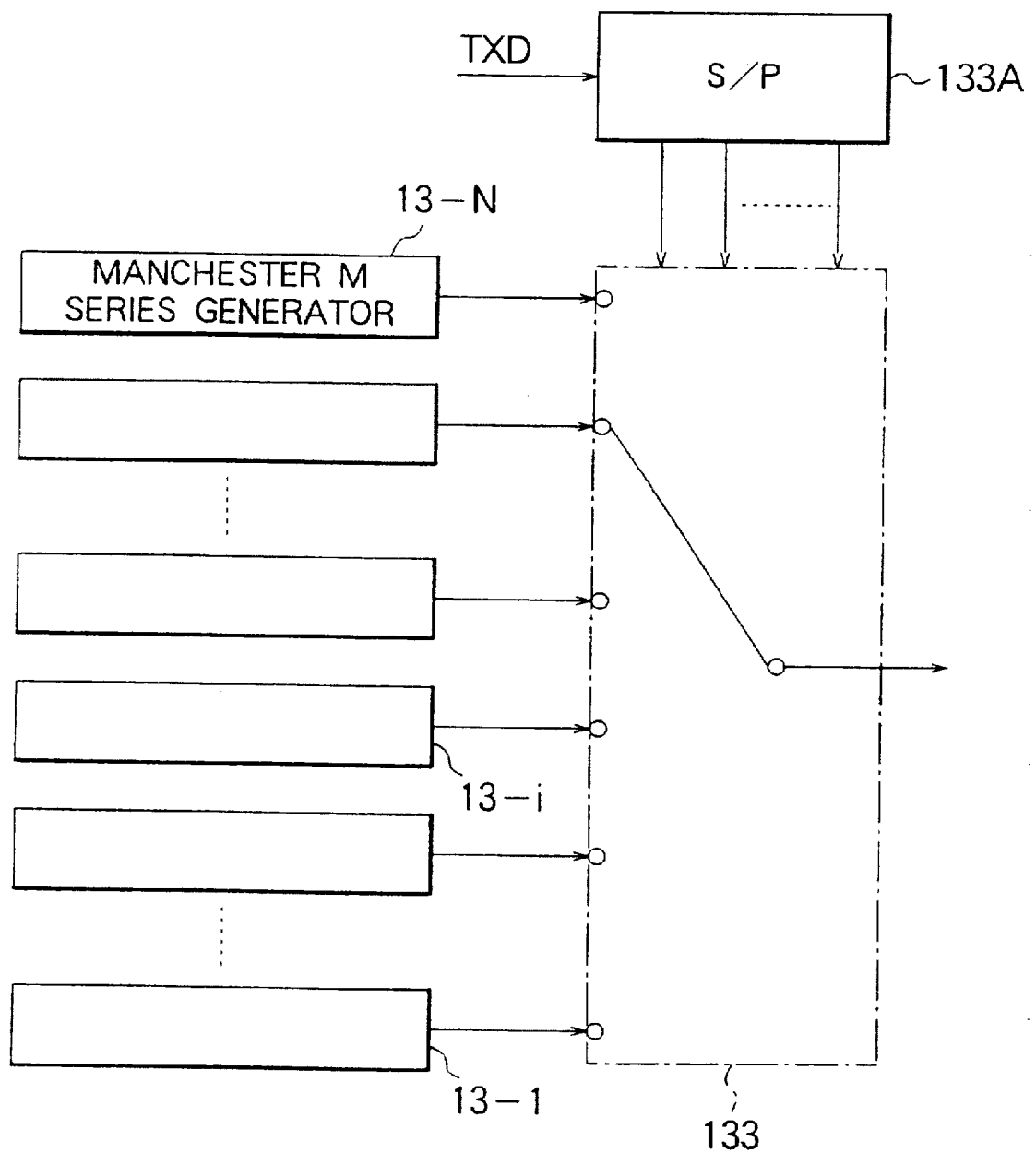
FIG. 6 is a circuit diagram of an example of the synthesizer shown in FIG. 5.
Figure 7:
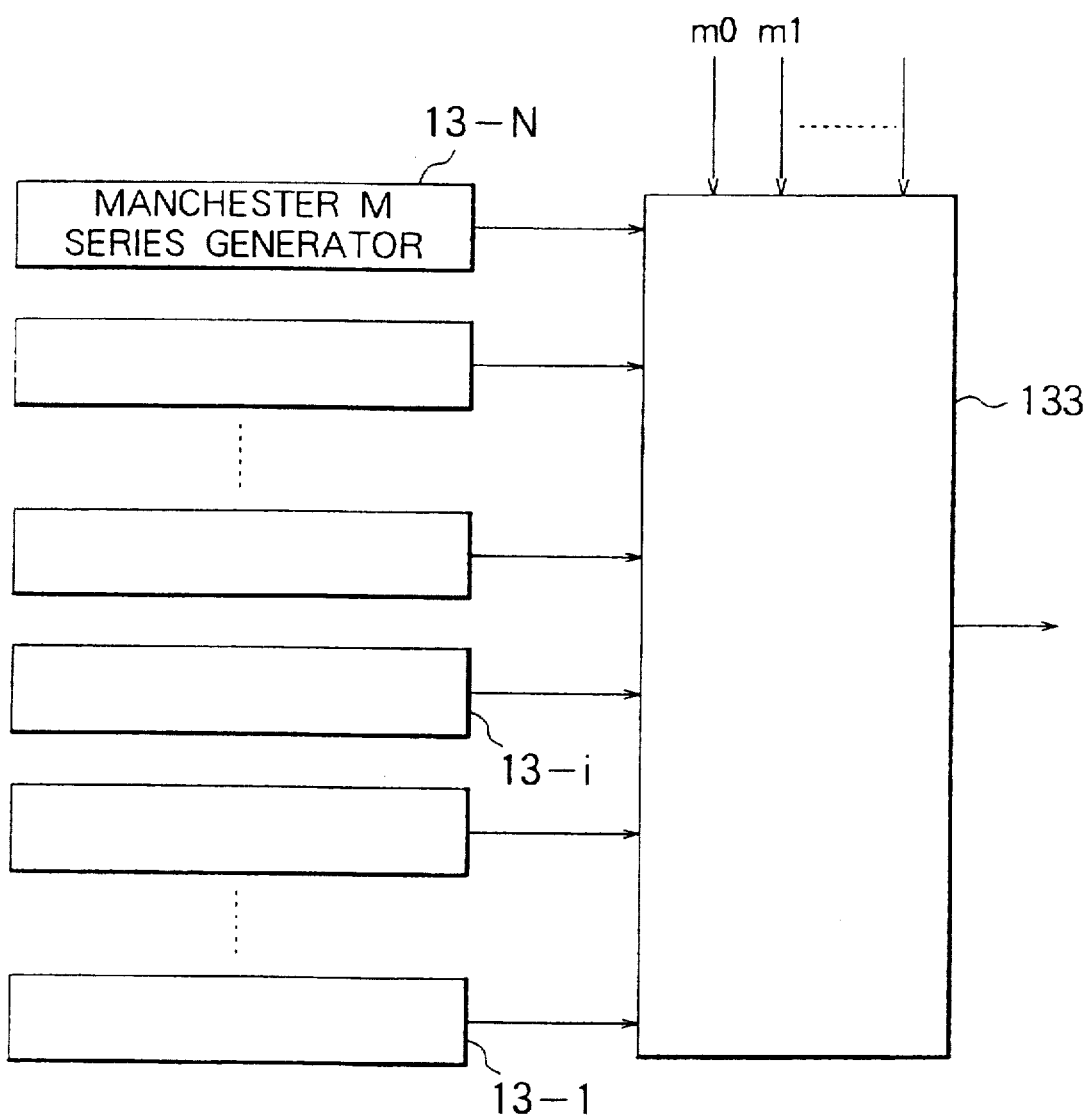
FIG. 7 is a circuit diagram of another modification of the synthesizer shown in FIG. 5.

The synthesizer 133 may comprise N-input/single-output selector as illustrated in FIG. 6, for example. The synthesizer 133 selectively delivers a specific input selected from N inputs supplied from the generators 13-1 to 13-N in accordance with the input data to be transmitted in the form of m binary bits (such as "1" or "0"), which are fed through a serial-parallel converter 133A. In this manner, one of N Manchester M series is selectively delivered without a substantial change. Accordingly, the synthesizer 133 itself does not synthesize different M series. However, it will be understood that such "selective" operation may be construed as one of "synthesizing" operation inasmuch as an output from the synthesizer 133 is considered as comprising a specific one of N Manchester M series, which is actually delivered, added with the remaining N−1 Manchester M series to which weight of zero is applied.

When the synthesizer 133 is formed by a selector in the manner mentioned above, the communication speed can be increased by a factor of N corresponding to the number of the generators 13-1 to 13-N, as compared when employing a single Manchester M code series as in a conventional CSK system. This will be understood from the fact that the serial-parallel conversion operation by serial-parallel converter 133A takes place on the basis of N bits rather than a single bit with respect to the input transmitted data TXD.

Alternatively, the synthesizer 133 may comprise an adder which selectively adds N Manchester M series together in response to the input transmitted data TXD in the form of m bits. For example, when N=3 (namely, series includes N1, N2 and N3) and m=3 (namely, data includes m1, m2 and m3 bits) eight different synthesized code series may be delivered including 0, N1, N2, N3, N1+N2, N1+N3, N2+N3 and N1+N2+N3 in response to eight values of the input transmitted data TXD from "000" to "111", as tabulated in FIG. 8.

Back to FIG. 5, the operation of the synthesizer 133 is synchronized with the period of Manchester M codes which are generated by the generators 13-1 to 13-N, and each data having a binary code, namely either "1" or "0", is represented by Manchester code series of one period. The coded output thus synthesized is transmitted as a transmitted signal TXO, which is supplied to a signal transmission path or medium through a transmitting interface 112A.

When adders are employed to form the synthesizer 133, a maximum of $2^N$ synthesized series can be delivered on the basis of N Manchester M series. In this instance, a transmission speed which is increased by a factor of 2N can be achieved as compared with the factor of N obtained by the synthesizer 133 constructed by the selector which delivers N synthesized series.

In the switching or a selection applied to N different Manchester M code series, which one of synthesized series is to be selected depends on the binary code of m bits in the input data TXD for transmission. Accordingly, this modulation system is referred to as "code shift keying (CSK) modulation system." In the CSK modulation system, PN code series other than Manchester M series can be also used.

On the receiver side, the system shown in FIG. 5 includes a receiving interface 112B which performs a demodulation of a carrier, an isolation or separation of a signal from a power line or A/D (analog-to-digital) conversion. The receiving interface 112B converts the signal which is received through the signal transmission medium into a received signal RXI in digital form. The receiver side also includes N correlators 12-1 to 12-N, a demodulator 123, a carrier detector circuit 124 and a synchronization control circuit 125.

The received signal RXI in digital form which is delivered by the receiving interface 112B is fed to first to N-th correlators 12-1 to 12-N. Manchester code M series which is generated by the generator 13-1, for example, is preloaded in the first correlator 12-1, and is correlated with the received signal RXI. Namely, a Manchester code M series generated by generator 13-i ($1 \leq i \leq N$) is preloaded in i-th correlator 12-i, and is correlated with the received signal RXI. Correlation outputs from the correlators 12-1 to 12-N are fed to the demodulator 123 where a demodulated signal comprising m binary signal bits is selected in accordance with the input correlation values and is delivered as received data RXD. Specifically, if a particular correlator 12-i has a correlation output having a peak value which exceeds a given level, a corresponding Manchester M series generator 13-i on the transmitter side is specified, which in turn allows input transmitted signal RXI, which caused such generator output to be selected to be specified. For example, when N=2, if a first correlator 12-1 has a correlation output, the peak value of which is greater than that of the correlation output of the second correlator 12-2, received data "0" is delivered from the demodulator 123. Conversely, if a correlation output from the second correlator 12-2 has a peak value, which is greater than that of the correlation output of the first correlator 12-1, received data "1" is delivered from the demodulator 123.

Correlation outputs are also fed to the carrier detector circuit 124 and the synchronization control circuit 125. The carrier detector circuit 124 is operable to detect the presence or absence of a carrier from the received correlation output, and delivers a carrier detection signal (CDS) as an output, which is fed to the synchronization control circuit 125. The presence or absence of a carrier is used in determining whether or not received data RXD has actually been received. If the carrier is detected, the synchronization control circuit 125 forms a synchronizing signal (Sync S) which is applied to the demodulator 123 and the carrier detector circuit 124 for the purpose of demodulation and carrier detection.

In the manner as described above, in the CSK communication system of FIG. 5, a pair of correlation outputs are subjected to a comparison on the receiver side in order to determine whether the received data represents "0" or "1" in accordance with a difference detected as a result of the comparison. Accordingly, it is not necessary that the Manchester M series on the receiver side be strictly synchronized with the Manchester M series on the transmitter side, and even in such an instance, the data can be demodulated substantially without an error.

When an output from the correlator 12-i is used in the form of an absolute value, substantially no error is caused even if the signal transmission path has an inverting action upon the transmission signal to change the peak value into a negative one. In addition, the Manchester M series allows low frequency components in the received signal to be reduced, which is effective in significantly suppressing a coupling loss associated with the signal transmission path.

2. Transmitter side

Figure 9:
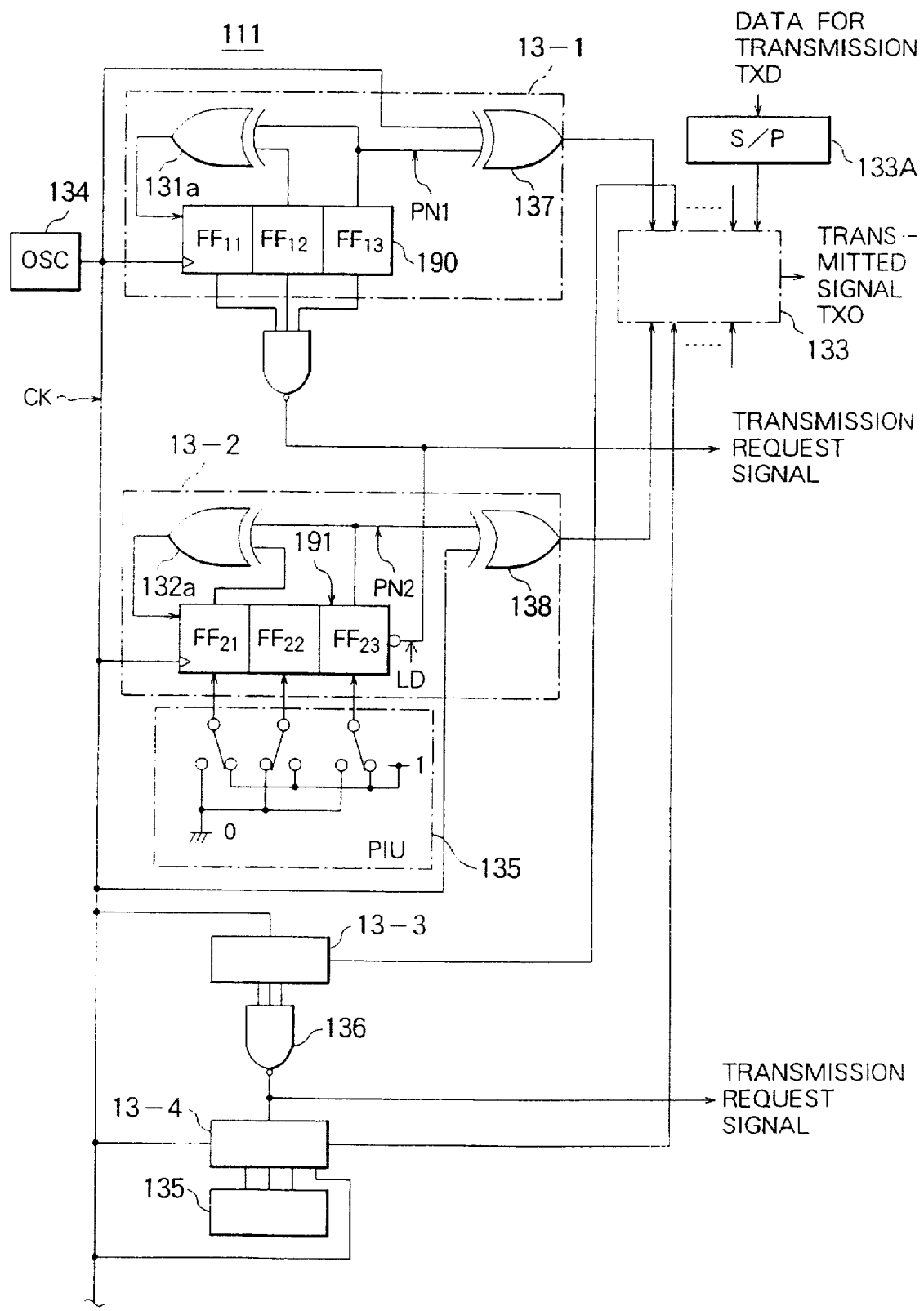
FIG. 9 is a block diagram of an example of the CSK modulator shown in FIG. 5.
Figure 10:
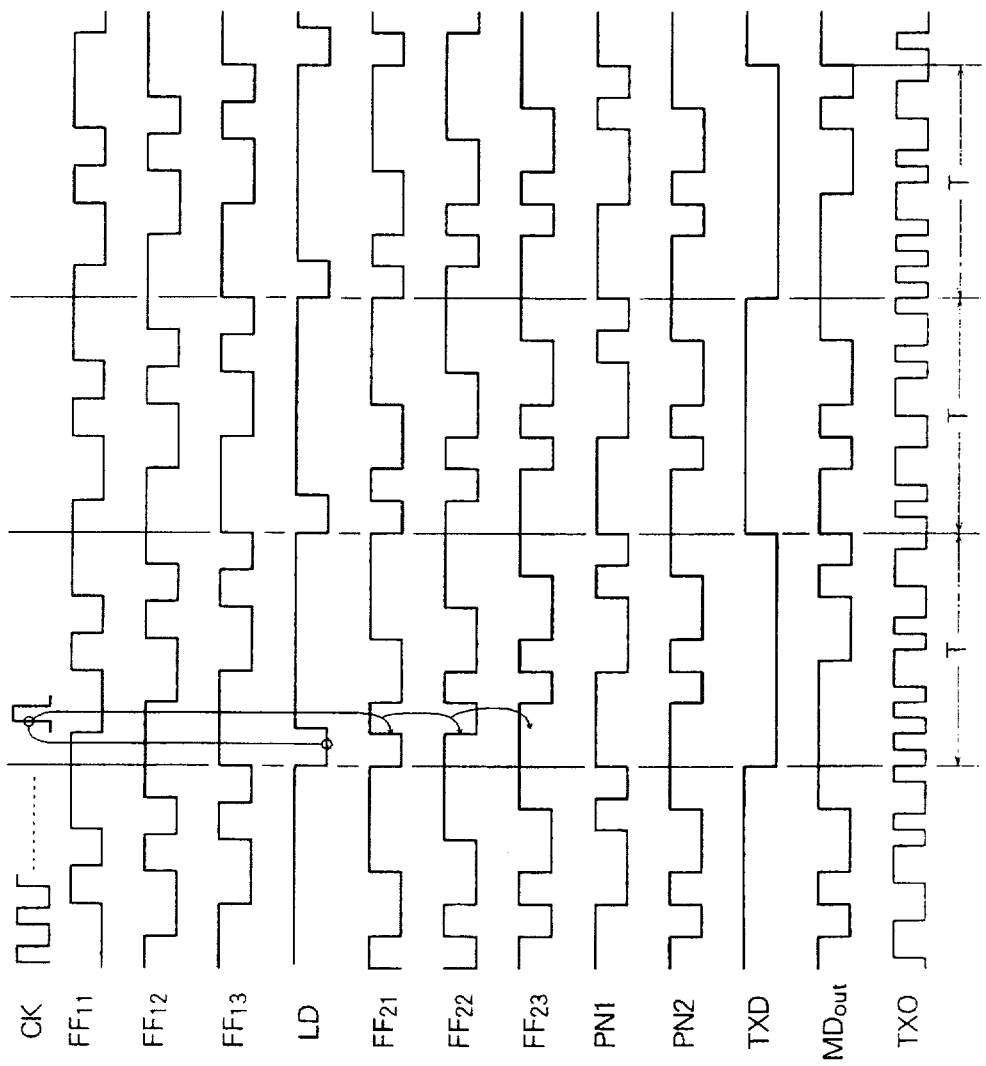
FIG. 10 is a timing diagram of signal waveforms appearing at specified nodes within the CSK modulator shown in FIG. 9.

FIG. 9 shows an example of the CSK modulator 111 shown in FIG. 5, while FIG. 10 is a timing chart of signal waveforms appearing at specified nodes in the CSK modulator shown in FIG. 9. The operation of the CSK modulator according to an embodiment of the invention will now be described with reference to these Figures.

As shown in FIG. 9, N Manchester M series generators 13-1 to 13-N in the CSK modulator 111 are arranged so that two adjacent generators 13-i, 13-i+1 (where i represents an odd number) form a pair. Each of the pair of generators 13-i and 13-i+1 includes a shift register 190 or 191 having three stages (n=3). By way of example, the first generator 131 has a shift register 190 including shift stages $FF_{11}$, $FF_{12}$ and $FF_{13}$, and the shift register 191 of the second generator 13-2 includes shift stages $FF_{21}$, $FF_{22}$ and $FF_{23}$. Each of the shift registers 190 and 191 operates to shift data at a timing determined by a clock signal CK produced by a clock signal generator (OSC) 134.

It is to be noted that the shift register 190 (including $FF_{11}$ to $FF_{13}$) and the shift register 191 (including $FF_{21}$ to $FF_{23}$) have different feedback circuits. Specifically, the shift register 190 feeds back outputs from the second stage FF12 and the third stage FF13 to the input stage FF11 through an exclusive OR (EX-OR) circuit 131a while the shift register 191 feeds back outputs from the input stage FF21 and the third stage FF23 to the input stage FF21 through an exclusive OR (EX-OR) circuit 132a.

Combinations of the shift registers 190 and 191 and these feedback circuits form together M series generators (PN code generators). The clock signal CK is fed to an exclusive OR circuit 137 together with a coded output from the final stage FF13 of the shift register 190 while a coded output from the final stage FF23 of the shift register 191 is fed to an exclusive OR circuit 138 together with the clock signal CK, whereby a Manchester M series is formed.

The CSK modulator 111 includes a phase synchronizing circuit formed of a phase initializer unit (PIU) 135 and NAND circuit 136, the arrangement being such that when the Manchester M series generator 13-i is at a given phase (all "1", for example), the Manchester M series generator 13-i+1 is at its given phase (initial phase). The phase initializer unit 135 is set to an initial code through the shift stages $FF_{21}$ to $FF_{23}$ of the shift register 191, and the unit 135 can be set to any code (exclusive of all "0"). When all the shift stages $FF_{11}$ to $FF_{13}$ of the shift register 190 is "1" (which occurs once per period T of the Manchester M series), an output from the NAND circuit 136 is at its low level. When the clock signal CK rises for the next time, the code which is set by the phase initializer unit 135 is loaded into the shift stages FF21 to FF23 of the shift register 191.

Outputs from the Manchester M series generators 13-i and 13-i+1, or outputs from the exclusive OR circuits 137 and 138, are fed to the synthesizer 133, which operates at the period of the Manchester M series (or the data interval) T with the assistance of the transmitted data TXD. An output from NAND circuit 136 is fed to a data processor, such as a microcomputer, as a transmission request signal. Each time the transmission request signal is fed to a data processor, the latter delivers the transmitted data TXD in the form of m bits to the synthesizer 133.

Figure 11:
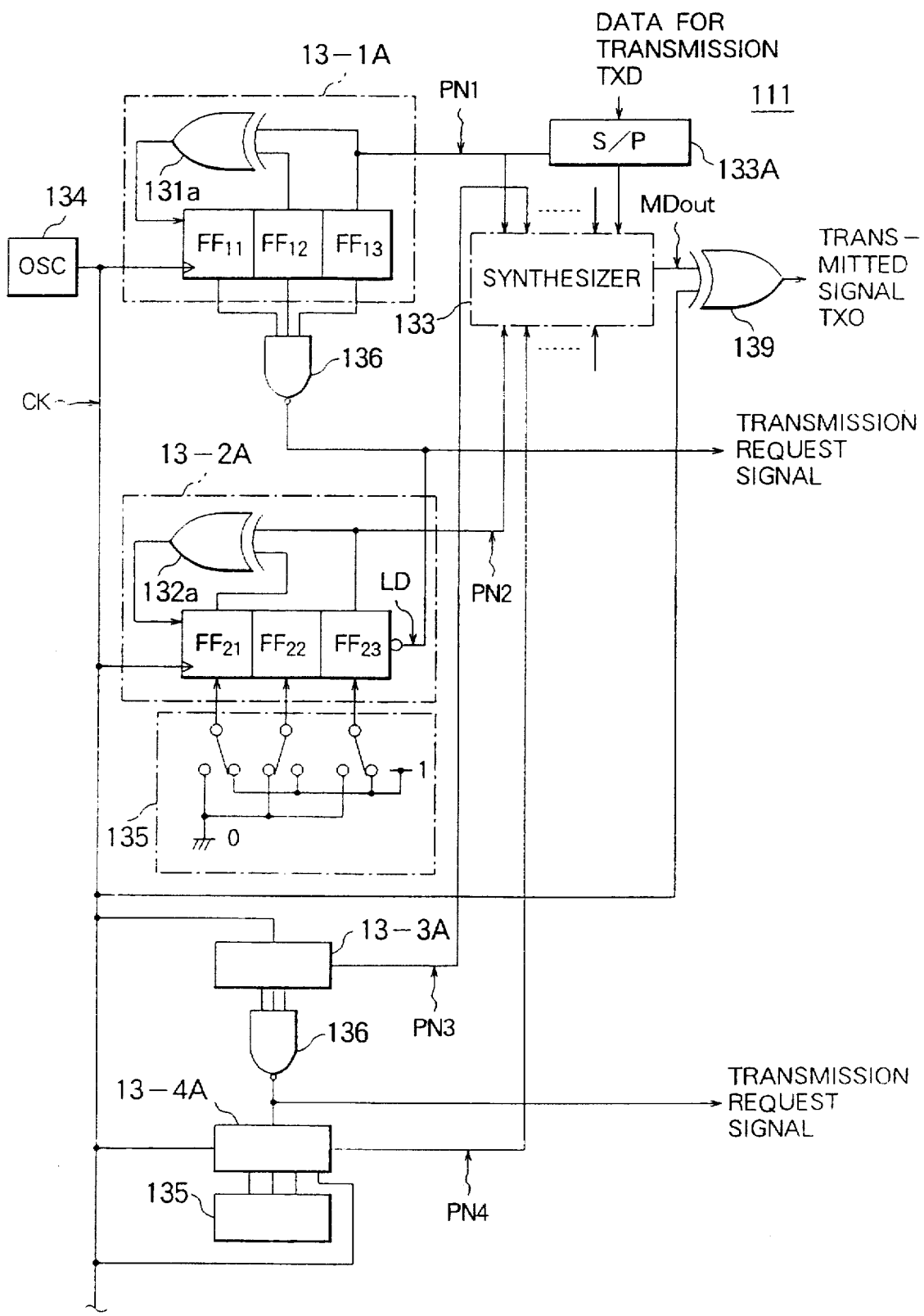
FIG. 11 is a block diagram of a modification of the CSK modulator shown in FIG. 9.

FIG. 11 shows another example of the CSK modulator. In contrast to the CSK modulator shown in FIG. 9, the CSK modulator 111 shown in FIG. 11 does not contain exclusive OR circuits 137 and 138 within each of the Manchester M series generators 13-iA and 13-(i+1)A. Instead, an exclusive OR circuit 139, which receives a modulated output MDout from the synthesizer 133 and a clock signal CK, is connected to the output of the synthesizer 133 so as to deliver Manchester M series. The outputs from the Manchester M series generators are represented by codes in the final stages of the shift registers, which are fed to the synthesizer 133. The synthesizer 133 switches the outputs from N Manchester M series generators 13-1A to 13-NA at a data interval in accordance with the code of m bits of the transmitted data TXD.

A one-clock latch circuit may be connected to the output of the synthesizer 133 shown in FIG. 9 or to the output of the exclusive OR circuit 139 shown in FIG. 11 to shape the waveform of the transmitted signal TXO.

Figure 12:
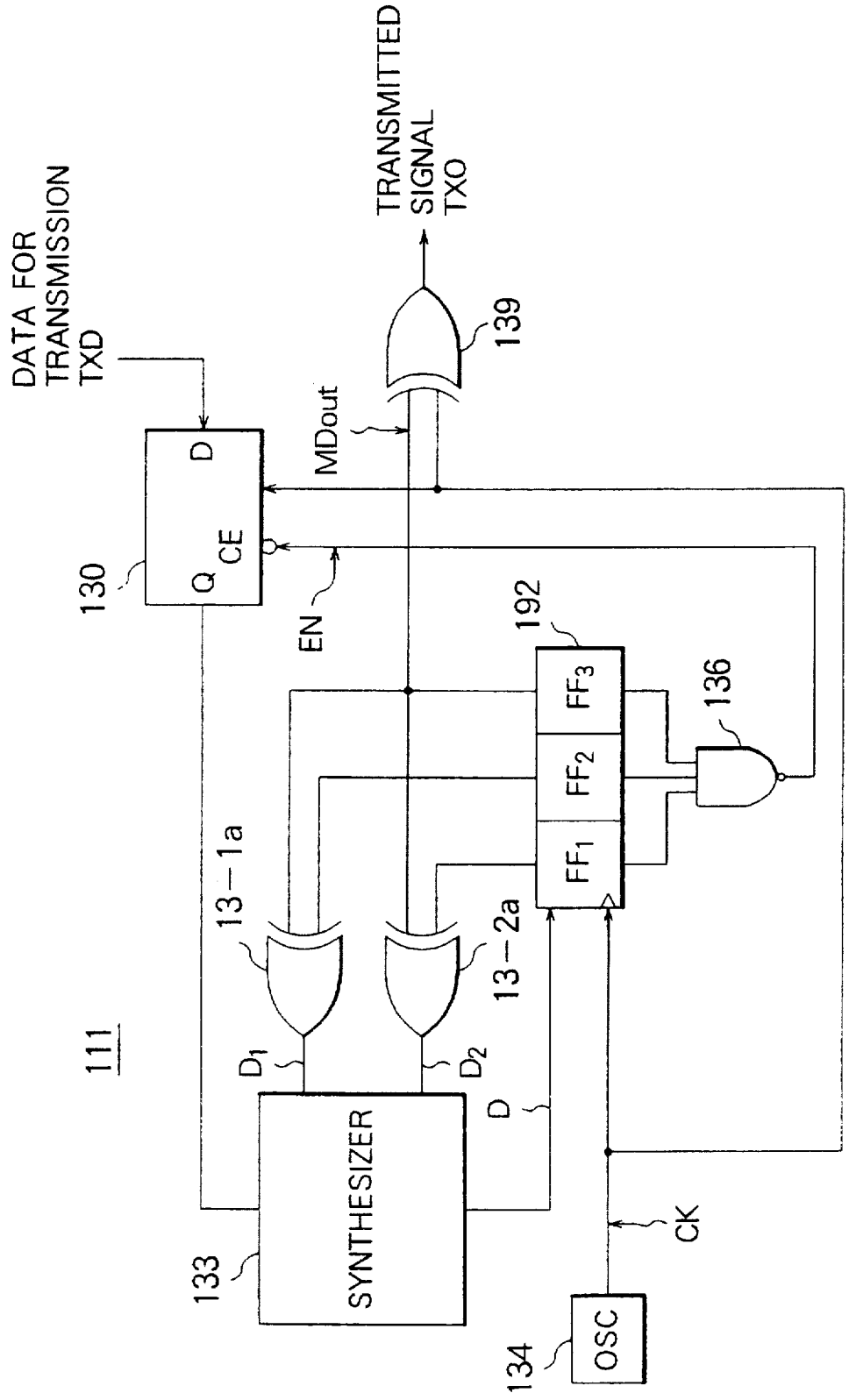
FIG. 12 is a block diagram of another modification of the CSK modulator shown in FIG. 9.
Figure 13:
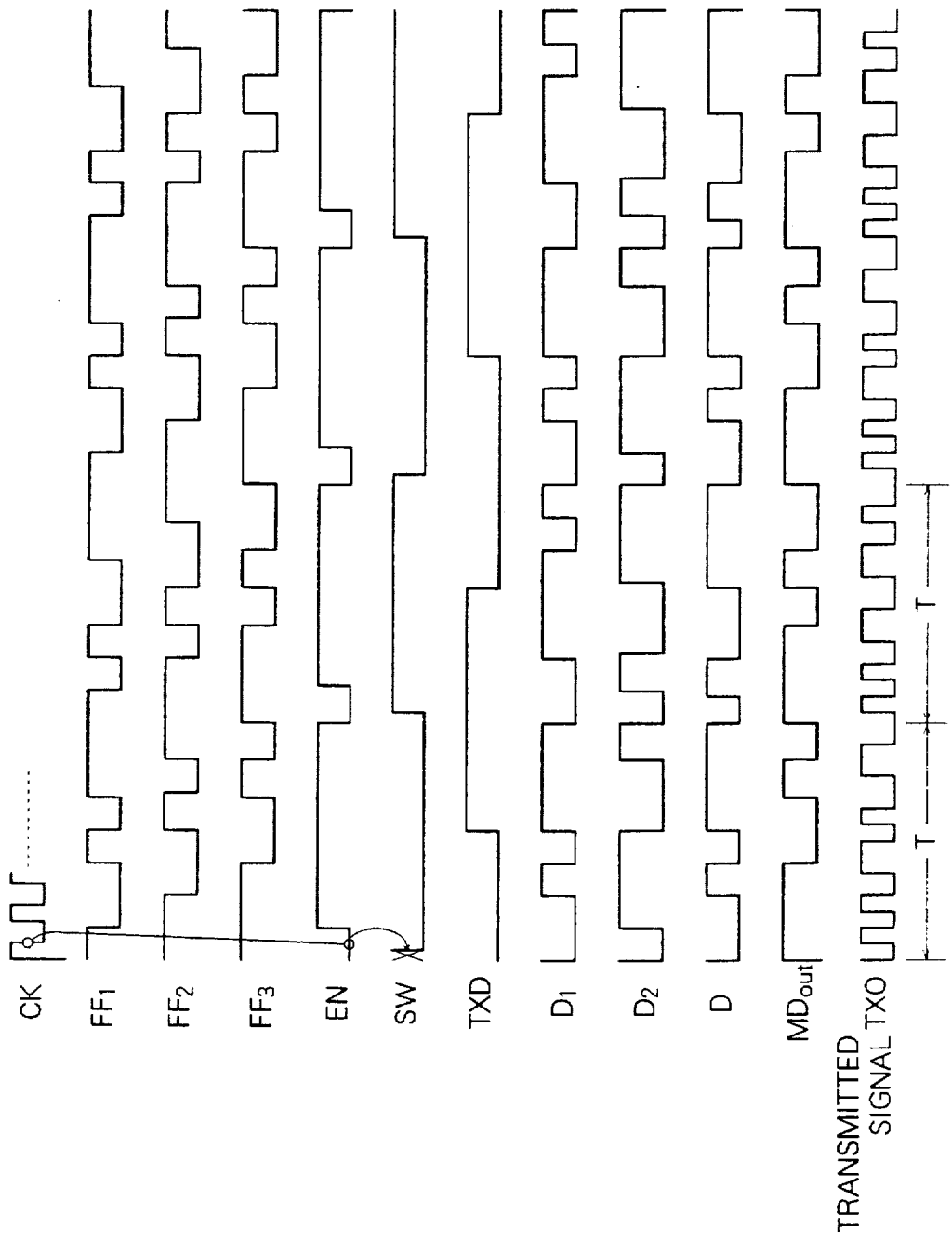
FIG. 13 is a timing chart of signal waveforms appearing at specific nodes within the CSK modulator shown in FIG. 12.

FIG. 12 shows a further example of the CSK modulator, and FIG. 13 is a timing chart of signal waveforms appearing at specified nodes within the CSK modulator of FIG. 12. In the CSK modulator 111 shown in FIG. 12, Manchester M series generator comprises a shift register 192 having a plurality of shift stages, a feedback circuit connected to the shift register 192, and an exclusive OR circuit which receives an output from the shift register 192 and a clock signal supplied from a clock signal generator 134, whereby a number of exclusive OR circuits is reduced to 1. For purpose of illustration, the CSK modulator 111 is shown assuming that N=2 and m=1. A first Manchester M series generator comprises a shift register 192 including shift stages FF1, FF2 and FF3, an exclusive OR circuit 13-1a which represents a feedback circuit, and an exclusive OR circuit 139 which forms a Manchester code.

A second Manchester M series generator comprises a shift register 192 (FF1, FF2, FF3), an exclusive OR circuit 13-2a which forms a feedback circuit, and the exclusive OR circuit 139 which delivers a Manchester code. The shift register 192 is common to the both Manchester M series generators, as is the exclusive OR circuit 139. In other words, the shift register 192 and the exclusive OR circuit 13-1a form in combination a first M series generator while the same shift register 192 and the exclusive OR circuit 13-2a form in combination a second M series generator. A combination of the first M series generator and the exclusive OR circuit 139 defines a first Manchester M series generator while a combination of the second M series generator and the exclusive OR circuit 139 defines a second Manchester M series generator.

A feedback circuit or the exclusive OR circuit 13-1a operates to provide a feedback connection between the outputs from the second stage $FF_2$ and the third stage $FF_3$ of the shift register 192 and the input stage $FF_1$ while the exclusive OR circuit 13-2a operates to provide a feedback connection between the outputs from the input stage $FF_1$ and the second stage FF2 of the shift register 192 and the input stage $FF_1$.

It will be noted that the feedback circuits of the two Manchester M series generators are different from each other. The synthesizer 133 is connected to the feedback circuit, whereby outputs D1 and D2 from the exclusive OR circuits 13-1a and 13-2a are fed to the synthesizer 133, which is formed by a two-input/single-output selector. An output from the synthesizer 133 is fed to the input stage FF1 of the shift register 192.

The synthesizer 133 operates in accordance with the binary data TXD for transmission, specifically whether it represents "1" or "0", in response to a Q-output of D-flipflop circuit 130 within the period of the Manchester code M series or at the data interval. An output clock signal from a clock signal generator 134 is fed to the shift register 192 to control the shift operation of the shift register 192, and is also fed to the D-flipflop circuit 130.

When all the stages $FF_1$, $FF_2$ and $FF_3$ of the shift register 192 contain "1" (which occurs once for every period T), an output from NAND circuit 136 is set to its low level, which output is fed to D-flipflop circuit 130 as an enable signal EN. Accordingly, when the enable signal EN is at its low level, the D-flipflop circuit 130 can receive the input data TXD for transmission at the falling edge of the clock signal, and feeds the data TXD to the synthesizer 133 as a control signal.

The feedback circuit of the Manchester M series generator (either first or second generator) is closed in response to a switching operation of the synthesizer 133, and the output MDout of the M series generator (specifically, the output from the final stage of the shift register therein) for which the feedback circuit is closed is fed to the exclusive OR circuit 139. The clock signal CK is fed to the exclusive OR circuit 139. In this manner, the output MDout of the M series generator is converted into a Manchester code, which is then delivered as a transmitted signal TXO.

If desired, an output from NAND circuit 136 may be fed to a data processor, such as a microcomputer, as a transmission request signal, allowing the data processor to produce the next one bit in the transmitted data TXO. Also, a one-clock latch circuit may be connected to the output of the exclusive OR circuit 139 to shape the waveform of the transmitted signal TXO.

3. Receiver side

Figure 14:
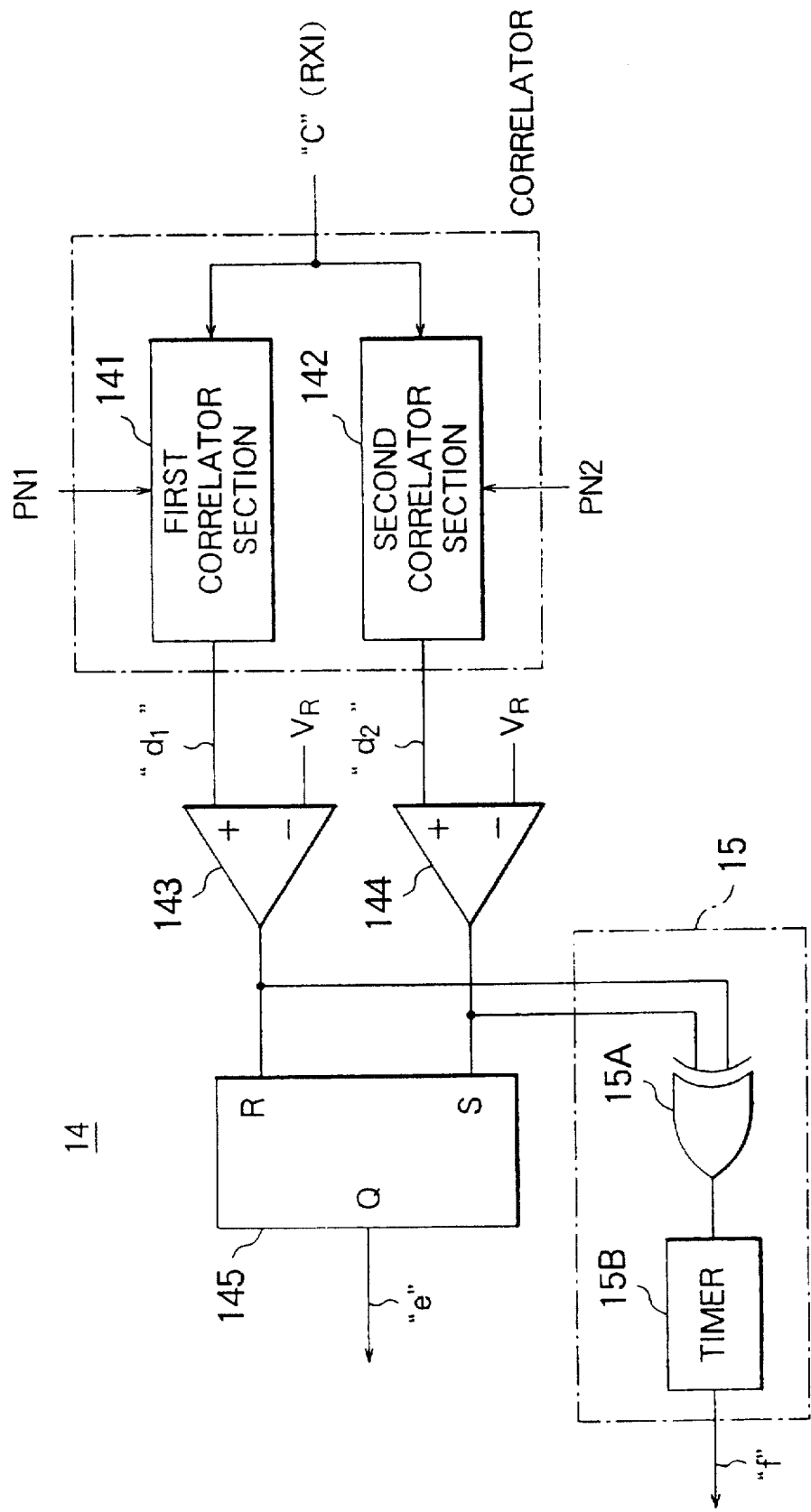
FIG. 14 is a block diagram of a modulator in which the N series modulator on the transmitter side shown in FIG. 4 is designed for two series.
Figure 15:
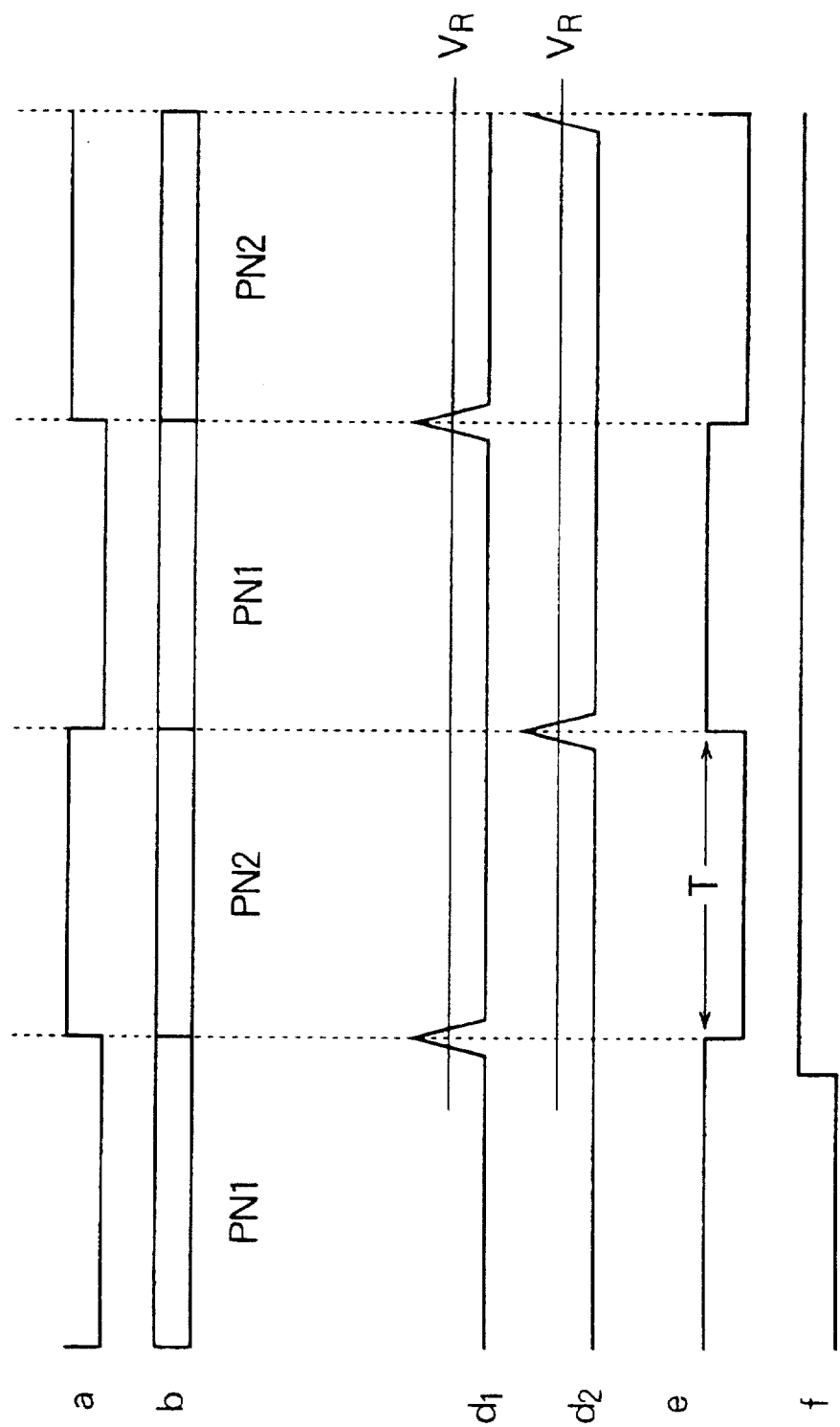
FIG. 15 is a timing chart showing a relationship among transmitted data, two series on the transmitter side and demodulated signal waveforms from the two series demodulator on the receiver side.

FIG. 14 shows an example of the demodulator 14 shown in FIG. 4, specifically illustrating its implementation by a two series demodulator. FIG. 15 is a timing chart of signal waveforms for signals "a", "b", "e", "f", "d1", and "d2" shown in FIGS. 4 and 14. Referring to these Figures, the two series demodulator 14 will be described.

In FIG. 14, a received and modulated signal "c" (RXI) is fed to a first correlator section 141, where the received signal "c" is correlated with a first series PN1, and also to a second correlator section 142, where the received signal "c " is correlated with a second series PN2. Correlation outputs "d1" and "d2" from the correlator sections 141 and 142 are then fed to comparators 143 and 144, respectively, where they are compared against a threshold VR. If the signal "c" is greater than the threshold VR, each of the comparators 143 and 144 delivers a pulse "1". The outputs of the comparators 143 and 144 are connected to R- and S-inputs, respectively, of an RS-flipflop 145. As shown in FIG. 14, the output from the comparator 143 is fed to the R-input while the output form the comparator 144 is fed to the S-input.

Since transmitted data "0" corresponds to the first series PN1, it will be seen that the RS-flipflop 145 is arranged such that the flipflop 145 is reset when the received signal "c" is the first series PN1 (and the output from the flipflop 145 is equal to "0") while the flipflop 145 is set when the received signal "c" is second series PN2 (and the output of the flipflop 145 is equal to "1").

The waveforms of the correlation outputs "d1" and "d2" and the demodulated data "e" from the RS-flipflop 145 on the receiver side are illustrated in FIG. 15. It will be apparent from this Figure that a peak of the correlation is located at the end of the respective periods.

A carrier detector circuit 15 in FIG. 14 includes an OR circuit 15A and a timer 15B. The carrier detector circuit 15 delivers a signal "f" whenever no carrier signal is received. The outputs from the comparators 143 and 144 are fed to the timer 15B through the OR circuit 15A. The timer 15B is set by an output pulse from the OR circuit 15A, and delivers a signal "f" which remains at "1" for a given interval, followed by "0" after the termination of such interval. This given interval is selected to be longer than the period T of the PN code (See FIG. 15). Accordingly, if there is one correlation output during the given interval, the signal "f"

remains to be "1", and if the correlation output does not exist after the given interval has passed, the signal "f" is at "0", and the existence of a carrier is not detected.

With the two series demodulator 14 as described above, received data "1" or "0" can be derived by merely a detection of synchronization and starting of the RS-flipflop 145. This makes a contrast to the system illustrated in FIG. 4 where the received data "0" or "1" is formed as a correlated waveform resulting from a received and modulated signal. It is for this reason that the phase of the PN code on the receiver side be strictly synchronized with the PN code on the transmitter side. If an absolute value of a correlator output is used, there will be substantially no occurrence of an error during the data demodulation.

It will be noted that the two series demodulator 14 shown in FIG. 14 comprises a correlator, where a received signal is correlated by correlator sections 141 and 142 with PN1 and PN2 codes which are delivered by two PN code generators outside the demodulator 14, a demodulator unit where data is demodulated in accordance with an output from the correlator, and a carrier detector circuit 15.

Figure 16:
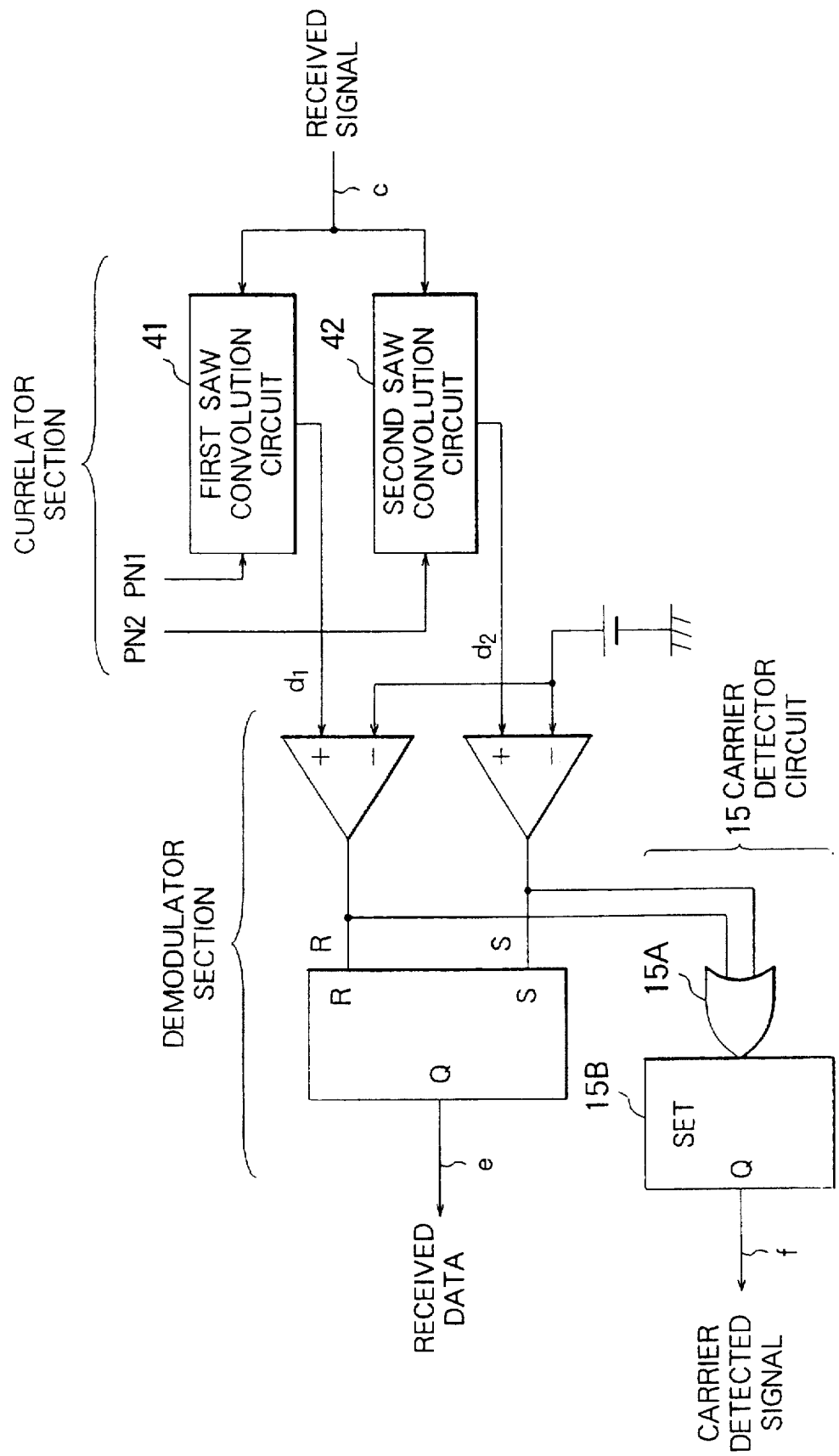
FIG. 16 is a block diagram of a modification of the demodulator shown in FIG. 14 which incorporates a SAW (surface elastic wave) convolution unit.

FIG. 16 shows another embodiment of the two series demodulator. In this embodiment, surface elastic wave (SAW) convolution units 41 and 42 are used. The circuit arrangement shown in FIG. 16 is substantially identical with that shown in FIG. 14 except for the SAW convolution units. Specifically, a first PN code corresponding to transmitted data which represents a binary code of "0" is correlated with PN1 in a first SAW convolution unit 41 while a second PN code corresponding to transmitted data which represents a binary code of "1" is correlated with PN2 in a second SAW convolution unit 42. Here, received signal "c" is an analog signal.

Figure 17:
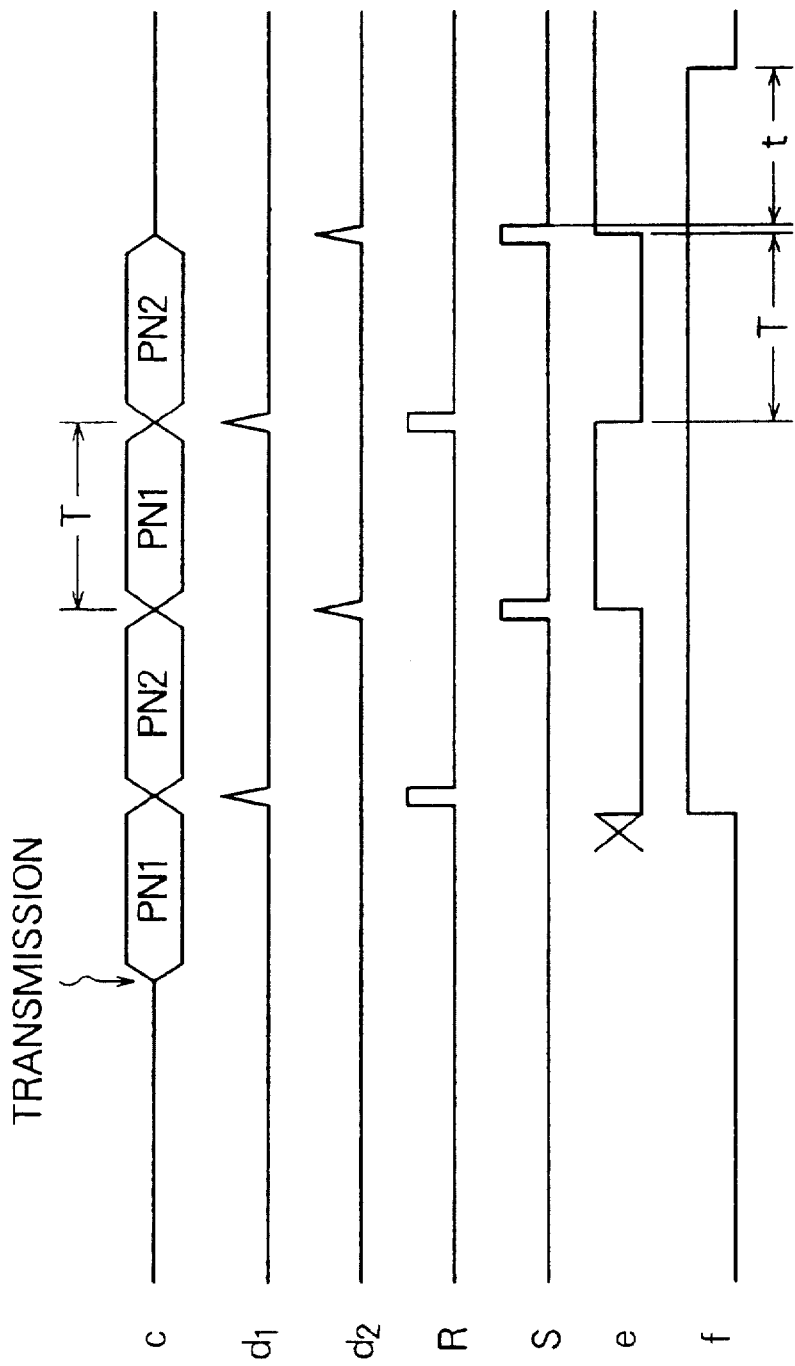
FIG. 17 is a timing chart of waveforms for transmitted data having a short length.

FIG. 17 illustrates signal waveforms occurring in the circuit shown in FIG. 16 in connection with four bits which constitute transmitted data. An output "f" from the carrier detector circuit 15 is reset to "0" at a time (t+T) elapsed since the timer 15B is set, where T represents one bit data interval and t>T.

Various examples of the correlator shown in FIG. 14 will now be described with reference to FIGS. 18 to 24. It is to be noted that in the following description of various examples of the correlator, an input data to a correlator shown in FIG. 18 is an analog signal while an input data to correlators shown in FIGS. 19 to 24 is a digital signal which may be obtained by conversion of an analog signal into a digital form.

Figure 18:
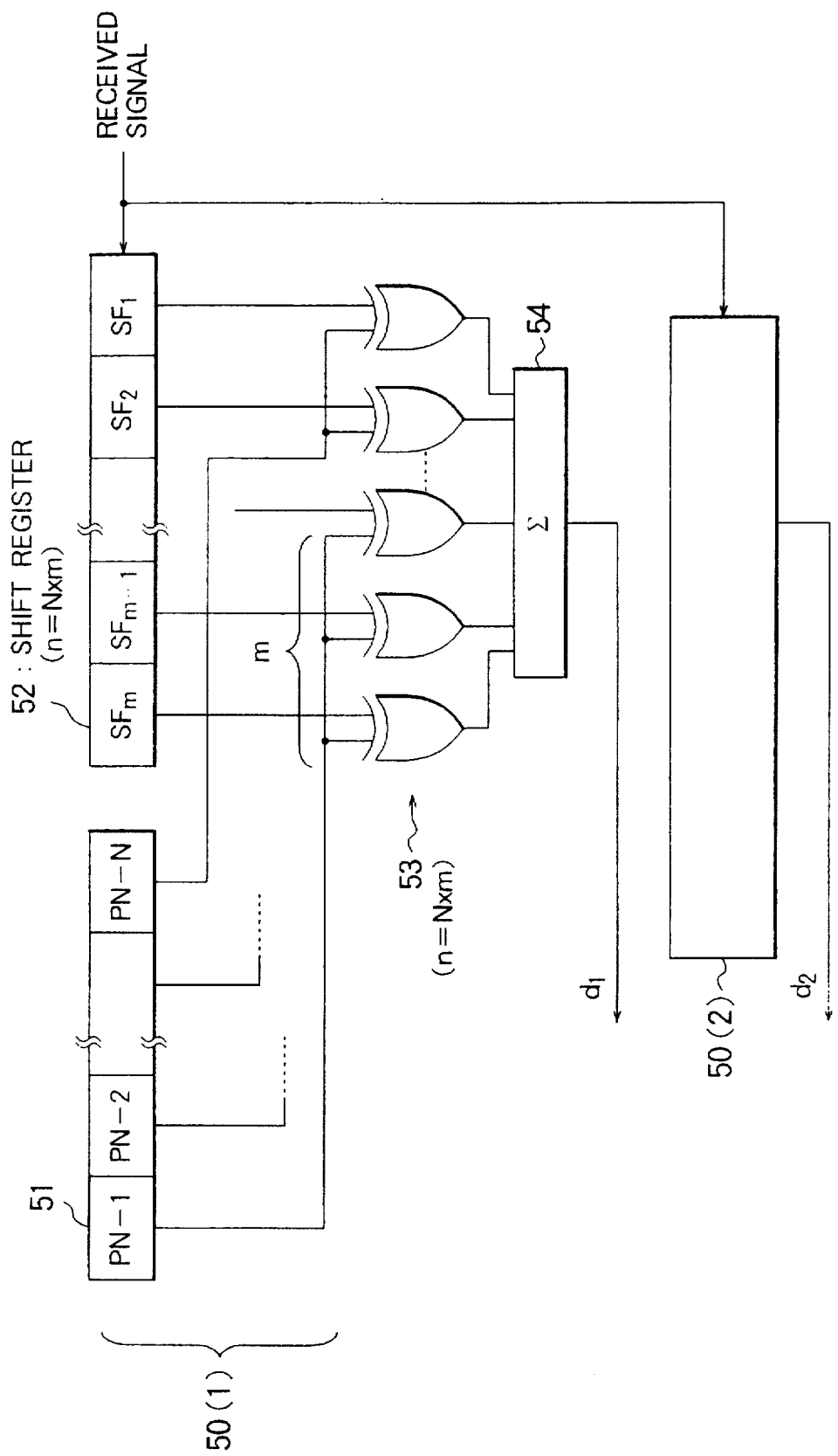
FIG. 18 is a block diagram of another modification of the correlator shown in FIG. 14.

In FIG. 18, a received signal is a digital signal, which is fed to a pair of correlator sections 50(1) and 50(2) in the correlator. Only the correlator section 50(1) is shown in detail, and it should be understood that the both correlators 50(1) and 50(2) are constructed in a similar manner.

A received signal is correlated with a first series PN1 in the correlator section 50(1), and is also correlated with a second series PN2 in the correlator section 50(2). A status pattern of the first series PN1 is fixed by and stored in a register 51. Accordingly, the number of stages of the first series PN1 is equal to the code length N. Such data pattern is represented as PN1-1, PN1-2, . . . PN1-N. The received signal is fed to a first shift register 52 where the content of the received signal is shifted from stage to stage. An output from each stage of the shift register 52 is supplied to one of the inputs of each of exclusive OR circuits contained in an EX-OR bank 53 including n(=N×m) exclusive OR circuits. All outputs of the EX-OR bank 53 are accumulated by an accumulator 54 which delivers a correlation output "d1".

In the example of FIG. 18, in order to improve the accuracy of the correlating operation, the shift register 52 includes n(=N×m) stages which allow each of m data bits to be correlated with N bits in the fixed data pattern for the first series PN1. A shift clock is multiplied by a factor of m.

It is possible to use a correlator for an analog received signal by substituting a delay line having n(=N×m) taps for the shift register 52, and substituting a bank of multipliers for the bank of exclusive OR circuits 53 and providing an analog adder in place of the accumulator 54.

Figure 19:
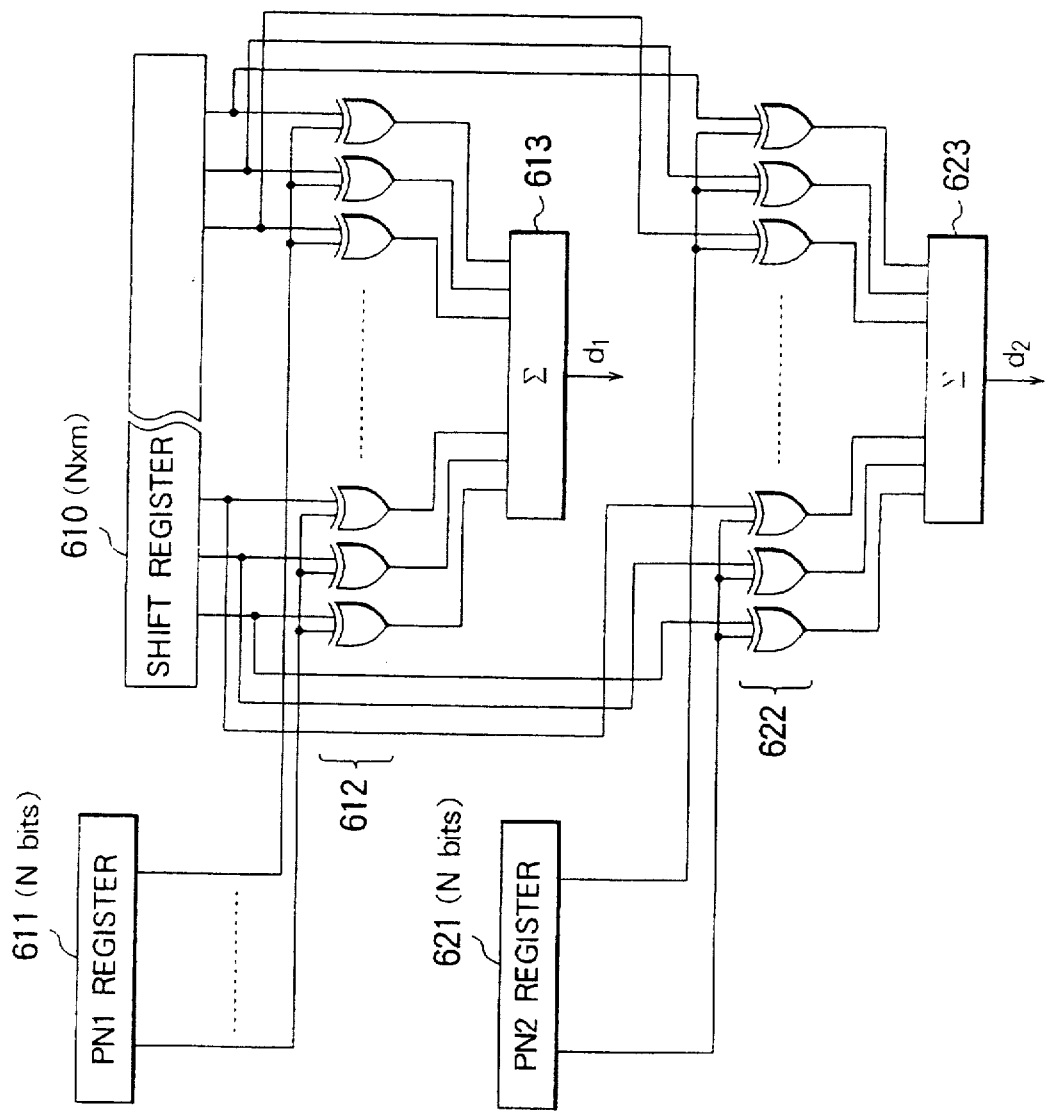
FIG. 19 is a block diagram of yet another modification of the correlator shown in FIG. 14.

FIG. 19 shows another example of the correlator shown in FIG. 14, which is constructed to use a single shift register in common, thereby allowing a simplification of the circuit arrangement. Memory registers 611 and 621 are provided to store fixed patterns for the first series PN1 and second series PN2, respectively. A shift register 610 includes a plurality of stages which is equal in number to n(=N×m) and to which a received signal is input, and is used in common for the correlation with both the first and the second series. The single shift register 610 is connected to both network for the first series including a bank 612 of exclusive OR circuits and an accumulator 613 which delivers a first correlation output "d1", and another network for the second series including a bank 622 of exclusive OR circuits and another accumulator 623 which delivers a second correlated output "d2".

The correlator shown in FIG. 19 is designed for use in the reception of a digital signal, and can be also adapted for use in the reception of an analog signal by substituting a tapped delay line for the shift register 610, a bank of the multipliers for the banks 612 and 622 of the exclusive OR circuits, and an analog adder for the accumulators 613 and 623.

Figure 20:
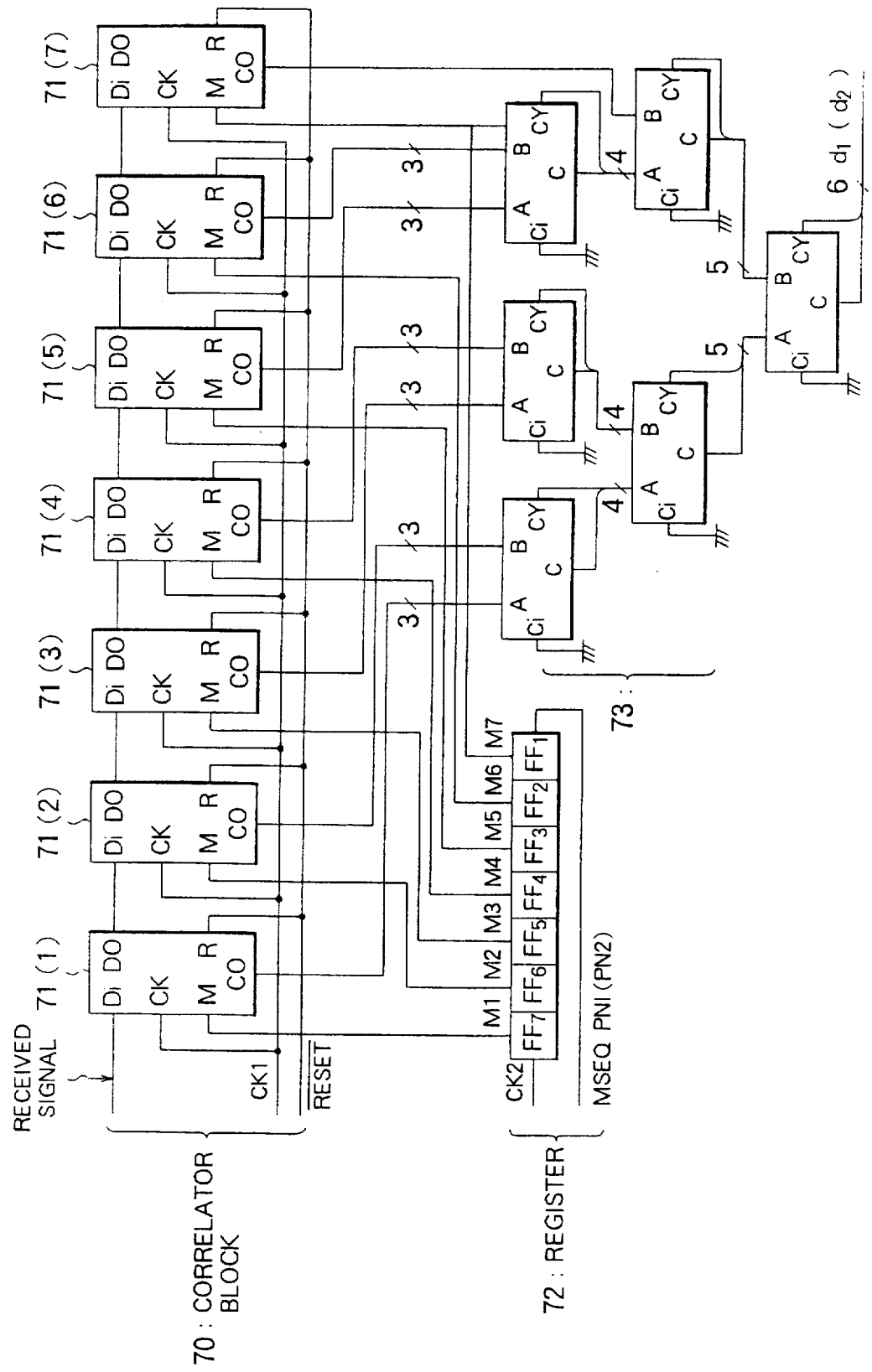
FIG. 20 is a block diagram of yet another modification of the correlator shown in FIG. 14.

FIG. 20 shows a correlator section of still another example of the correlator shown in FIG. 14. The correlator section includes correlation block 70, register 72 and an accumulator formed as a bank of adders 73. This arrangement allows the number of the circuits used in the correlator shown in FIG. 18 to be reduced. It is to be noted that this circuit arrangement is disclosed in detail in Japanese Patent Application No. 160,954/1988 filed by the present applicant.

In the correlator shown in FIG. 18, one of bits in the fixed pattern is supplied to a corresponding one of exclusive OR circuits in the bank 53 containing n(=N×m) exclusive OR circuits, and the outputs from all the exclusive circuits are accumulated by the accumulator 54. Provided that a received signal is a digital signal in FIG. 18, outputs from two adjacent exclusive OR circuits in bank 53 are added together by a first stage adder in the accumulator 54, and outputs from two adjacent first stage adders are added together by a corresponding second stage adder. Thus, it will be noted that the total number of adders in the accumulator 54 will be large.

By contrast, in the correlator section shown in FIG. 20, a correlator block 70 is formed of a plurality of correlation units 71(1) to 71(7). An M series code used in the correlator section of FIG. 20 has a code length of 7 bits. Each of the correlation units 71(1) to 71(7) is effective to correlate one bit in the fixed pattern with m data bits (corresponding to SF1 to SFm shown in FIG. 18) from N×m bits in the received data, for example.

In the correlator section shown in FIG. 20 thus constructed, a correlation values relating to m data bits are added together at one step by using an up/down counter, considering the relationship between an input and an output of an m-stage shift register. Specifically, a first register 72 receives the first series PN1 having a code length of 7 bits, storing bits M1 to M7 therein.

Subsequently, the correlator block 70 receives a received signal, which is shifted by the correlation units 71(1) to 71(7), each unit forming a correlation thereof.

Figure 21:
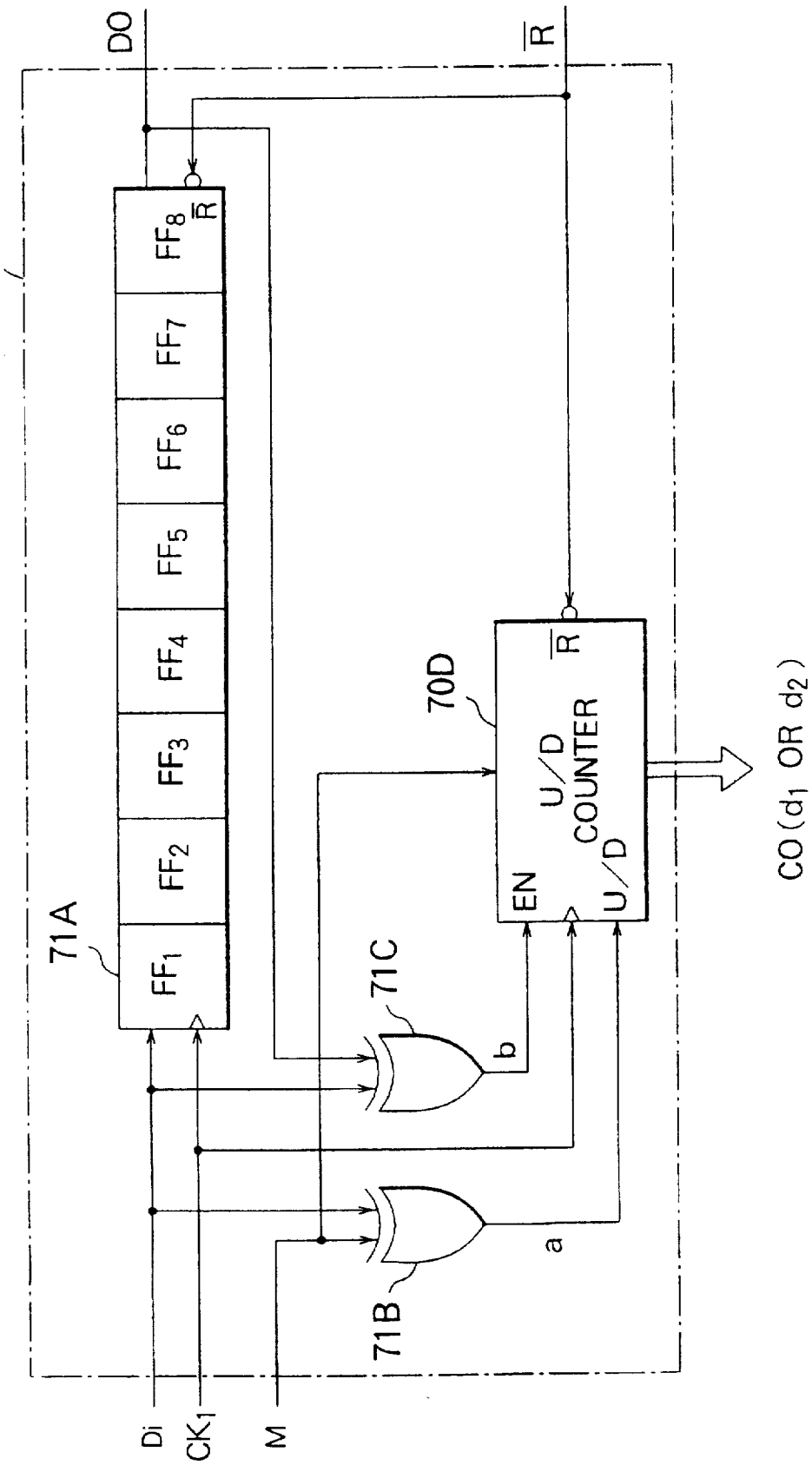
FIG. 21 is a block diagram of yet another modification of the correlator shown in FIG. 14.

As shown in FIG. 21, each of correlation units 71 (including 71(1) to 71(7)) is formed of an 8-stage shift register 71A, a pair of exclusive OR circuits 71B and 71C, and an up/down counter 71D, which counts a correlation between bit values M of input signal Di and PN1.

FIG. 22 is a table which indicates a correlation counting operation by the counter 71D. All of correlation counts from the correlation units 71(1) to 71(7) are added together by an adder block 73 shown in FIG. 20, which derives a correlation signal d1. In a similar manner, a correlation signal d2 can be derived from PN2 by using a similar circuit arrangement.

With the correlator section in FIG. 20, a total number of adders can be drastically reduced in the bank, thus allowing the circuit arrangement to be simplified. This is also advantageous in respect of an effective reduction in the phase delay achieved. While a pair of correlation blocks 70 shown in FIG. 20 is provided separately for PN1 and PN2 in the correlator, it is to be noted that shift register 71A in FIG. 21 can be used in common for both PN1 and PN2.

Figure 23:
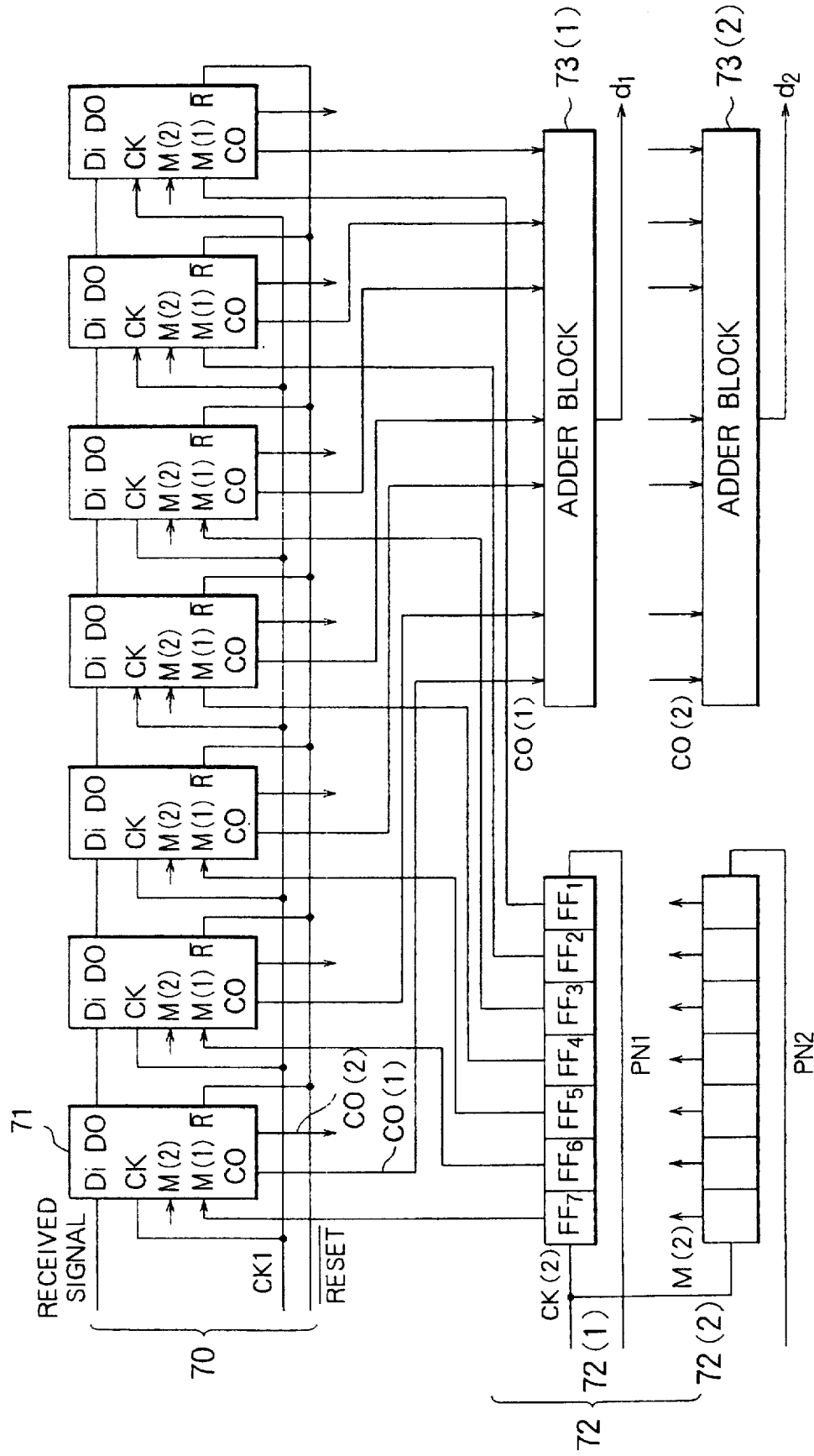
FIG. 23 is a block diagram illustrating an overall arrangement of the correlator shown in FIG. 14.
Figure 24:
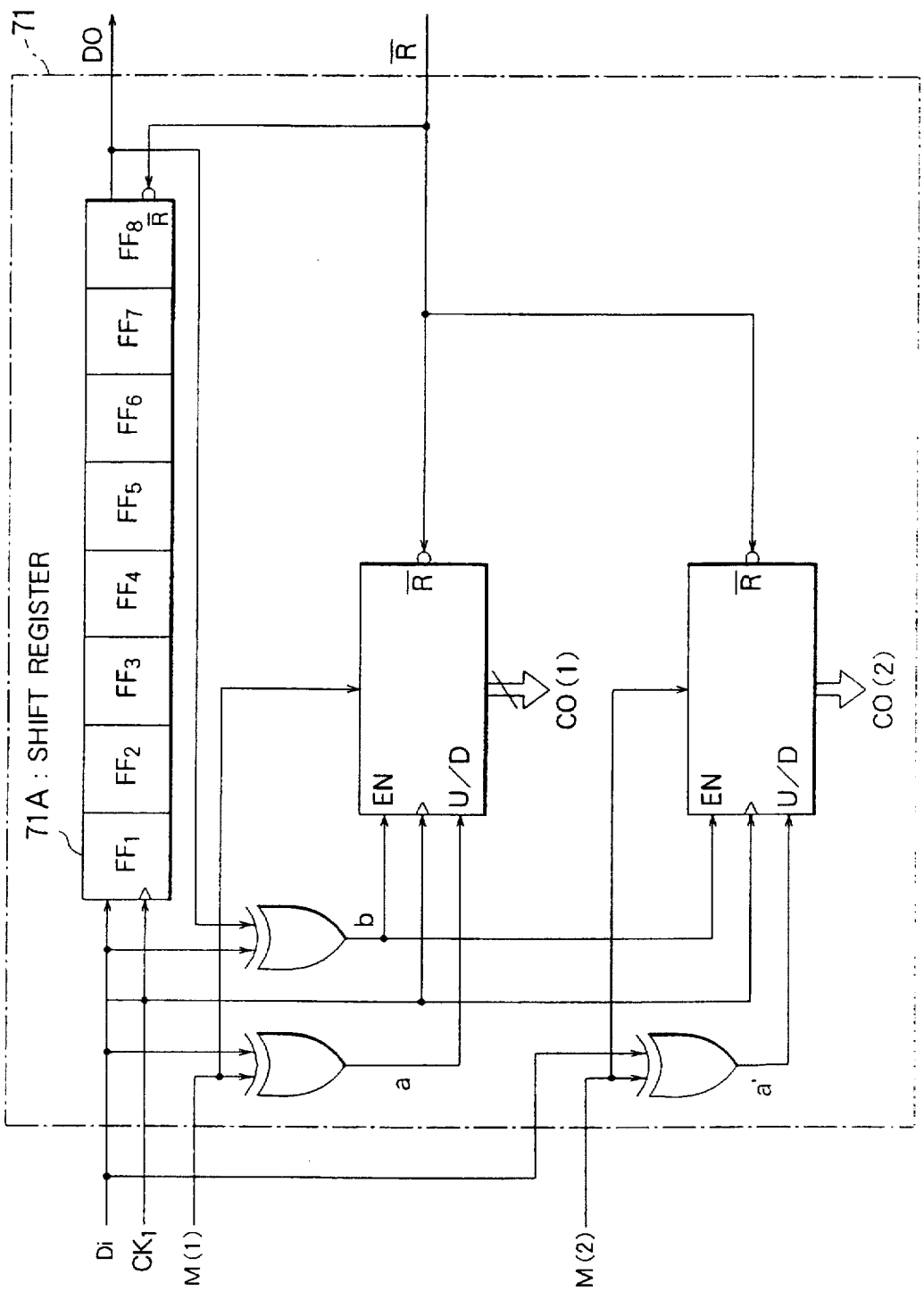
FIG. 24 is a block diagram of the correlator unit shown in FIG. 23.

FIG. 23 shows an example of an overall arrangement of a correlator using the correlation block shown in FIG. 22, while FIG. 24 shows the construction of the correlation unit shown in FIG. 23. Since those configurations will be apparent from the foregoing description, detailed description thereof will be omitted here.

Figure 25:
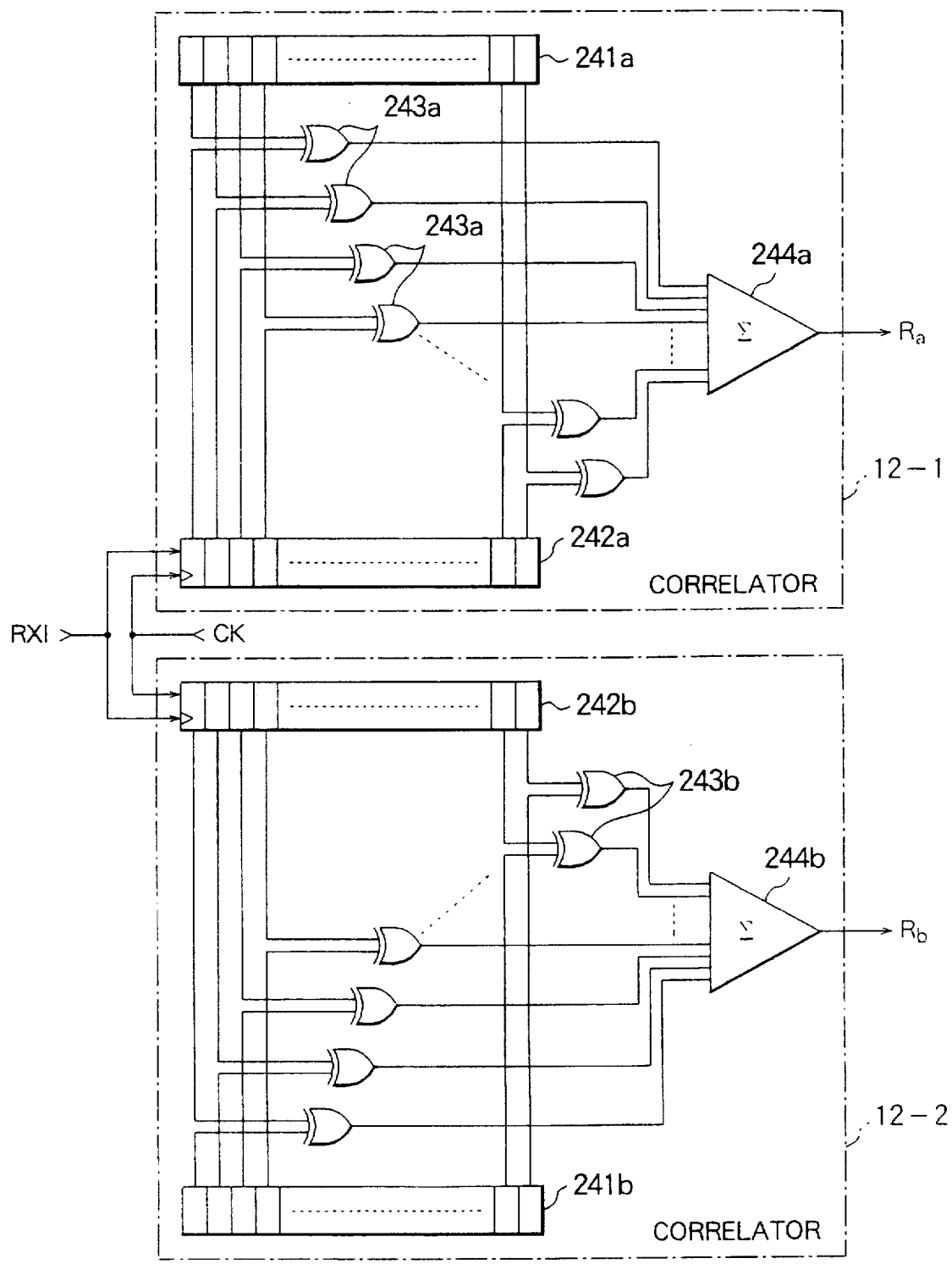
FIG. 25 is a block diagram of an example of the correlator shown in FIG. 5.

Now, the function of the correlator shown in FIG. 5 will be described with reference to the drawings. FIG. 25 shows one embodiment of the correlator shown in FIG. 5. While it is assumed that the number of correlators is equal to N in FIG. 5, it is assumed that N=2 in this example.

As shown in FIG. 25, a pair of correlator sections (referred to as merely correlators hereinafter) 12-1 and 12-2 includes an n-stage registers 241a and 241b, respectively. Manchester code M series which are generated by Manchester code generators 13-1 and 13-2 contained within the modulator 111 in FIG. 5 are previously loaded into the registers 241a and 241b, respectively.

It is noted that an M series produced by n-stage shift register has a code length of $2^n-1$. In the modulator 111, the M series is converted into a Manchester code, and accordingly each of the registers 241a and 241b has a number of stages N which is $N=2(2^n-1)$. On the other hand, a digital received signal RXI which is fed through a receiving interface 112B is supplied to shift registers 242a and 242b provided within the correlators 12-1 and 12-2, respectively. Each of these shift registers 242a and 242b has N stages, and is driven by the clock signal CK having a double frequency of that of the clock signal used in the modulator 11.

In the correlator 12-1, a code which is loaded in a shift stage of the register 241a and a received signal fed to a corresponding shift stage of the shift register 242a are supplied to an exclusive OR circuit 243a where they are compared against each other. Outputs from all the exclusive OR circuits 243a are fed to an adder 244a where they are added together. An output signal from the adder 244a represents a degree of coincidence between the code in the shift stage of the register 241a and the code in the corresponding shift stage of the shift register 242a, and thus forms a correlation output Ra from the correlator 12-1. The received signal RXI is shifted through the shift register 242 in response to each clock signal, and accordingly, the correlation output Ra changes at every clock signal CK.

Similarly to the correlator 12-1, the correlator 12-2 includes a plurality of exclusive OR circuits 243b, in each of which a determination is made of a coincidence between a code loaded into a shift stage of the register 241b and a corresponding code of the received signal supplied to a shift stage of the shift register 242b. Output signals from all of the exclusive OR circuits 243b are supplied to an adder 244b where they are accumulated. The adder 244b delivers a correlation output Rb representing a degree of coincidence between the Manchester M series loaded into the register 241b and the input digital received signal RXI.

Figure 26:
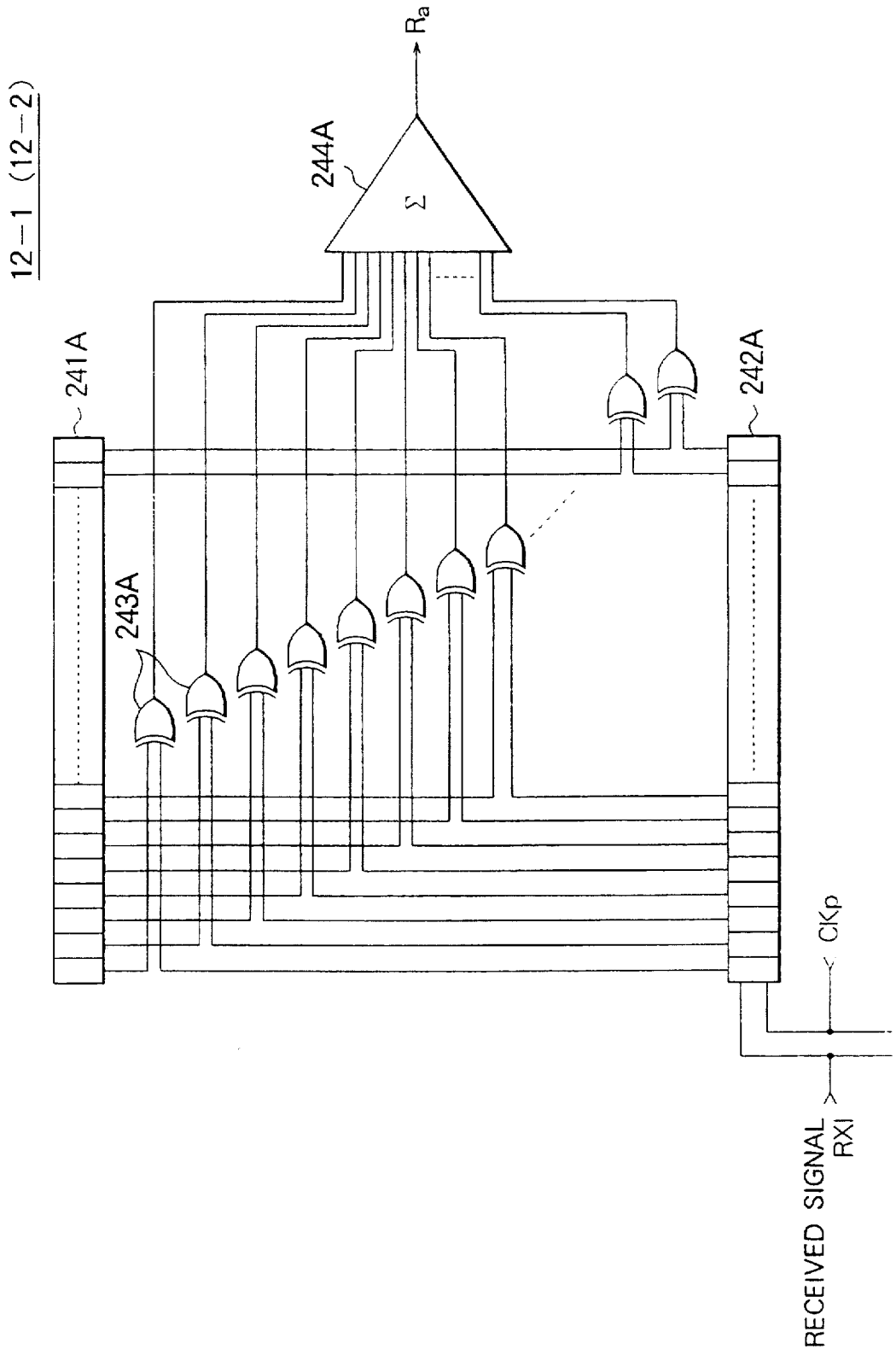
FIG. 26 is a block diagram of a modification of the correlator shown in FIG. 25.

FIG. 26 shows a modification of the correlator 12-1 in FIG. 25. In this modification, the registers 241a and 242a are replaced by a register 241A and a shift register 242A having Nxp stages, where p is an integer equal to or greater than 1.

The shift register 242A is driven by a clock signal CKp having a frequency which is p-times that of the clock signal CK. The correlator 12-1 includes Nxp exclusive OR circuits 243A, each of which receives a corresponding code loaded into a shift stage of the register 241A and a corresponding code loaded into a shift stage of the shift register 242A. Outputs from all of the exclusive OR circuits 243A are supplied to an adder 244A where they are accumulated. As a consequence, the adder 244A delivers a correlation output Ra. By increasing the number of stages in the register 241A and the shift register 242A by a factor of p, the accuracy of the correlation is improved. The remaining correlator 12-2 shown in FIG. 25 can be similarly modified.

Figure 27:
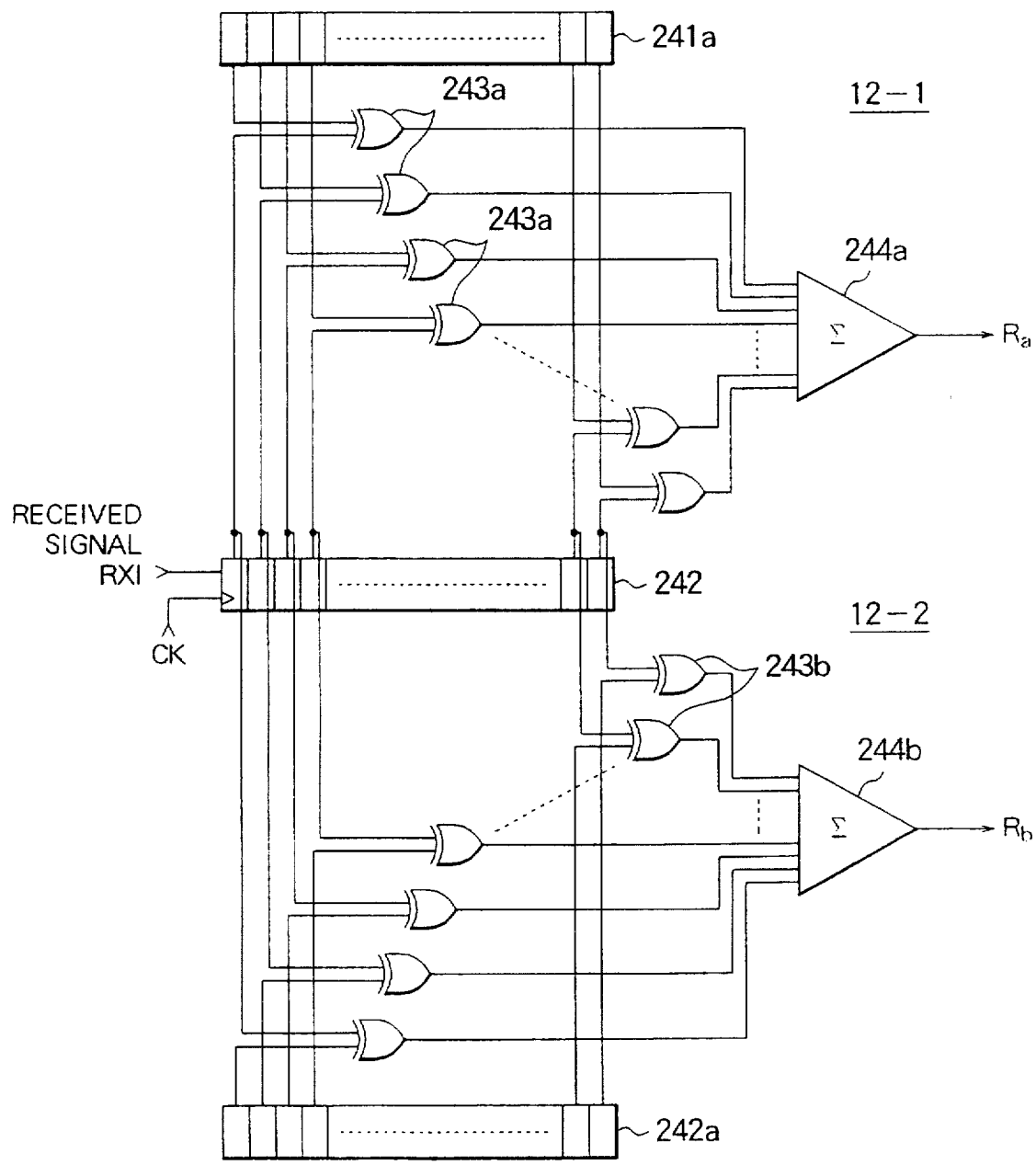
FIG. 27 is a block diagram of another modification of the correlator shown in FIG. 25.

FIG. 27 shows another modification of the correlator 12-1 (and also 12-2) shown in FIG. 25. In this modification, the correlators 12-1 and 12-2 include a single common shift register 242 to which a received signal RXI is supplied, in a manner similar to that described before. By decreasing the number of shift registers, the system can be simplified. It is to be noted that the shift register having a number of stages, which is increased by a factor of m in the arrangement of FIG. 25, can be used in common to the both correlators 12-1 and 12-2 in this example.

Figure 28:
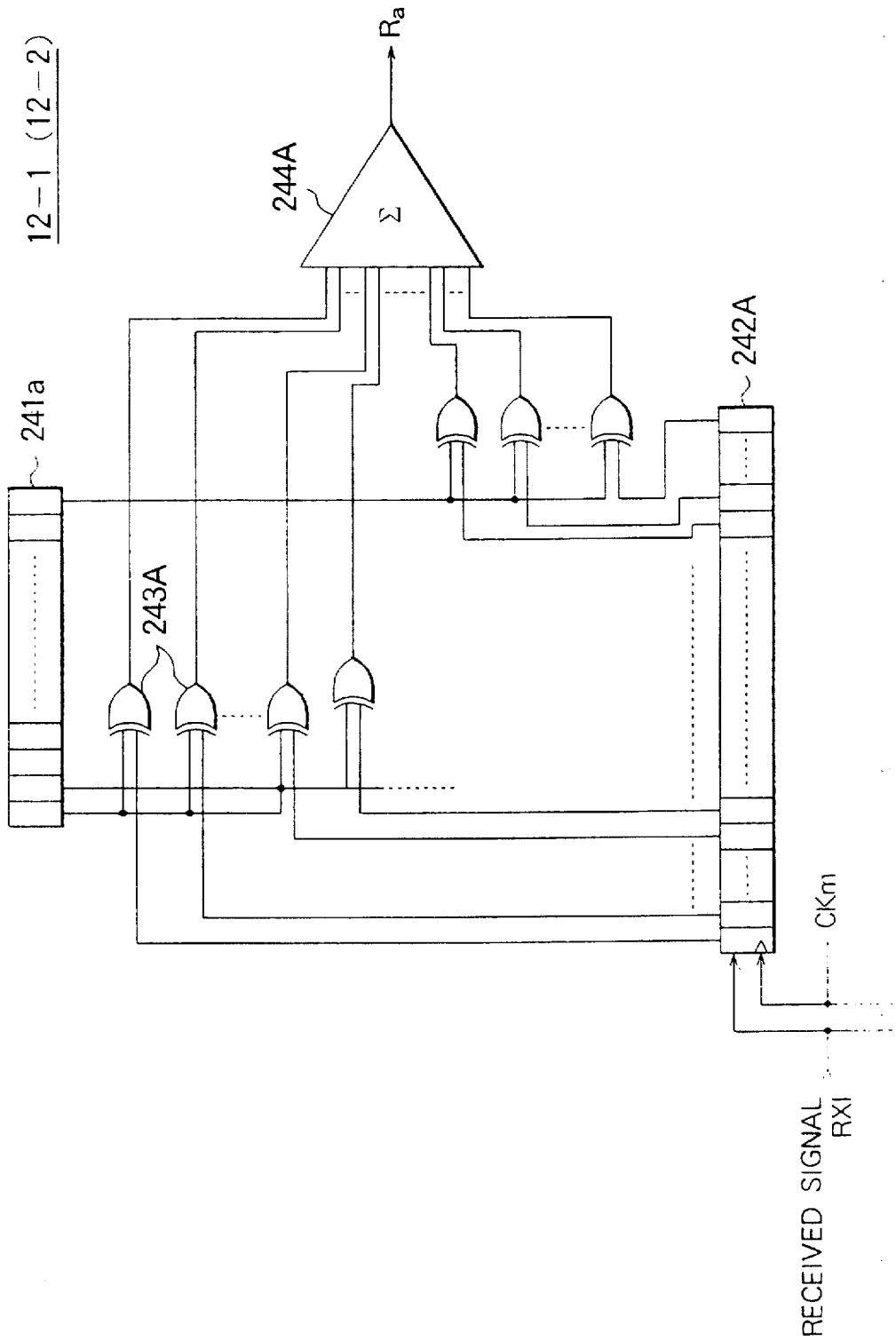
FIG. 28 is a block diagram of yet another modification of the correlator shown in FIG. 25.

FIG. 28 shows another modification of the correlator 12-1 (and also 12-2) shown in FIG. 25. In FIG. 28, a register 241a has N stages while a shift register 242A has Nxp stages. In the correlator of the present embodiment, a shift stage of the register 241a corresponds to p stages of the shift register 242A. Accordingly, a code loaded into a shift stage of the register 241a and a code loaded into a shift stage of the shift register 242A are supplied to an exclusive OR circuit 243A, determining a degree of coincidence therebetween.

Figure 29:
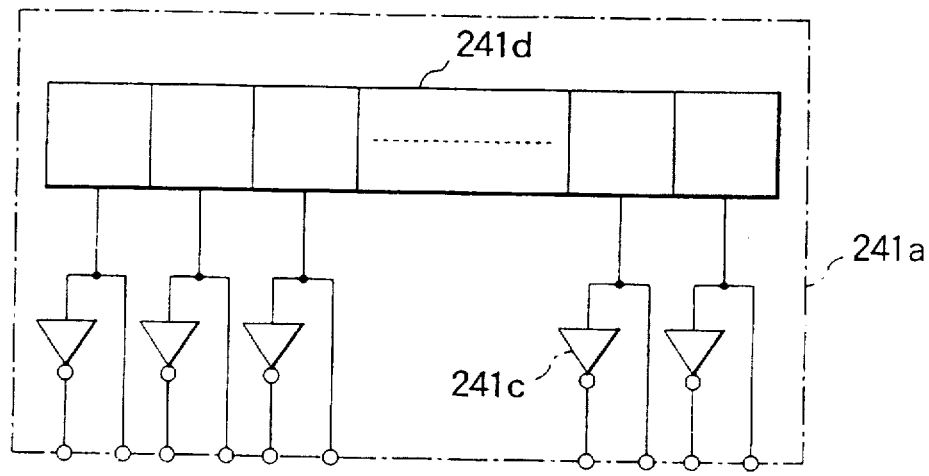
FIG. 29 is a block diagram of an example of the register shown in FIG. 28.
Figure 30:
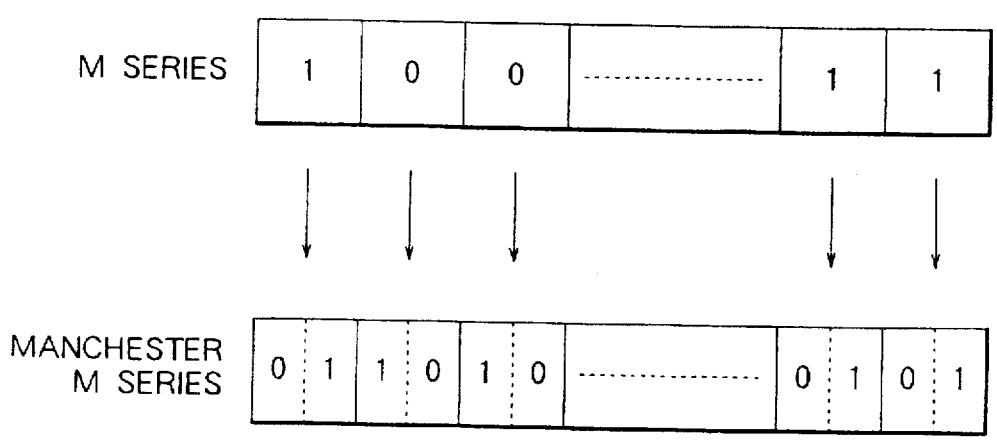
FIG. 30 is an illustration of a relationship between Manchester series and Manchester M series.

FIG. 29 is a block diagram showing the construction of the register 241a shown in FIGS. 25, 27 and 28. FIG. 30 illustrates the relationship between the M series and the Manchester M series in FIG. 29. As shown in FIG. 30, a code of the Manchester M series is formed in accordance with a code of the original M series. More specifically, a code in the M series is loaded into a register 241d having a number of stages equal to N/2, and these are directly delivered and also passed through an NOT circuit 241c so as to supply a Manchester M series code, as shown in FIG. 29.

Figure 31:
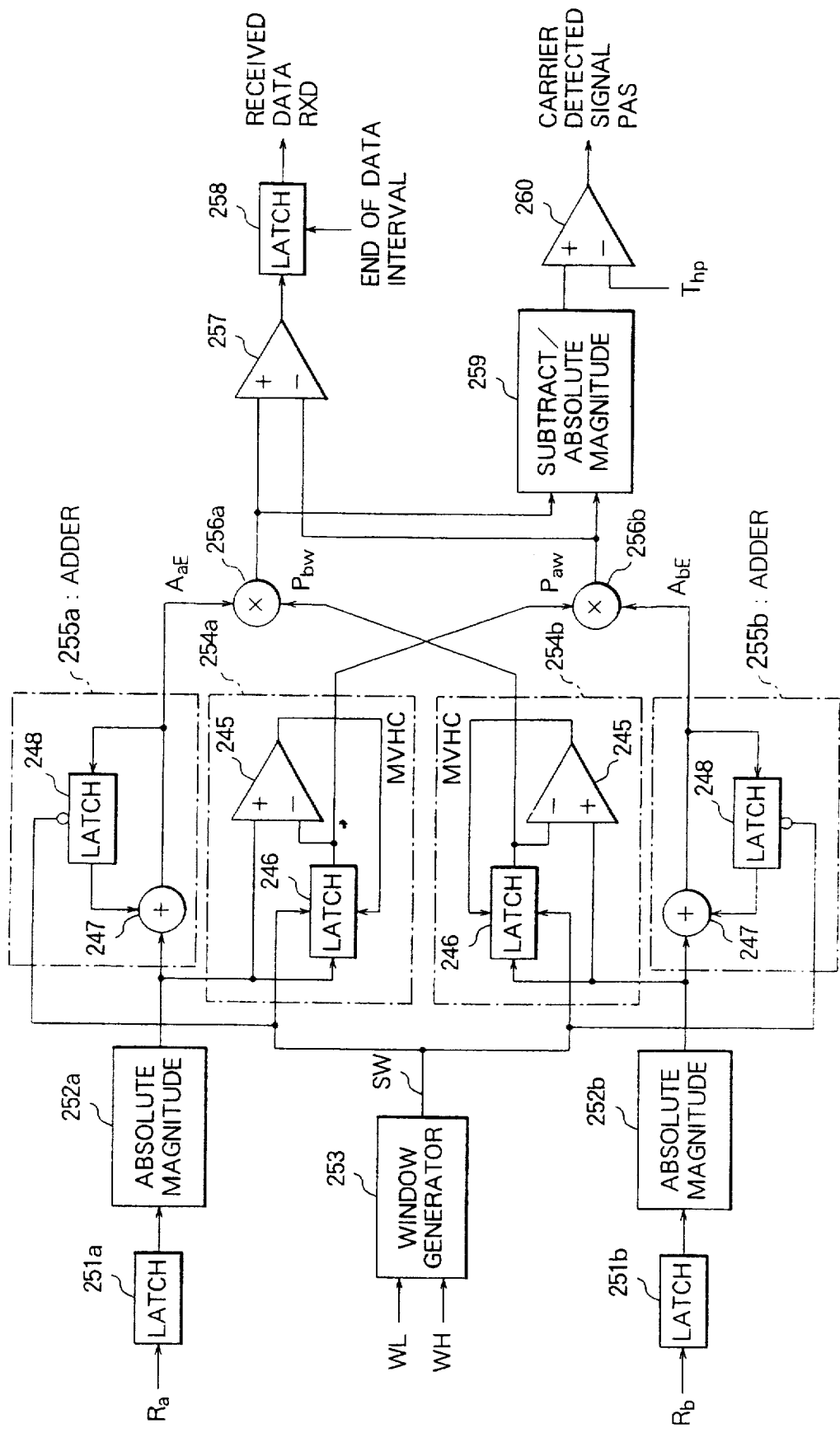
FIG. 31 is a block diagram of an example of the demodulator shown in FIG. 5.
Figure 32:
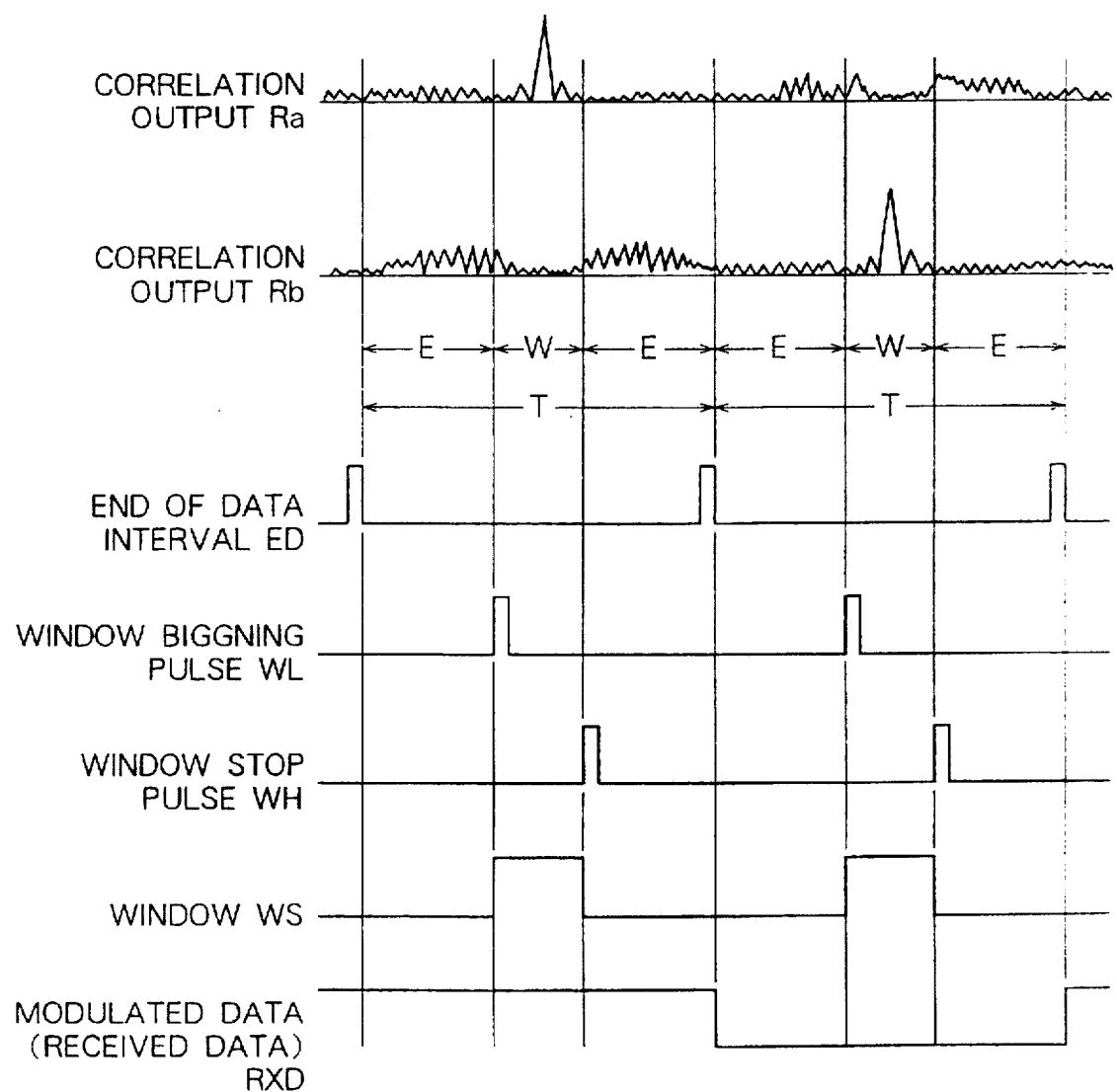
FIG. 32 is a timing chart of signal waveforms appearing at specified nodes in the demodulator shown in FIG. 31.

An example of a demodulator used in the CSK communication system shown in FIG. 5 will now be described. FIG. 31 shows an example of the demodulator shown in FIG. 5, and FIG. 32 is a timing chart of signal waveforms appearing at specific nodes in the demodulator shown in FIG. 31. In the description to follow, it is assumed that the demodulator 123 and the carrier detector circuit 124 shown in FIG. 5 have an arrangement for N=2. Also, for the convenience of description, correlation outputs Ra and Rb are shown as analog signals in FIG. 32.

The principle of data modulation on the basis of correlation outputs Ra and Rb from the pair of correlators 12-1 and 12-2 (refer to FIG. 5) will be described. Referring to FIG. 32, one data interval T (equivalent to one period of Manchester M series) can be divided into three parts including a central part or window W, and a pair of marginal parts E which are situated on the opposite sides of the window W. The pair of marginal parts E have an equal length to each other. However, a code length need not be equal to each other in the both marginal parts E. It is not essential that the window W be located at the center of the data interval T. Specifically, the window W and the marginal parts E can be described as follows:

window W: an interval between $(T-d)/2$ and $(T+d)/2$ marginal part E: an interval between 0 and $(T-d)/2$ or an interval between $(T+d)/2$ and T where $0<d<T$.

The window W is referred to as an observation interval. when data is transmitted, one of the correlation outputs Ra and Rb has a peak of correlation output within the data interval T. The peak of correlation output is detected by the synchronization control circuit 125, which forms an end of data interval signal ED, thus bringing the peak of correlation to the center of the data interval T. The synchronization control circuit 125 forms a window beginning pulse WL which defines the start of the window W and a window stop pulse WH which defines the end of the window W in accordance with the end of data interval signal ED.

Modulated data (received data RXD) is produced in the manner indicated below:

data is "1" if $P_{bW} \times A_{aE} > P_{aW} \times A_{bE}$ and data is "0" if $P_{bW} \times A_{aE} < P_{aW} \times A_{bE}$ where $P_{aW}$ represents a peak value of the correlation output Ra within the window W (a maximum value), $P_{bW}$ a peak value of the correlation output Rb within the window W (a maximum value), $A_{aE}$ an accumulated value of the correlation output Ra within the marginal parts E (a sum) and $A_{bE}$ an accumulated value of the correlation output Rb within the marginal parts E (a sum).

Theoretically, data should be "1" if $P_{bW} > P_{aW}$ and data should be "0" if $P_{bW} < P_{aW}$. However, if a large noise is contained, a comparison of peak values of the correlation outputs may cause an error in the demodulation. For a correlation output having a peak, the level of marginal parts located on the opposite sides of the peak is generally lower than a correlation level of the marginal parts of the other correlation output having no peak therein. For example, when a correlation output Rb has a peak, an accumulated value $A_{bE}$ will be less than an accumulated value $A_{aE}$ of a correlation output Ra having no peak. Based on this fact, a product of a peak value in one correlation output and a correlation level of the marginal parts for the other correlation output (hereinafter referred to as "other correlation level"), namely, $P_{bW} \times A_{aE}$ or $P_{aW} \times A_{bE}$ is used in the comparison in order to form a correct demodulated data. It will be seen from those formulae that a demodulation can be achieved in a stable manner even if a signal transmission path has a degraded signal transmission characteristic and contains considerably large noise, for example.

The principle of detecting a carrier will now be described. A detection of a carrier is declared when the absolute magnitude of $(P_{bW} \times A_{aE} - P_{aW} \times A_{bE})$ exceeds a given threshold level Thp. The presence of a carrier implies that one of the correlation outputs has a peak. Accordingly, the absolute magnitude of a difference between the products formed by a peak value and other correlation output is relatively large. However, in the absence of a carrier, the absolute magnitude mentioned above will be very low and close to zero. In this manner, the presence or absence of a carrier can be detected substantially without being influenced by noise, in a similar manner as in the data demodulation.

Referring back to FIG. 31, the operation of the demodulator shown will be described. It is to be understood that the demodulator shown in FIG. 31 is a digital circuit and operates in synchronism with a clock signal CK or CKm. However, to simplify the description, the clock signal is not shown here.

A correlation output Ra is latched in a latch circuit 251a for each clock pulse and is then fed to an absolute magnitude circuit 252a, an output from which is then fed to an adder 255a and a maximum value hold circuit (MVHC) 254a. On the other hand, a window beginning pulse WL and a window stop pulse WH are supplied to a window generator circuit 253, which delivers a window signal WS which rises to its high level during the interval of the window W. The window signal WS is supplied, as an operation control signal, to a latch circuit 248 within the adder circuit 255a and to a latch circuit 246 within the maximum value hold circuit 254a.

In the adder circuit 255a, the latch circuit 248 operates only when the window signal WS assumes a low level relative to the marginal parts E. The timing of the latching operation is determined by the clock signal. The absolute magnitude of the correlation output Ra supplied from the circuit 252a is fed to an adder 247 where it is added to a result of addition of the magnitudes previously supplied thereto from the latch circuit 248 for each clock signal, and thereafter the result of addition is latched in the latch circuit 248. In this manner, the adder circuit 255a delivers an accumulated value $A_{aE}$, which is fed to a multiplier 256a.

In the maximum value hold circuit 254a, the latch circuit 246 operates only when the window signal WS assumes a high level corresponding to the window W. A maximum value which has been latched in the latch circuit 246 is then compared against the absolute magnitude of a present correlation value Ra which is now supplied to a comparator 245. If the absolute magnitude of the present correlation value Ra is greater, it is then latched in the latch circuit 245 as the latest maximum value. In this manner, the maximum value hold circuit 254a delivers a peak value $P_{aW}$, which is fed to a multiplier 256b.

A similar circuit arrangement including a latch circuit 251b, an absolute magnitude circuit 252b, a maximum value hold circuit 254b and an adder circuit 255b is provided for the correlation output Rb. The maximum value hold circuit 254b delivers a peak value $P_{bW}$, which is fed to the multiplier 256a. The adder circuit 255b delivers an accumulated value $A_{bE}$, which is fed to a multiplier 256b.

The multiplier 256a delivers a product $P_{bW} \times A_{aE}$, which is fed to a comparator 257 and a subtractor/absolute magnitude circuit 259. The multiplier 256b delivers a product $P_{aW} \times A_{bE}$, which is fed to a comparator 257 and a subtractor/absolute magnitude circuit 259. The product $P_{bW} \times A_{aE}$ and the product $P_{aW} \times A_{bE}$ are compared against each other in the comparator 257, which produces a signal either "1" or "0" depending on a result of comparison. This output signal is latched in a latch circuit 258 at the timing of the end of data interval signal ED, so as to be delivered as received data RXD. The end of data interval signal ED resets adder circuits 255a and 255b and maximum value hold circuits 254a and 254b.

On the other hand, a subtraction $(P_{bW} \times A_{bE} - P_{aW} \times A_{bE})$ takes place in the subtractor/absolute magnitude circuit 259, thus deriving the absolute magnitude of a result of subtraction. This absolute magnitude is supplied to a comparison circuit 260 where it is compared against a threshold Thp.

When the absolute magnitude is greater than the threshold Thp, the comparison circuit 260 delivers a carrier detection signal PAS.

Figure 33:
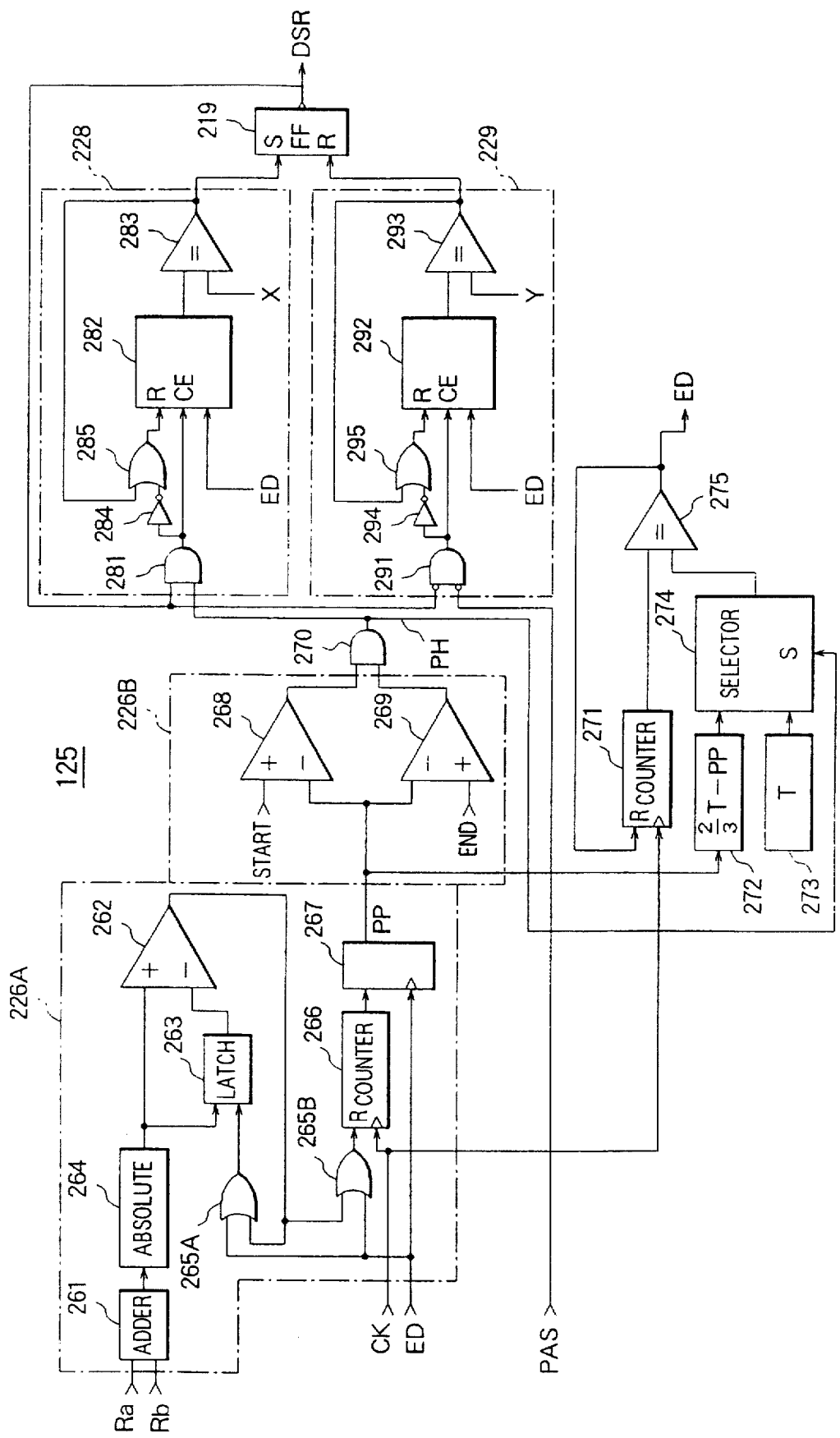
FIG. 33 is a block diagram of an example of the synchronization control circuit shown in FIG. 5.
Figure 34:
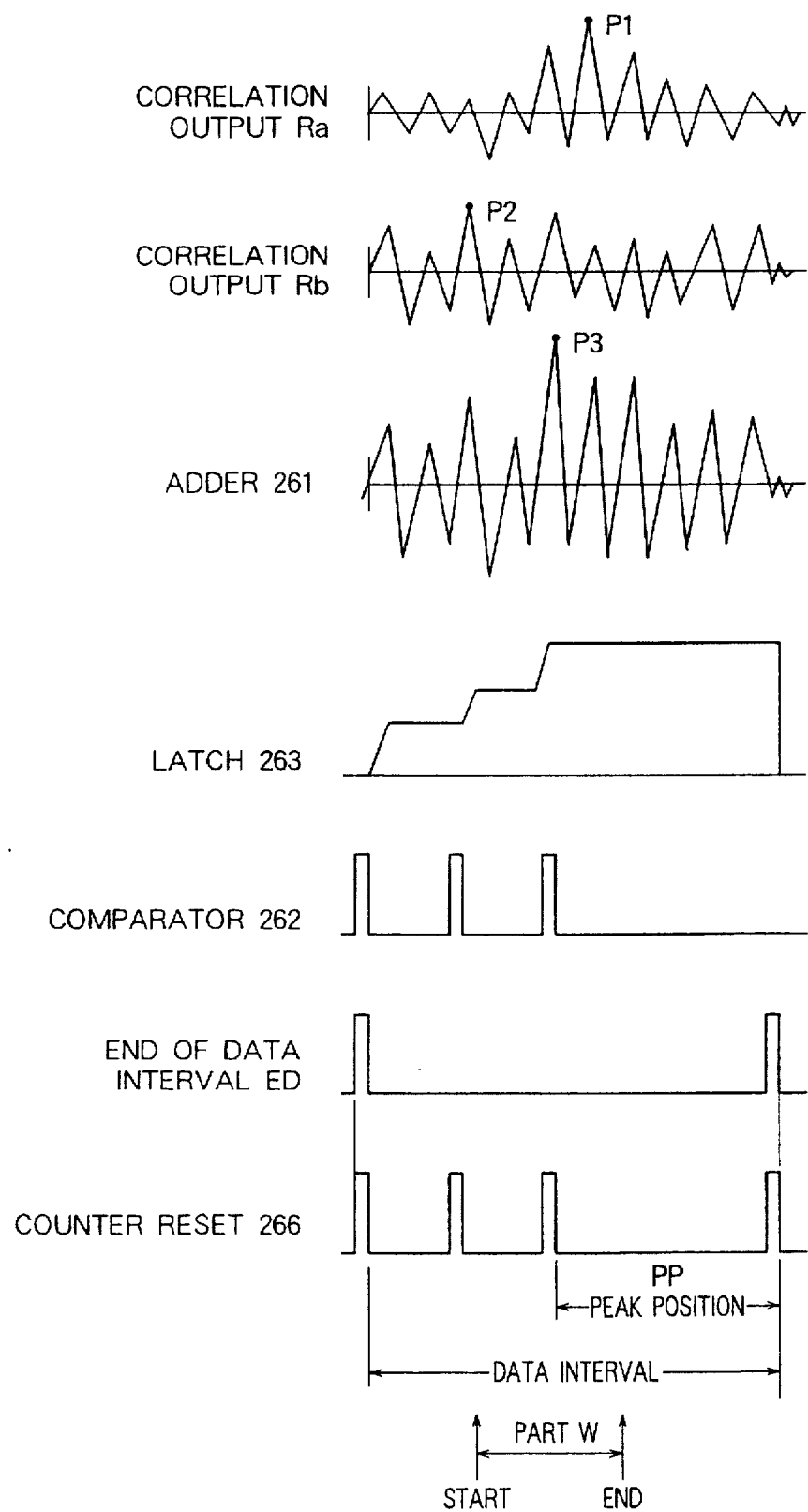
FIG. 34 is a timing chart illustrating the operation of a peak position detection.

An example of the synchronization control circuit used in the CSK communication system shown in FIG. 5 will now be described with reference to the drawings. FIG. 33 shows an example of the synchronization control circuit shown in FIG. 5, and FIG. 34 is a timing chart which illustrates the operation for detecting a peak position in the synchronization control circuit shown in FIG. 33. The synchronization control circuit of the present embodiment assumes that N=2 for the synchronization control circuit 125 shown in FIG. 5.

As shown in FIG. 33 the synchronization control circuit 125 comprises a peak position detector circuit 226A, a peak position determining circuit 226B, and a synchronization establishing circuit including a synchronization-stablished indicator 228, a synchronization-failed indicator 229 and other circuit elements.

The purpose of the peak position detector circuit 226A is to detect a peak position in a correlation output which appears during each data interval T. As shown in FIG. 34, a peak position PP is defined as a time interval between the time instant when a maximum value appears in a correlation output and a time instant of the next occurrence of the end of data interval signal ED. In the present embodiment, the peak is determined where an accumulated value of a pair of correlation outputs Ra and Rb, which is obtained as an output of an adder 261, becomes maximum in absolute magnitude.

In FIG. 33, the pair of correlation outputs Ra and Rb are fed to an adder 261 where an absolute magnitude of an accumulated value of the correlation outputs is obtained. The absolute magnitude is fed to one of the inputs of the comparator 262 and also to a latch circuit 263. When the signal ED representing the end of the current data interval is fed to the latch circuit 263 through an OR circuit 265A, the output from the absolute magnitude circuit 264 is latched as an initial value. The value which is latched by the latch circuit 263 is fed to the other input of the comparator 262. Subsequently, an output from the absolute magnitude circuit 264 is compared against a value which is latched in the latch circuit 263 for each clock pulse of the clock signal CK. When the absolute magnitude circuit 264 delivers an output which is greater in magnitude than the value latched in the latch circuit 263, the output from the comparator 262 is fed to the latch circuit 263 through the OR circuit 265A, whereby the output from the absolute magnitude circuit 264 is latched in the latch circuit 263 as the latest value. In this manner, the latch circuit 263 maintains a maximum value.

On the other hand, a clock counter 266 which counts the clock signal CK is reset or cleared by the end of data interval signal ED which is fed through an OR circuit 265B or an output from the comparator 262 which is fed through the OR circuit 265B, and then restart its counting operation beginning with zero for an initial value.

An output from the counter 266 is latched in a latch circuit 267 in response to the next end of data interval signal ED. In this manner, the counter 266 counts a number of clock signals CK over a time interval from the occurrence of a peak value within the data interval T to the occurrence of the end of data interval signal ED. A count in the clock counter 266 is latched in the latch 267, which therefore indicates a peak position PP.

Data PP which represents the peak position thus detected is fed to the peak position determining circuit 226B, which determines whether or not the peak position has been detected within the window W. It will be apparent from the foregoing description that the correlation peak should exist within the window W together with the demodulation of received data and the detection of the carrier. If the peak of the correlation does not exist within the window W, it is impossible to perform an accurate demodulation of received data and detection of the carrier.

In the peak position determining circuit 226B, a pair of comparators 268 and 269 forms a digital comparator block of window type together with an AND circuit 270. Data which represents the start of the window W is preset in the comparator 268 while data representing the end of the window W is preset in the other comparator 269. The OR circuit 270 delivers a peak position determining signal PH only when the peak position PP, determined in the manner mentioned above, is located between the start point and the end point. A corresponding waveform is illustrated in FIG. 34.

Figure 35:
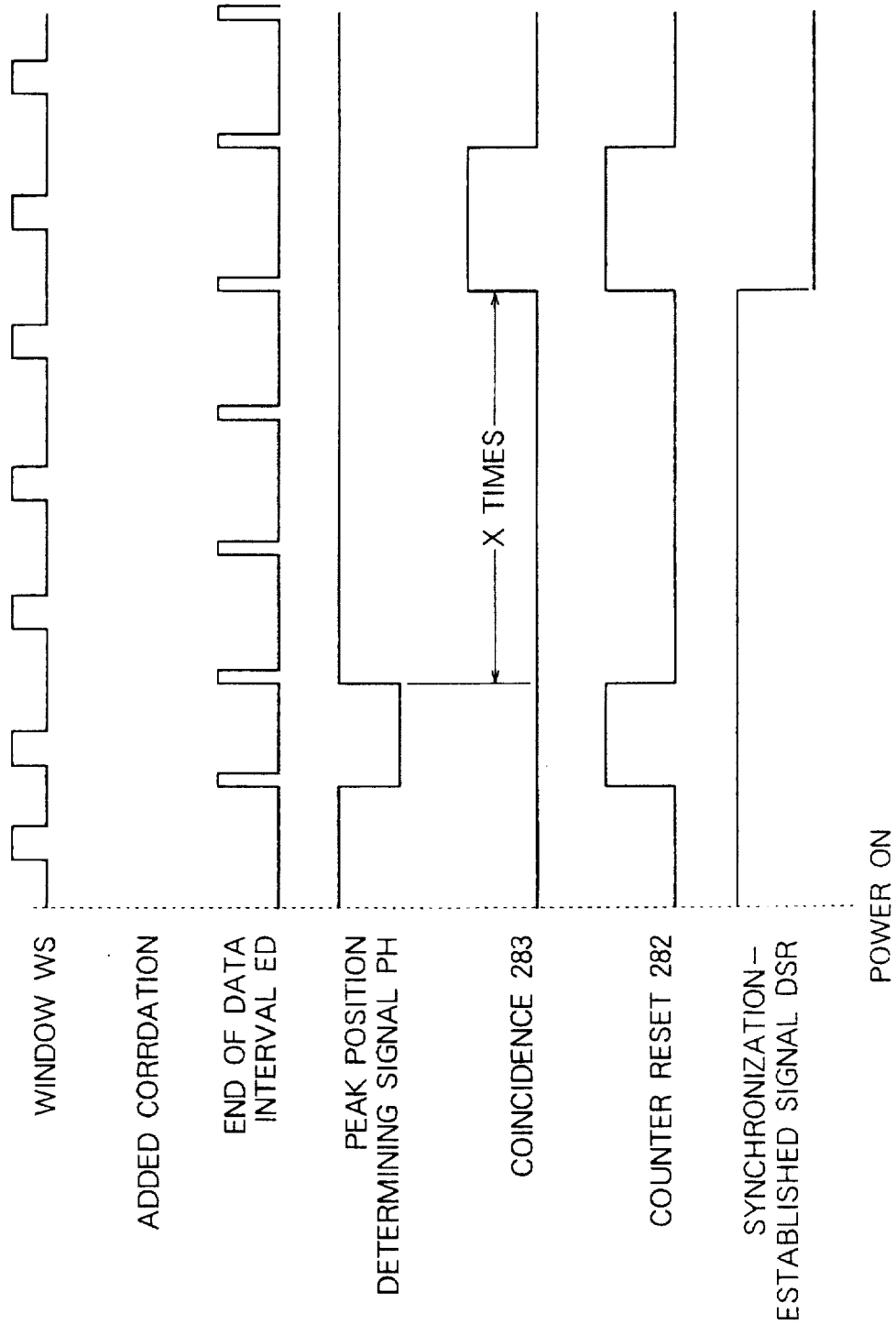
FIG. 35 is a timing chart illustrating the operation for a synchronization-established determination.

The construction and operation of a synchronization establishing circuit including the synchronization-established indicator 228 and synchronization-failed indicator 229 will be described. FIG. 35 is a waveform diagram illustrating the operation of the synchronization establishing circuit.

In FIG. 33, the synchronization establishing circuit includes a pair of registers 272 and 273. Data representing the peak position PP is supplied to the register 272 in which data representing [(3/2)T-PP] is preset where T represents the length of the data interval. Data T is preset in the register 273. Both the registers 272 and 273 are connected to a selector 274, which selects one of data preset in the registers 272 and 273 in accordance with the peak position determining signal PH, and feeds it to one of the inputs of a digital comparator 275.

A counter 271 is provided to receive and count the clock signal CK, and feeds its count output to the other input of the digital comparator 275. When the count in the counter 271 is equal to preset data received through the selector 274, the comparator 275 produces the end of data interval signal (or a coincidence signal) ED. The counter 271 is reset by the signal ED, then restarting its counting operation beginning with zero for initial value.

When a power switch is turned on, for example, a correlation output is not synchronized with the data interval, and therefore, there exists no correlation peak within the window W for some time. In this instance, the peak position determining signal PH is set to its low level, and the selector 274 selects data [(3/2)T-PP] which is preset into the register 272, and feeds the data to the comparator 275. This data is used to produce the next end of data interval signal ED so that the length of time between the next peak and the next end of data interval signal becomes equal to T.

Subsequently, when a peak is found within the window W, the peak position determining signal PH then rises to its high level, and the selector 274 selects the data T preset into the register 273. Subsequently, the end of data interval signal ED occurs at an interval T thereafter. When a peak value appearing within the window W of the data interval occurs a given number of time (X times) in succession, the synchronization is established.

In the synchronization-established indicator 228, when a counter 282 is clock-enabled by a peak position determining signal PH of a high level which is supplied through an OR gate 281, it counts the end of data interval signal ED. If the signal PH is at its lower level, a count output from the counter 282 is reset by the signal PH which is fed through an NOT circuit 284 and an OR circuit 285. The count output from the counter 282 is fed to a digital comparator 283, where the given number of times (X times) is preset, which is used in order to determine the establishment of the synchronization. Accordingly, when the count in the counter 282 reaches the value X, the digital comparator 283 delivers a coincidence signal, which sets a flipflop circuit 219 allowing it to deliver a synchronization-established signal DSR of a low level.

The coincidence signal delivered from the comparator 283 is fed to the counter 282 through the OR circuit 285 to thereby reset the counter 282. The synchronization-established signal DSR is fed to an AND gate 281, closing the same. In this manner, the peak position determining signal PH ceases to be supplied.

The counter 282 is reset if the peak position determining signal PH is set to its low level even once during the time interval the counter is counting the signal ED. Accordingly, the establishment of the synchronization applies only when the signal PH is supplied X times in succession while maintaining its high level. If the signal PH is set to its low level before the synchronization is established, the selector 274 then selects the register 272, thereby adjusting the timing when the end of data interval signal ED is to be produced.

Figure 36:
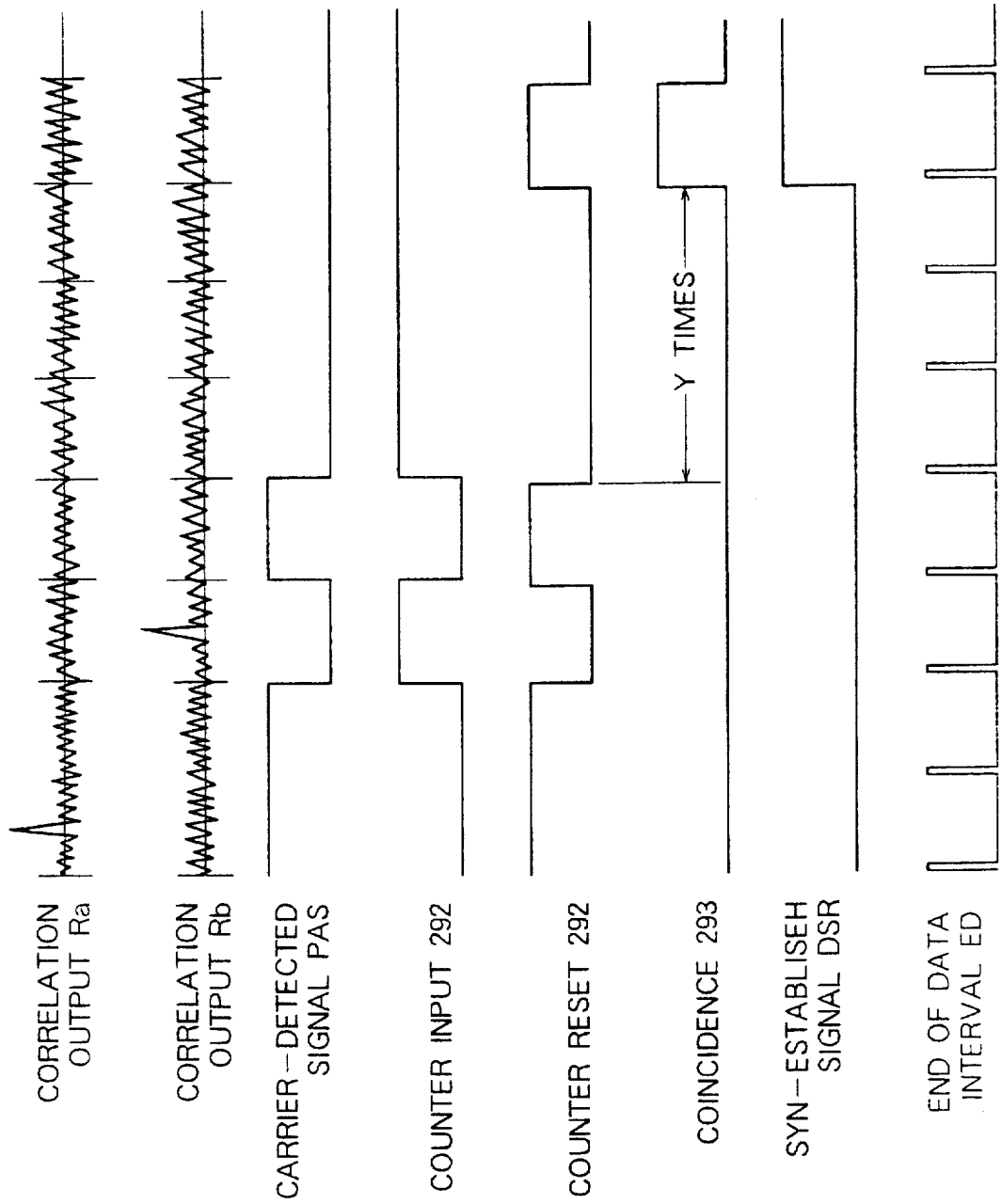
FIG. 36 is a timing chart illustrating the operation for a synchronization-failed determination.

A synchronization-failed indicator 229 is provided in FIG. 33 in order to indicate that the carrier detection signal PAS has not been supplied a given number of times (Y times) during the data interval. Such a condition represents that the synchronization failed to be established. FIG. 36 is a timing chart which illustrates the operation of the synchronization-failed indicator 229.

In FIG. 33, when the synchronization is established, a NAND gate 291 is opened in accordance with the synchronization-established signal DSR having a low level. When the carrier is detected, the carrier detection signal PAS assumes its high level. It will be noted that the carrier detection signal PAS is at its low level when the carrier is not detected. The carrier detection signal PAS is fed to a counter 292 through the NAND gate 291. Thus, an enable signal of a high level is fed to the clock-enable input CE of the counter 292. The carrier detection signal PAS of a high level is fed through the NAND gate 291, NOT circuit 294 and OR gate 295 to the counter 292, resetting the latter. When enabled, the counter 292 counts the end of data interval signal ED. A count in the counter 292 is supplied to a digital comparator 293 in which a given number Y is previously loaded. Accordingly, when the count in the counter 292 reaches the value Y, the comparator 293 delivers a coincidence signal, which resets the flipflop circuit 219, whereupon the synchronization-established signal DSR rises to its high level. The signal DSR of a high level closes the NAND gate 291. The output signal from the comparator 293 is fed through the OR gate 295 to the counter 292, thus resetting the counter 292.

If the carrier detection signal PAS rises to its high level during the time interval the counter 292 is in operation, the counter 292 is reset. This means that it is determined that the synchronization failed to be established only when the carrier failed to be detected over Y data intervals. In this manner, it is possible to clearly distinguish between a temporary failure of detection of a carrier which is attributable to a variation in the transmission characteristic of the signal transmission path, and a failure of detection of a carrier which is caused by a termination of a communication (for which the synchronization is intended not to be established).

4. CSK modem

Figure 37:
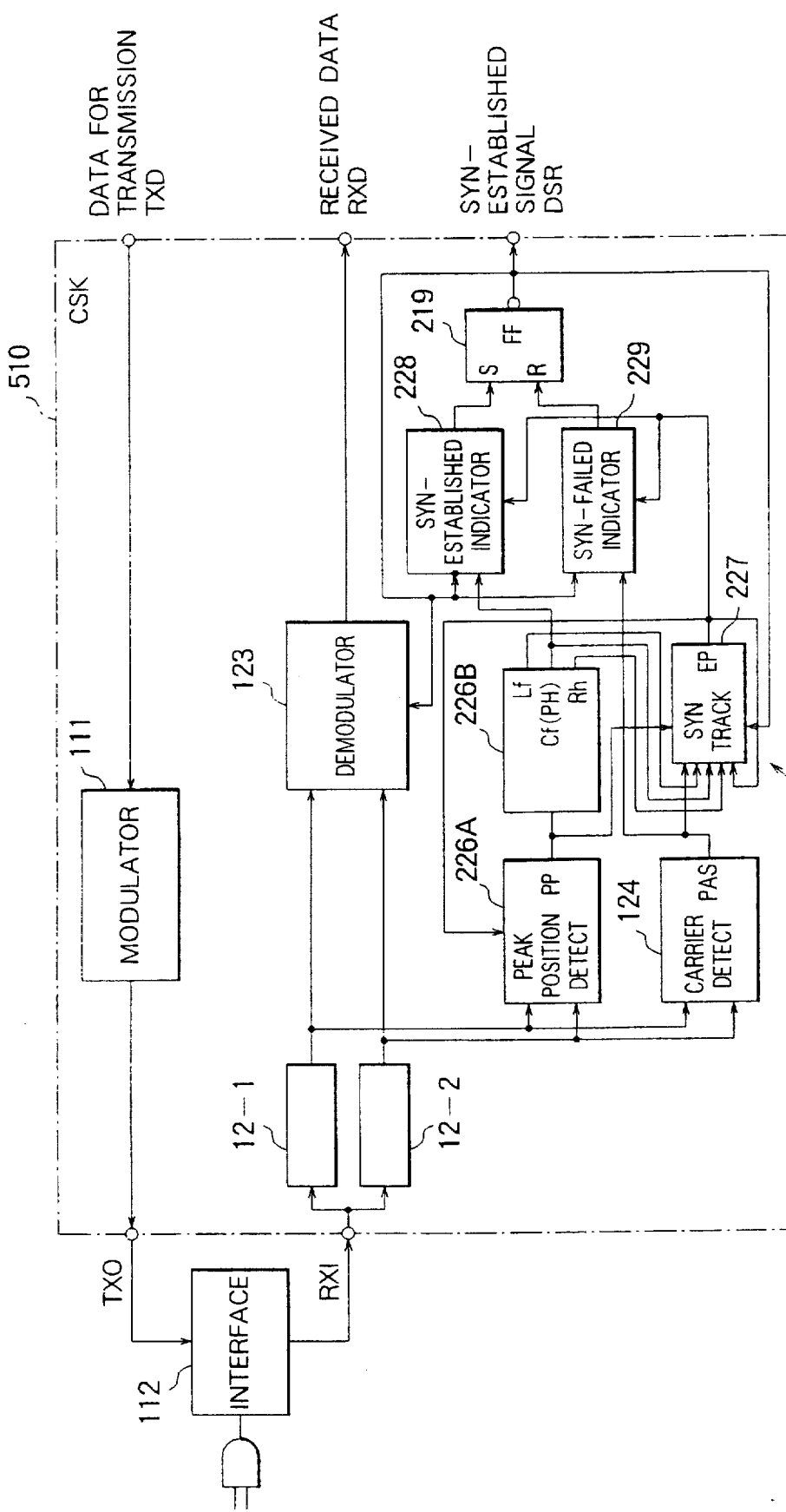
FIG. 37 is a block diagram of a CSK modem according to an embodiment of the invention.

An example of a CSK modem will now be described with reference to the drawings, in which a CSK signal transmitter and a CSK signal receiver according to the invention are assembled. FIG. 37 is a block diagram of the example of the CSK modem thus constructed.

The CSK modem 510 includes a signal transmitter including the modulator 111 such as shown in FIG. 5, a transmitting and receiving interface 112, and a signal receiver including the correlators 121 and 122, demodulator 123, carrier detector circuit 124 and the synchronization control circuit 125. It is assumed that N=2 in this example.

The signal transmitter includes the modulator 111 which is adapted to provide a CSK modulation of input data TXD for transmission by employing Manchester M series code. A modulated and transmitted signal TXO supplied from the modulator 111 is fed to a power line interface 112 for interior wiring. In the present embodiment, a power line communication is effected where the commercial a.c. power line (of 100 V, for example) is employed as signal transmission line.

The transmitted signal TXO is converted into a signal form suitable for the power line communication by the interface 112, and a signal which is superimposed upon the commercial alternating current is fed to the power line. A signal which is transmitted from a different modem through the power line is received by the interface 112 where the signal is separated from the commercial alternating current and is then subject to a required signal conversion (including a digital conversion). The signal which is processed in this manner is supplied to a signal receiver within the modem as a received signal RXI.

The signal receiver comprises the correlators 12-1 and 12-2, demodulator 123, carrier detector circuit 124, peak position detection circuit 226A, peak position determining circuit 226B, synchronization tracking circuit 227, synchronization-established indicator 228, synchronization-failed indicator 229, and flipflop 219 which delivers the synchronization-established signal DSR. The circuits 226A, 226B, 228, 229, and 219 correspond to those shown in the synchronization control circuit 125 shown in FIG. 5, and thus are substantially identical with those illustrated in FIG. 33 even though the synchronization tracking circuit is omitted from illustration in the synchronization control circuit 125 shown in FIG. 33 for brevity of description.

Figure 39:
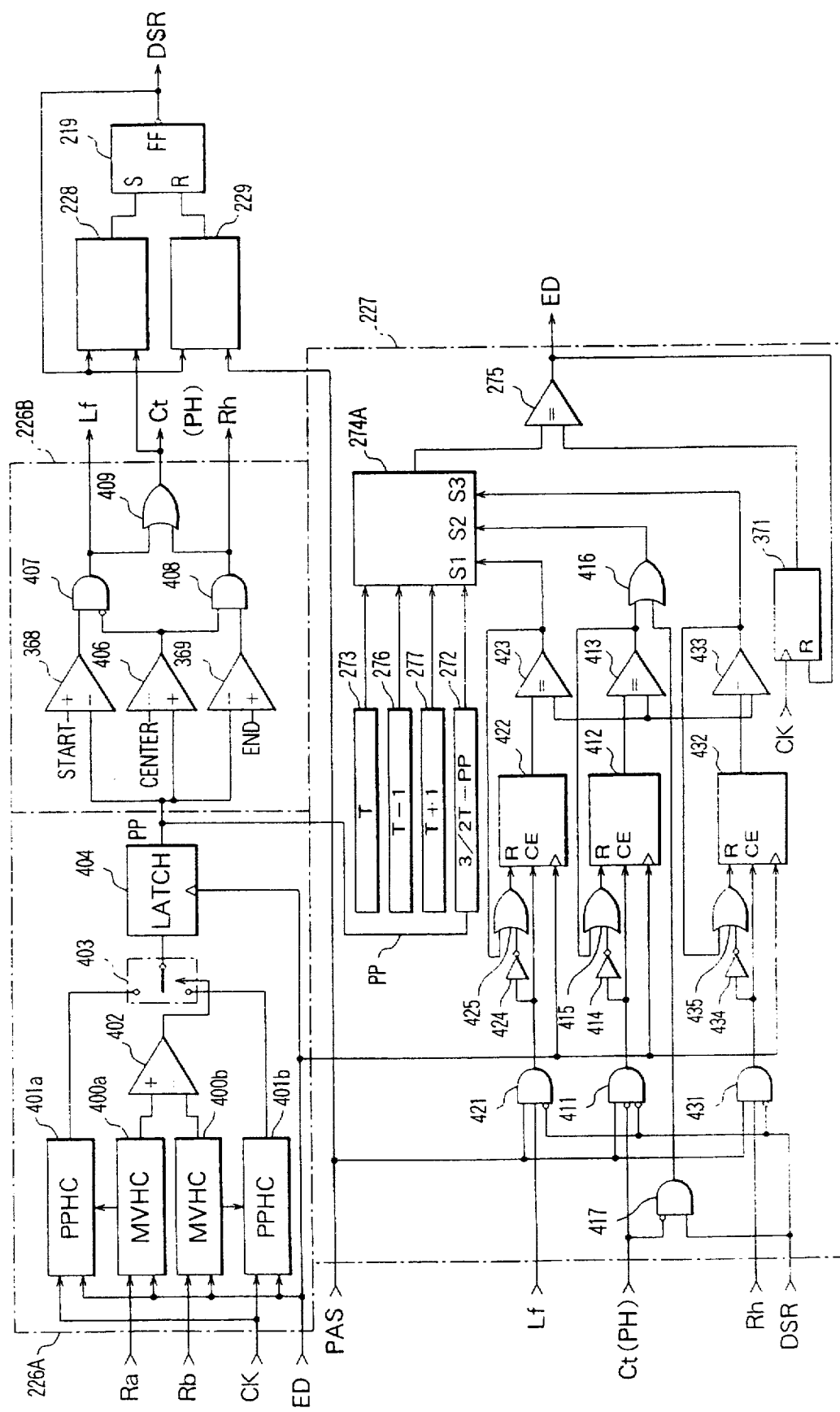
FIG. 39 is a block diagram of an example of the synchronization control circuit which includes a synchronization tracking circuit.

FIG. 39 shows an example of the synchronization control circuit including the synchronization tracking circuit. In this Figure, the synchronization tracking circuit 227 has the function of establishing the synchronization in the manner mentioned above, allowing a correlation peak to be generated within the window W of the data interval and allowing the peak position to be located at the center of the window W by slightly adjusting the timing of generating the end of data interval signal ED. The peak position detection circuit 226A and the peak position determining circuit 226B shown in FIG. 39 are slightly different in construction from those shown in FIG. 33, which will be described below.

In the peak position detector circuit 226a shown in FIG. 33, a pair of correlation outputs Ra and Rb are supplied for addition, and the peak position of the absolute magnitude is detected. On the other hand, in the circuit shown in FIG. 39, the peak positions of the correlation outputs Ra and Rb are detected separately, as are the peak values. The peak position which exhibits a greater peak value is determined as a final peak position.

Correlation outputs Ra and Rb are supplied to maximum value hold circuits (peak value detectors or MVHC) 400a and 400b. Each of the maximum value hold circuits 400a and 400b comprises an absolute magnitude circuit 264, a latch circuit 263, a comparator 261 and an OR circuit 265A shown in FIG. 33. A maximum value within each data interval is retained in the latch circuit. Maximum values (or peak values) of correlation outputs Ra and Rb during the data interval are supplied to a comparator 402 where they are compared against each other.

Peak position holding circuits (PPHC) 401a, 401b are provided for correlation outputs Ra and Rb, respectively. Each of the peak position holding circuits 401a and 401b comprises an OR circuit 265B, a counter 266 and a latch circuit 267, all of which are shown in FIG. 33. The peak values held in the peak position holding circuits 401a and 401b are fed to a changeover switch 403. The purpose of the changeover switch 403 is to select one of peak values which are compared against each other in the comparator 402 and which is greater in its peak value. The peak value which is selected by the changeover switch 403 is latched in a latch circuit 404 in response to the end of data interval signal ED supplied thereto.

The peak position determining circuit 226B shown in FIG. 39 comprises a comparator 406 and a pair of AND gates 407 and 408 which are controlled by an output from the comparator 406, added to the circuit components of the peak position determining circuit shown in FIG. 33.

Figure 38:
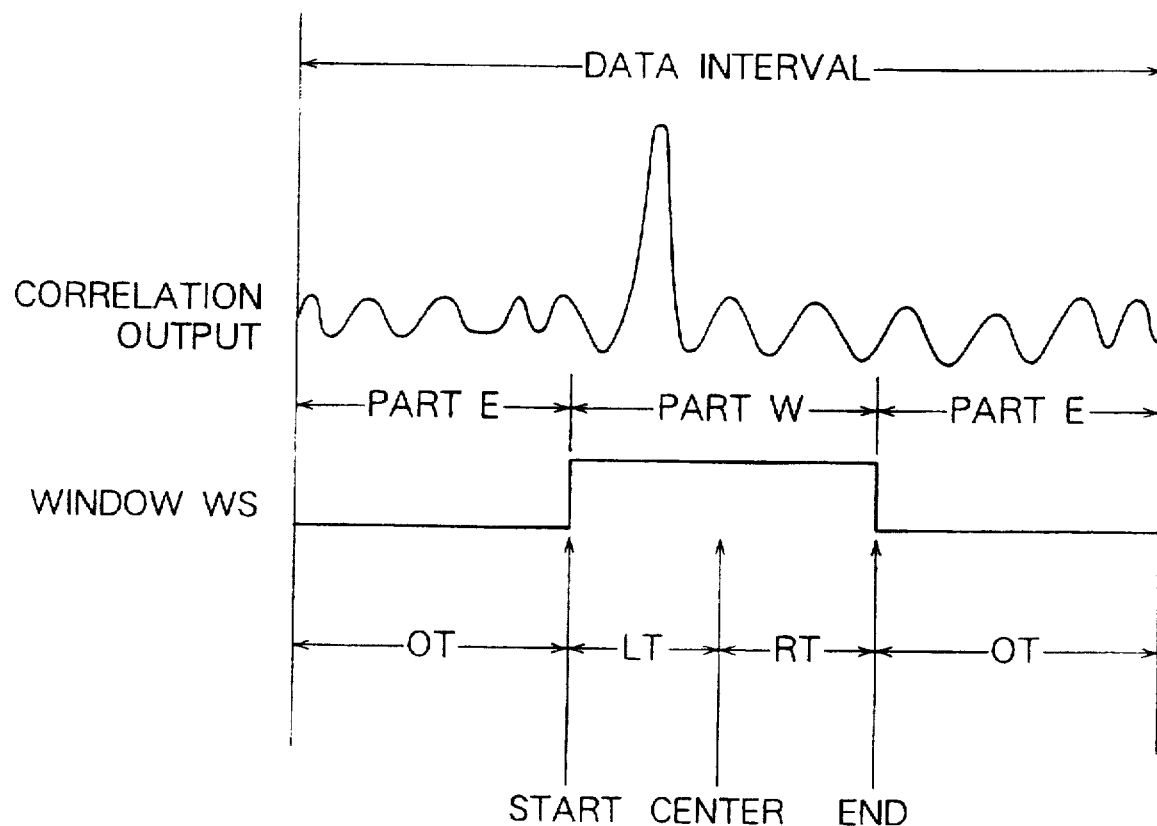
FIG. 38 is a timing chart illustrating a correlation signal, a data interval, and an observation interval in the CSK modem shown in FIG. 37.

Data which represents the central position of the window W is previously loaded into the comparator 406 (additionally refer to FIG. 38). A detected peak position PP is fed to the comparator 406, which determines if the detected peak position PP is located to the left of the center of the window W, which will be hereafter referred to as "left-hand region" and is located close to the beginning point of the window, or to the right of the center, which will be hereafter referred to as "right-hand region" and is close to the end of the window. When the peak position is located in the left-hand region, the AND gate 407 is opened, whereby an output from a comparator 368 is supplied as a left-hand determined signal Lf. When the peak position is located in the right-hand region, an output from a comparator 369 is supplied through the AND gate 408 as a right-hand determined signal Rh.

A signal Rh or Lf is fed to an OR circuit 409, which delivers a signal Ct corresponding to the peak position determining signal Ph which is then fed to the synchronization-established indicator. The signal Ct assumes its high level when the peak position PP is located within the window W, whereas the signal Ct assumes its low level if the peak position PP is located in either marginal part E (OT region) of the data interval. The signals Lf, Ct and Rh are fed to the synchronization tracking circuit 227.

Circuit components of the synchronization tracking circuit 227 which have been described before with reference to FIG. 33 are denoted by like reference characters. The synchronization tracking circuit 227 includes registers 273 and 272 in which data T and data (3/2)T-PP are loaded, respectively, and registers 276 and 277 in which data T−1 and T+1 are loaded, respectively. It is to be understood that the value "1" appearing in the denotation of data T−1 and T+1 is sufficiently small as compared to the value "T".

For example, when a shift register which receives the received signal RXI has 248 bits, (as when 31 bit Manchester M series is employed and each bit is allocated to 8 or m=8), T is selected to be equal to 248. Data T−1 and T+1 in the registers 276 and 277 are used to shift slightly the peak position of correlation outputs Ra and Rb (a synchronization tracking), by slightly adjusting the data interval so as to bring the peak position closer to the center of the window W. Data in these registers 273, 276 and 272 are fed to a selector 274A. The selector 274A selects data T−1 in the register 276 when a signal S1 (at its high level) is input, delivers data (3/2)T-PP in the register 272 when a signal S2 (at its high level) is input, delivers data T+1 in the register 277 when a signal S3 (at its high level) is input, and delivers data T in the register 273 otherwise or when all signals S1, S2 and S3 are at their low level. The data which is thus selected is fed to the comparator 275.

Before the synchronization is not yet established, the synchronization-established signal DSR assumes its high level, whereby an AND gate 417 is opened. If the detected peak position is located in the OT region (marginal part E), the resulting signal Ct is at its low level, whereby the output of AND gate 417 rises to its high level. This output signal of a high level is fed to an OR circuit 416 when the signal S2 is supplied to the selector 274A. Accordingly, data (3/2)T-PP in the register 272 is supplied to the comparator 275, thereby determining if the synchronization is established.

AND circuits 421, 412 and 431 receive the signals Lf, Ct, Rh, respectively, and are controlled by the synchronization-established signal DSR and the carrier detection signal PAS. When the synchronization is established (and accordingly the signal DSR is at its low level) and the carrier is detected (accordingly, the signal PAS is at its high lever), NAND gates 421, 412 and 431 are opened, thereby transmitting the signals Lf, Ct, Rh therethrough.

A circuit which receives the signal Lf will be described. The signal Lf (at its high level) which is delivered when the peak position is located in the left-hand region is applied through gate 421 to the clock-enable input CE of the counter 422. In response to the enable signal, the counter 422 counts the end of data interval signal ED. A count in the counter 422 is fed to a comparator 423 in which a given value Z, greater than 1, is previously loaded.

When the count in the counter 422 reaches the loaded value Z, the comparator 423 delivers an output of a high level, which is supplied as the signal S1 to the selector 274A. Accordingly, the selector 274A selects data T-1, and accordingly, the length of the next data interval is set up to a value (T-1) which is shorter than T. When the peak position of the correlation output occurs Z times in succession in the left-hand region, the length of the next data interval is slightly decreased, whereby the peak position is brought closer to the center of the window W.

A combination of the counter 422, the comparator 423, NOT circuit 424 and OR circuit 425 form together a deviation determining circuit. The deviation determining circuit detects whether or not the peak position has occurred Z times in succession in the left-hand region. In this manner, a stabilized tendency of deviation of the peak position, rather than a temporary deviation of the peak position can be detected, allowing the end of data interval signal ED to be formed to correct for a deviation of the peak position. This permits the synchronization tracking operation to be achieved in a stable manner.

The counter 422 is reset by an output of a low level from the AND gate 421 (which is raised to a high level by NOT circuit 424), or a high level output from the comparator 423 which is supplied to the OR circuit 425.

Another deviation determining circuit is formed by a combination of a counter 432, a comparator 433, NOT circuit 434 and OR circuit 435. This deviation determining circuit again detects whether or not the peak position has occurred Z times in succession in the right-hand region. If the peak position occurs Z times in succession in the right-hand region, the comparator 433 delivers the signal S3. Accordingly the length of the next data interval is set up to a value (T+1) which is slightly greater than T, thus bringing the peak position closer to the center of the window W.

A counter 412, a comparator 413, NOT circuit 414 and OR circuit 415 form together a non-synchronization detector circuit. When the peak position is located in the marginal part E (OT region), the signal Ct is at its low level, which is fed to NAND circuit 411, whereby a signal of a high level is fed to the clock enable terminal EC of the counter 412, which therefore begins to count the end of data interval signal ED. When the count in the counter 412 reaches a value of Z, the comparator 413 delivers a signal of a high level, which is fed through the OR circuit 413 to the selector 274 as the signal S2. In this manner, the non-synchronization detector circuit detects the fact that the peak position has not occurred Z times in succession within the window W. When data (3/2)T-PP in the register 272 is supplied to the comparator 275, an operation for establishing the synchronization is restarted.

In the remaining case when the outputs from the comparators 413, 423 and 433 are at their low level, data T in the register 273 is selected, and the length of the data interval is set up to be equal to T.

The synchronization is established or corrected in a similar manner. Accordingly, even if a variation occurs in the signal transmission characteristic or a shift occurs in the clock signal, the peak position can be maintained at the center of the window W.

In the described embodiment, the same value Z is used in the comparators 412, 423, 433, but different values may be used in these comparators.

What is claimed is:

1. A code shift keying (CSK) communication system for spread spectrum communication comprising:
   means for generating a synthesized PN code series by synthesizing a predetermined number of PN code series, selected from N PN code series, in response to m input data bits to be transmitted wherein m is not lower than two and N is not lower than m; and
   means for transmitting the generated synthesized PN code series onto a transmission medium, the synthesized PN code series having a maximum value of the absolute magnitude of auto-correlation and being greater than a maximum value of the absolute magnitude of cross-correlations between the remaining synthesized PN code series.

2. The CSK communication system according to claim 1 wherein the N PN code series comprise N Manchester M series having a given period.

3. The CSK communication system according to claim 1, further including a receiving interface for separating the transmitted synthesized PN code series from a transmission medium, and forming means for forming m received data bits in response to the separated PN code series from the receiving interface.

4. The CSK communication system according to claim 1 wherein the generating means comprises a modulator for N series.

5. The CSK communication system according to claim 3 further comprising N correlation means for correlating the separated PN code series with N Manchester M series separately to deliver first to N-th correlation output signals, and a demodulator for demodulating the first to N-th correlation output signals to form corresponding received data bits, wherein said forming means is a demodulation circuit for N series.

6. The CSK communication system according to claim 5 wherein said demodulation circuit for N series comprises a carrier detecting means for determining whether or not a carrier signal has been received.

7. The CSK communication system according to claim 2 wherein said generating means comprises N generating means each for separately generating a corresponding one of N Manchester M series, and synthesizing means for selectively switching the synthesized series in synchronism with the period of the N Manchester M series and in accordance with the code of m bits in the input data.

8. The CSK communication system according to claim 3 wherein said forming means comprises correlator for correlating each of the separated transmitted code series with N Manchester M series to deliver first to N-th correlation output signals, a demodulator for demodulating the first to N-th correlation output signals to form a corresponding bit of the received data, and synchronization control means for synchronizing the operation of said first to N-th correlation means with a data interval, which is equal to one period of the Manchester M series, in response to the first to N-th correlation output signals.

9. The CSK communication system according to claim 8 wherein said forming means comprises a carrier detecting means for detecting a carrier in response to the first to N-th correlation output signal to thereby determine whether or not a carrier signal has been received.

10. The CSK communication system according to claim 8 wherein said synchronization control means comprises a peak position detecting means for detecting a peak in the first to N-th correlation output signal, a peak position determining means for determining whether or not the detected peak rises in a given area within the data interval, and synchronization tracking means operable in response to a negative determination by said peak position determining means to establish a synchronization between the first to N-th correlation output signal and the data interval.

11. The CSK communication system according to claim 10 wherein said synchronization control means comprises synchronization-failed indicator for determining whether no carrier has been detected over a given number of data intervals, indicating to the effect that the synchronization failed to be established to thereby discriminate between a temporary failure of detection of a carrier and a failure of detection of a carrier.

12. The CSK communication system according to claim 8 wherein said synchronization control means comprises a synchronization tracking means for adjusting the length of the data interval to thereby bring peak positions detected in succession by said detecting means closer to the center of a given area within a data interval.

13. A CSK communication method for transmitting input data for transmission having m bits in a spread spectrum communication system wherein m is not lower than two, said method including the steps of:

generating N PN code series, N being not lower than m;

generating a predetermined number of PN series from the N PN code series in response to said input data; and transmitting the generated PN series onto a transmission medium, the generated PN code series having a maximum value of the absolute magnitude of auto-correlation and being greater than a maximum value of the absolute magnitude of cross-correlations between the remaining generated PN code series.

14. The CSK communication method according to claim 13 wherein the N PN code series comprise N Manchester M series having a given period.

15. The CSK communication method according to claim 14 wherein said transmitting step includes the step of converting the generated code series into a configuration suitable for a transmission medium before transmitting the generated code onto the transmission medium.

16. The CSK communication method according to claim 13 further including the steps of:

receiving the transmitted code series by separating the transmitted code series from a transmission medium; and forming received data series having a code defined by m bits corresponding to the m bits of said transmitted code series.

17. The CSK communication method according to claim 15 wherein said generating step comprises the steps of separately generating N Manchester M code series, and selectively switching a synthesized series, which is synthesized from N Manchester M series generated, in accordance with the code of m bits in the transmitted code series, the switching being synchronized with a period of the N Manchester M code series.

18. The CSK communication method according to claim 17 further including the steps of:

separately correlating each of the separated transmitted code series with N Manchester M series to derive first to N-th correlation signals;

demodulating the first to N-th correlation signals to form corresponding bits in the received data series; and synchronizing the correlating step with a data interval which is equal to one period of the Manchester M series.

19. The CSK communication method according to claim 18 wherein said forming step includes the step of detecting from the first to N-th correlation output signals whether or not a carrier signal has been received.

20. The CSK communication method according to claim 18 wherein said synchronizing step includes the steps of:

detecting a peak in the first to N-th correlation output signals;

determining whether or not the detected peak rises in a given area within the data interval; and establishing, in response to a negative determination by the determining step, a synchronization between the first to N-th correlation output signals and the data interval.

21. The CSK communication method according to claim 20 wherein said synchronizing step includes the step of determining whether no carrier has been detected during a given number (Y) of data intervals to thereby indicate to the effect that the synchronization failed to be established and to discriminate a temporary failure of detection of a carrier and a failure of detection of a carrier.

22. The CSK communication method according to claim 21 wherein said synchronizing step includes the step of adjusting the length of the data interval to thereby bring peak positions detected in succession by the detecting steps closer to a given area within the data interval.

* * * * *